United States Patent
Deveraux et al.

(10) Patent No.: US 12,056,728 B1
(45) Date of Patent: Aug. 6, 2024

(54) STREAMLINED PROPERTY INSURANCE APPLICATION AND RENEWAL PROCESS

(71) Applicant: United Services Automobile Association (USAA), San Antonio, TX (US)

(72) Inventors: Ramsey Deveraux, San Antonio, TX (US); Mark Davis, Boerne, TX (US); Michael J. Allen, San Antonio, TX (US); Spencer Read, Helotes, TX (US); Kathleen L. Swain, Kemah, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 69 days.

(21) Appl. No.: 17/473,899

(22) Filed: Sep. 13, 2021

Related U.S. Application Data

(63) Continuation of application No. 15/365,786, filed on Nov. 30, 2016, now Pat. No. 11,120,506, which is a
(Continued)

(51) Int. Cl.
*G06Q 30/00* (2023.01)
*G06Q 30/0207* (2023.01)
(Continued)

(52) U.S. Cl.
CPC ......... *G06Q 30/0215* (2013.01); *G06Q 40/08* (2013.01); *G06Q 40/00* (2013.01)

(58) Field of Classification Search
CPC .................................................. G06Q 30/0215
See application file for complete search history.

(56) References Cited

U.S. PATENT DOCUMENTS

| | | | |
|---|---|---|---|
| 6,438,472 B1 * | 8/2002 | Tano | G01C 21/26 701/25 |
| 6,526,807 B1 * | 3/2003 | Doumit | G01M 3/04 73/40.5 R |

(Continued)

OTHER PUBLICATIONS

Split effective date project for new and renewal insurance business IP.com 2008 (Year: 2008).*

(Continued)

*Primary Examiner* — Bruce I Ebersman
(74) *Attorney, Agent, or Firm* — Fletcher Yoder, P.C.

(57) ABSTRACT

Systems and methods to performing insurance-based actions using sensor data are provided. A computer-implemented method includes receiving, via a processor, a geolocation associated with a property associated with a user. The method further includes querying, via the processor, one or more network image sources using the geolocation to identify one or more images of the property. The method further includes sending, via the processor, the one or more images to an electronic device of a user. The method further includes receiving, via the processor, an indication from the user, via the electronic device, whether the one or more images pertain to the property associated with the user. The method further includes, upon confirmation, providing, via the processor, the one or more images for image analysis to identify one or more features of the property. The method further performing one or more processes based at least upon Customer Relationship Management (CRM) tool data of the user and the one or more features of the property. The method further includes providing results of the one or more processes to the user.

18 Claims, 36 Drawing Sheets

Related U.S. Application Data continuation of application No. 14/324,748, filed on Jul. 7, 2014, now Pat. No. 10,102,584.

(60) Provisional application No. 61/948,192, filed on Mar. 5, 2014, provisional application No. 61/943,897, filed on Feb. 24, 2014, provisional application No. 61/943,901, filed on Feb. 24, 2014, provisional application No. 61/943,906, filed on Feb. 24, 2014, provisional application No. 61/926,541, filed on Jan. 13, 2014, provisional application No. 61/926,536, filed on Jan. 13, 2014, provisional application No. 61/926,532, filed on Jan. 13, 2014, provisional application No. 61/926,534, filed on Jan. 13, 2014, provisional application No. 61/926,108, filed on Jan. 10, 2014, provisional application No. 61/926,119, filed on Jan. 10, 2014, provisional application No. 61/926,103, filed on Jan. 10, 2014, provisional application No. 61/926,095, filed on Jan. 10, 2014, provisional application No. 61/926,091, filed on Jan. 10, 2014, provisional application No. 61/926,111, filed on Jan. 10, 2014, provisional application No. 61/926,093, filed on Jan. 10, 2014, provisional application No. 61/926,121, filed on Jan. 10, 2014, provisional application No. 61/926,123, filed on Jan. 10, 2014, provisional application No. 61/926,098, filed on Jan. 10, 2014, provisional application No. 61/926,118, filed on Jan. 10, 2014, provisional application No. 61/926,114, filed on Jan. 10, 2014.

(51) Int. Cl.
*G06Q 40/08* (2012.01)
*G06Q 40/00* (2023.01)

(56) References Cited

U.S. PATENT DOCUMENTS

| | | | | |
|---|---|---|---|---|
| 6,959,298 | B1 * | 10/2005 | Silverbrook | G06Q 20/108 |
| | | | | 707/999.102 |
| 7,395,157 | B2 * | 7/2008 | Feyen | G08B 31/00 |
| | | | | 702/5 |
| 7,433,836 | B1 * | 10/2008 | August | G06Q 20/14 |
| | | | | 705/30 |
| 9,811,862 | B1 * | 11/2017 | Allen | G06Q 10/20 |
| 9,842,310 | B2 * | 12/2017 | Lekas | G06Q 10/087 |
| 9,953,370 | B2 * | 4/2018 | Pershing | C01B 21/28 |
| 10,360,634 | B2 * | 7/2019 | Lekas | G06Q 40/08 |
| 10,552,911 | B1 * | 2/2020 | Allen | G06Q 10/20 |
| 2002/0041328 | A1 * | 4/2002 | LeCompte | G01C 11/025 |
| | | | | 348/144 |
| 2005/0278082 | A1 * | 12/2005 | Weekes | G07C 5/008 |
| | | | | 701/1 |
| 2007/0136077 | A1 * | 6/2007 | Hammond | G06Q 30/0278 |
| | | | | 705/306 |
| 2009/0265193 | A1 * | 10/2009 | Collins | G06Q 30/0185 |
| | | | | 901/46 |
| 2011/0161119 | A1 * | 6/2011 | Collins | G06Q 40/08 |
| | | | | 705/4 |
| 2012/0143014 | A1 * | 6/2012 | Kim | G16H 40/67 |
| | | | | 600/300 |
| 2014/0087780 | A1 * | 3/2014 | Abhyanker | G06Q 30/02 |
| | | | | 455/521 |
| 2014/0132409 | A1 * | 5/2014 | Billman | G08B 19/00 |
| | | | | 463/31 |
| 2014/0136242 | A1 * | 5/2014 | Weekes | G06Q 40/08 |
| | | | | 705/4 |
| 2014/0257862 | A1 * | 9/2014 | Billman | G06Q 50/163 |
| | | | | 705/4 |
| 2014/0358592 | A1 * | 12/2014 | Wedig | G06Q 40/08 |
| | | | | 705/4 |
| 2015/0073834 | A1 * | 3/2015 | Gurenko | G06Q 40/08 |
| | | | | 705/4 |
| 2015/0077737 | A1 * | 3/2015 | Belinsky | G01N 15/0211 |
| | | | | 250/208.2 |
| 2016/0018799 | A1 * | 1/2016 | Gettings | G05B 15/02 |
| | | | | 700/19 |

OTHER PUBLICATIONS

Insurance 101 for the Safety Professional (Year: 2005).*
Obtaining Real-Time Property Policy Information Using the Internet (Year: 2007).*

* cited by examiner

STREAMLINED PROPERTY INSURANCE APPLICATION AND RENEWAL PROCESS

CROSS REFERENCE TO RELATED APPLICATIONS

This application is a continuation of prior U.S. patent application Ser. No. 15/365,786, filed on Nov. 30, 2016, which is a continuation of prior U.S. patent application Ser. No. 14/324,748 filed Jul. 7, 2014, which claims the priority of U.S. Patent Application Ser. Nos. 61/926,093 filed Jan. 10, 2014; 61/926,091 filed Jan. 10, 2014; 61/926,095 filed Jan. 10, 2014; 61/926,098 filed Jan. 10, 2014; 61/926,103 filed Jan. 10, 2014; 61/926,108 filed Jan. 10, 2014; 61/926,111 filed Jan. 10, 2014; 61/926,114 filed Jan. 10, 2014; 61/926,118 filed Jan. 10, 2014; 61/926,119 filed Jan. 10, 2014; 61/926,121 filed Jan. 10, 2014; 61/926,123 filed Jan. 10, 2014; 61/926,536 filed Jan. 13, 2014; 61/926,541 filed Jan. 13, 2014; 61/926,534 filed Jan. 13, 2014; 61/926,532 filed Jan. 13, 2014; 61/943,897 filed Feb. 24, 2014; 61/943,901 filed Feb. 24, 2014; 61/943,906 filed Feb. 24, 2014; and 61/948,192 filed Mar. 5, 2014 which are each incorporated herein by reference in its entirety.

FIELD OF THE INVENTION

The disclosed embodiments generally relate to a method and computerized system for designing, developing, underwriting, selling and managing insurance and related products and services, and more particularly, to aggregating and utilizing data for facilitating certain insurance actions.

BACKGROUND OF THE INVENTION

Smart house functionality is a maturing space, but the opportunity for insurance companies remains largely untapped. Thus, the terms of insurance policies, such as homeowner insurance policies, may not be reflective of the true nature of the risks being insured.

Another maturing space concerns satellite imagery. As the number of satellites increases, the more satellite imagery is becoming available to the public. As a result, satellite imagery systems or image draped systems, such as, Google Earth, are becoming more popular. Using Google Earth, a user can view satellite imagery, 3D terrain, and Geographic Information Services (GIS) data such as roads and political boundaries which can be stored in a central database. Google Earth can also display information from other public sources.

In this regard, there is utility and functionality to be provided by aggregating smart home functionality with satellite imagery and other insurance related data to facilitate rapid decision making processes.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is an improved and efficient insurance data gathering process contingent upon captured image and informatics sensor data. The captured image data may be used to facilitate rapid insurance-related decisions. In regards to a decision to be rendered regarding a property insurance policy (e.g., insurance policy renewal, obtaining a new insurance policy and receiving a quote for an insurance policy), at least one image is preferably retrieved which is associated with the property. The retrieved at least one image may be utilized for property identification purposes. One or more accounts associated with the insured (e.g., homeowner's insurance policy, automobile insurance policy, life insurance policy and investment account (401K)) are identified and one or more risks characteristics are identified regarding the insured. Preferably, the one or more risks characteristics for the insured are identified via analysis of informatic data received from one or more informatic sensor devices associated with the property. The one or more accounts may be mutually exclusive of the insurance policy to which the decision is to be rendered. An aggregated dataset is provided from the at least one image, one or more accounts and risk characteristics associated with the insured. Predictive analysis is performed on the aggregated dataset to render a risk profile for the insured regarding an insurance policy for the property. A decision is rendered regarding the insured and the insurance policy based upon the rendered risk profile.

In another aspect, retrieving the at least one image includes determining if an image associated with the property is available from a stored location (e.g., a database), and if not, an image associated with the property is obtained in real time from a camera device. Additionally, it is to be appreciated retrieving at least one image may include determining one or more risk characteristics for the property via analysis of the at least one image and may also include rendering a 3D model representative of the property from a retrieved image.

This summary section is provided to introduce a selection of concepts in a simplified form that are further described subsequently in the detailed description section. This summary section is not intended to identify key features or essential features of the claimed subject matter, nor is it intended to be used to limit the scope of the claimed subject matter.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
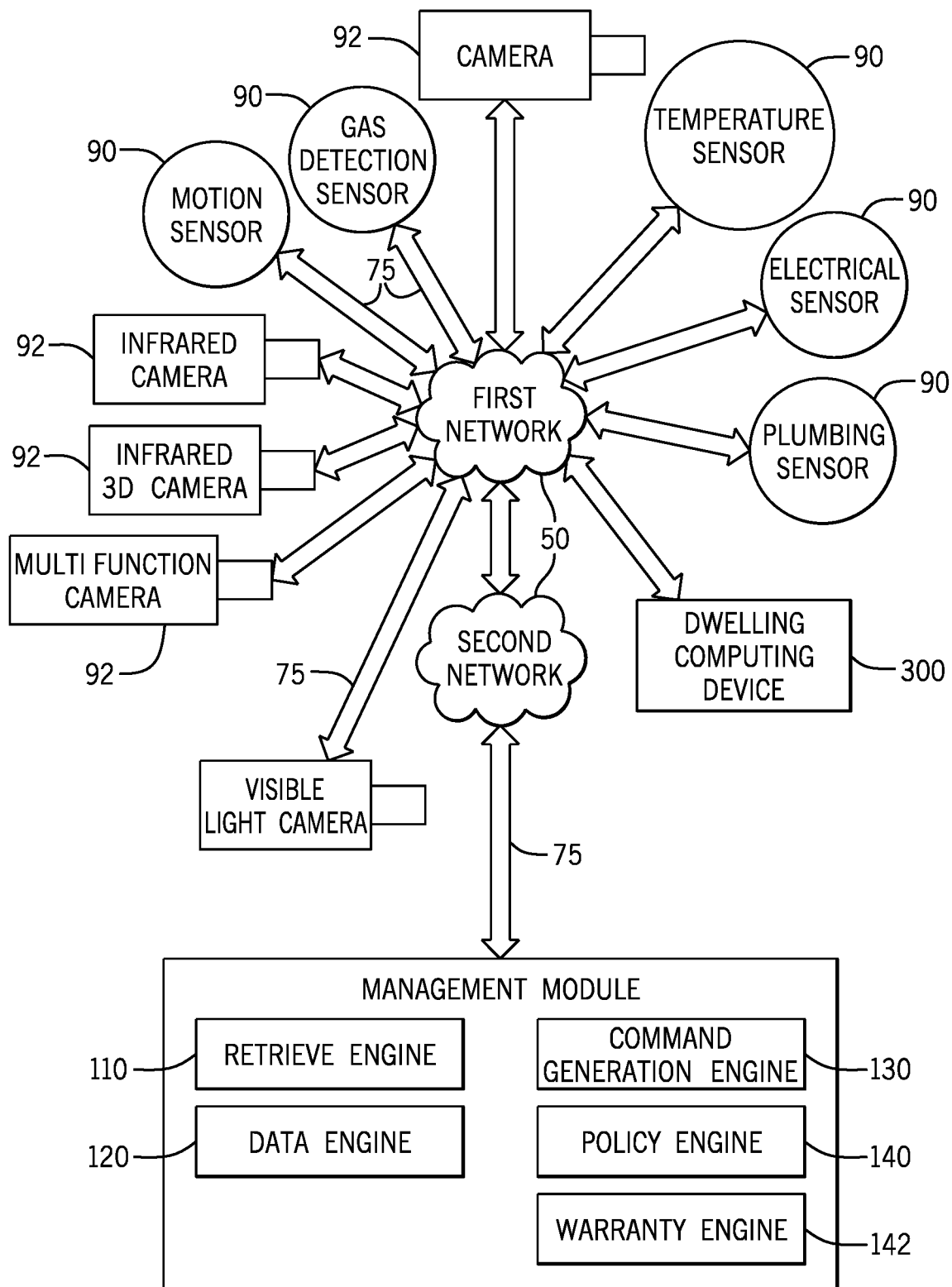
FIG. 1 illustrates an example system for acquiring and transmitting various types of data in a smart house environment, in accordance with embodiments presented herein.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments. Also, the flow charts and methods described herein do not imply either required steps or a required order to the steps, and the illustrated embodiments and processes may be implemented in any order and/or combination that is practicable.

Unless defined otherwise, all technical and scientific terms used herein have the same meaning as commonly understood by one of ordinary skill in the art to which this the embodiments described herein belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims. Commonly assigned U.S. Pat. Nos. 8,289,160 and 8,400,299 are related to certain embodiments described herein and are each incorporated herein by reference in their entirety.

As used herein, the term "insurance company's decisions about underwriting, pricing, and other terms and conditions on which it is willing to issue insurance policies.

As used herein, the term "insurance policy" refers to a contract between an insurer, known as an insurance company, and an insured, also known as a policy holder, in which compensation is paid by the insurer to the insured for some specific losses in exchange of a certain premium amount periodically paid by the insured in past. In a typical usage, whenever the insured suffers some loss for which he/she has insured or holds policy, the insured may file an insurance claim to request compensation for the loss.

As also used herein, "insured" may refer to an applicant for a new insurance policy and/or may refer to an insured under an existing insurance policy.

As used herein, the term "insurance policy" may encompass a warranty or other contract for the repair, service, or maintenance of insured property.

As used herein, "insured property" means a dwelling, other buildings or structures, personal property, or business property, as well as the premises on which these are located, some or all which may be covered by an insurance policy.

Turning now descriptively to the drawings, FIG. 1 depicts an exemplary system 100 communicatively connected to sensors or one or more imaging devices (e.g., camera devices) relative to a dwelling in which below illustrated embodiments may be implemented. As to be further described below, it is to be understood examples of sensors and imaging devices include, but are not limited to, camera devices, webcams, smart television camera devices (and other appliance camera devices), smart phone devices, tablet devices, satellite imaging devices (including high-device imaging satellite devices), infrared and/or radar devices and the like. It is to be further understood that first and second networks 50 are each a geographically-distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a dwelling, structure, residence or campus. WANs, on the other hand, typically connect geographically dispersed nodes over long-distance communications links, such as common carrier telephone lines, optical light paths, synchronous optical networks (SONET), synchronous digital hierarchy (SDH) links, or Powerline Communications (PLC), and others.

Communications 75 represents computerized communications as known by those skilled in the art. For instance, communications 75 may be wired links or may comprise a wireless communication medium, where certain nodes are in communication with other nodes, e.g., based on distance, signal strength, current operational status, location, etc. Moreover, each of the devices can communicate data packets (or frames) with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the presently disclosed embodiments may be a system, method or computer program product. Accordingly, aspects of the presently disclosed embodiments may take the form of an entirely hardware embodiment, an entirely software embodiment (including firmware, resident software, micro-code, etc.) or an embodiment combining software and hardware aspects that may generally be referred to herein as a "circuit," "module" or "system." Furthermore, aspects of the presently disclosed embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. For exemplary purposes and without limitations, examples of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer-readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the presently disclosed embodiments may be written in any combination of one or more programming languages, including an object-oriented programming language such as Java, Smalltalk, C++ or the like and conventional procedural programming languages, such as the "C" programming language or similar programming languages. The program code may execute entirely on the server computer, partly on the server computer, as a stand-alone software package, partly on the server computer and partly on a remote computer (such as dwelling computing device 300) or entirely on the remote computer. In the latter scenario, the remote computer may be connected to the server computer through any type of network, including a local area network (LAN) or a wide area network (WAN), a combination thereof, or the connection may be made to an external computer (for example, through the Internet using an Internet Service Provider).

Aspects of the presently disclosed embodiments are described below with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions/acts specified in the flowchart and/or block diagram block or blocks.

Turning to FIG. 1, system 100 includes sensors 90, cameras 92, and management module 105 that includes retrieval engine 110, data engine 120, command generation engine 130, policy engine 140, and warranty engine 142. In one embodiment, first network 50 is a LAN and second network 50 is a WAN (best shown in FIG. 1), such as the Internet, although it is contemplated herein that networks 50 may be any system and/or method of computerized communications as understood by those skilled in the art.

Figure 2:
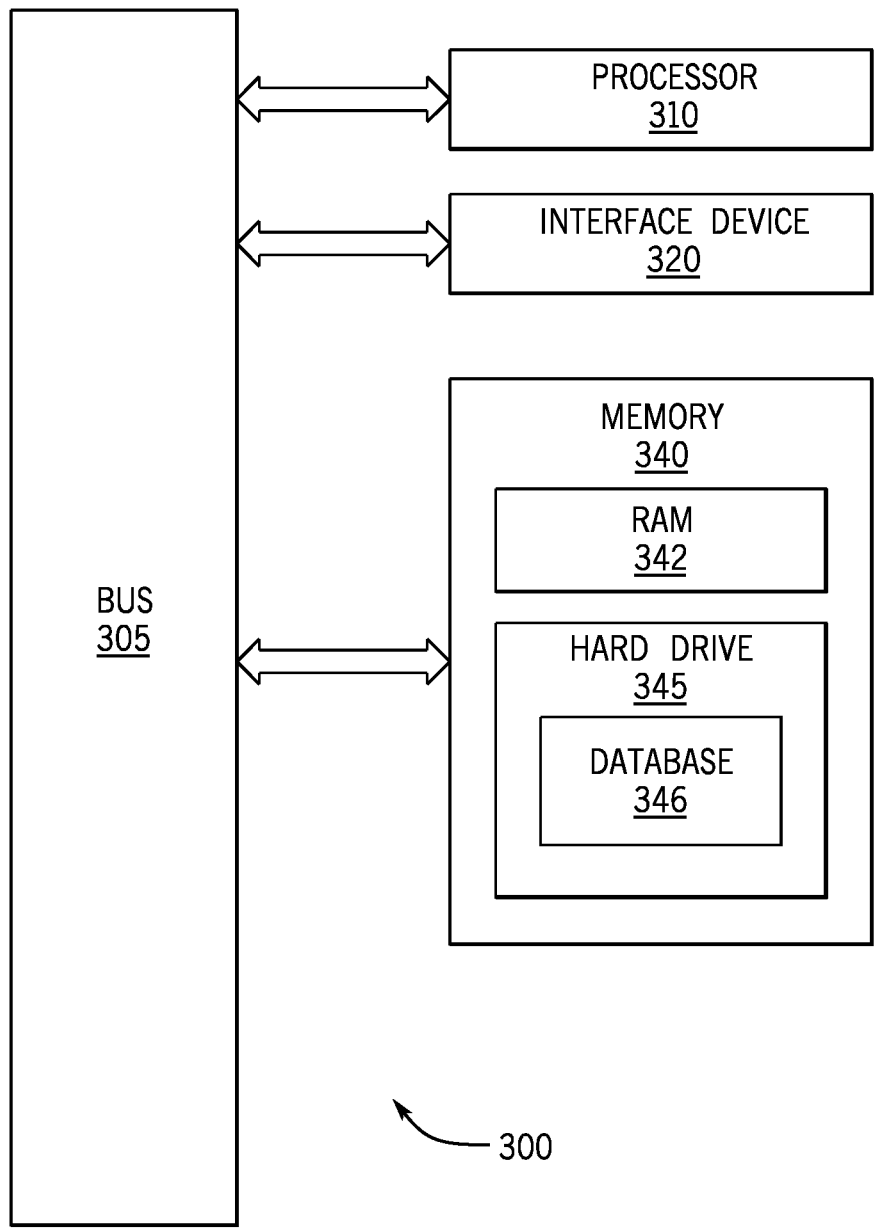
FIG. 2 illustrates a network computer device/node, in accordance with embodiments presented herein.

FIG. 2 is a schematic block diagram of an example computing device 300 that may be used (or components thereof) with one or more embodiments described herein. As explained above, in different embodiments these various devices may be configured to communicate with each other in any suitable way, such as, for example, via communication 75 over networks 50.

Device 300 is one example of a suitable system and is not intended to suggest any limitation as to the scope of use or functionality of embodiments described herein. Regardless, computing device 300 is capable of being implemented and/or performing any of the functionality set forth herein.

Computing device 300 is operational with numerous other general purpose or special purpose computing system environments or configurations. Examples of well-known computing systems, environments, and/or configurations that may be suitable for use with computing device 300 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

Computing device 300 may be described in the general context of computer system-executable instructions, such as program modules, being executed by a computer system. Generally, program modules may include routines, programs, objects, components, logic, data structures, and so on that perform particular tasks or implement particular abstract data types. Computing device 300 may be practiced in distributed data processing environments where tasks are performed by remote processing devices that are linked through a communications network. In a distributed data processing environment, program modules may be located in both local and remote computer system storage media including memory storage devices.

Device 300 is shown in FIG. 2 in the form of a general-purpose computing device. The components of device 300 may include, but are not limited to, one or more processors or processing units 310, a system memory 340, interface device 320, and a bus 305 that couples various system components including system memory 340 to processor 310.

Bus 305 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 300 typically includes a variety of computer system readable media. Such media may be any available media that is accessible by device 300, and it includes both volatile and non-volatile media, removable and non-removable media.

System memory 340 can include computer system readable media in the form of volatile memory, such as random access memory (RAM) 342, cache memory, and hard drive 345, which may include database 346. Computing device 300 may further include other removable/non-removable, volatile/non-volatile computer system storage media. By way of example only, hard drive 345 can be provided for reading from and writing to a non-removable, non-volatile magnetic media. Interface device 320 includes, without limitation, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 305 by one or more data media interfaces. As will be further depicted and described below, memory 340 may include at least one program product having a set (e.g., at least one) of program modules that are configured to carry out the functions of embodiments of the presently disclosed techniques.

Management module 105, has a set (at least one) of engines, such as retrieval engine 110, data engine 120, command generation engine 130, policy engine 140, and warranty engine 142 described below, which may be stored in memory 340, and may function solely or in combination with an operating system, one or more application programs, other program modules, and program data. Each of the operating system, one or more application programs, other program modules, and program data or some combination thereof, may include an implementation of a networking environment. Management module 105 may generally carry out the functions and/or methodologies of embodiments of the disclosure as described herein.

Device 300 may also communicate with one or more interface devices 320 such as a keyboard, a pointing device, a display, etc.; one or more devices that enable a user to interact with computing device 300; and/or any devices (e.g., network card, modem, etc.) that enable computing device 300 to communicate with one or more other computing devices. Such communication can occur via Input/Output (I/O) interfaces. Still yet, device 300 can communicate with one or more networks such as a local area network (LAN), a general wide area network (WAN), and/or a public network (e.g., the Internet) via a network adapter 320. As depicted, network adapter 320 communicates with the other components of computing device 300 via bus 305. It should be understood that, although not shown, other hardware and/or software components could be used in conjunction with device 300. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present disclosure may be implemented. FIGS. 1 and 2 are exemplary of a suitable environment and are not intended to suggest any limitation as to the structure, scope of use, or functionality of an embodiment of the present disclosure. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Sensor 90 and camera 92 include captured data related to structures. It is contemplated herein that structures include any type of dwelling structure (e.g., residential, commercial, retail, municipal, etc.) in which the capture and analysis of sensor data is useful for the reasons at least described herein. It is further contemplated herein that sensors 90 and cameras 92 may be installed on property that may or may not have a structure. In one embodiment, sensors 90 and cameras 92 communicate directly with management module 105. However, it is contemplated herein that sensors 90 and cameras 92 may communicate with computing device 300 operating on the same network 50 (best shown in FIG. 1). In this embodiment, computing device 300 receives information from sensors 90 and cameras 92 and communicates the information to management module 105. Computing device 300 may immediately transfer the information to management module 105, it may be a delayed transfer (e.g., scheduled for the middle of the night when internet usage is low), and/or it may be any communication methodology as known by those skilled in the art. Computing device 300 is preferably configured and operational to receive (capture) data from various sensors 90 and cameras 92 regarding certain measured aspects of the dwelling and transmit that captured data to a management module 105 via network 50. It is noted that device 300 may perform analytics regarding the captured sensor or imagery data regarding the dwelling, and/or management module 105, preferably located or controlled by an insurance company/carrier, may perform such analytics, as also further described below. Further, sensors 90 and cameras 92 may be connected to computing device 300 by wire, or by a wireless technology, or via any communication methodology as known by those skilled in the art.

Although various sensor and camera types are illustrated in FIG. 1 and described below, the sensor types described and shown herein are not intended to be exhaustive as embodiments of the present disclosure may encompass any type of known or unknown sensor type which facilitates the purposes and objectives of the certain illustrated embodiments described herein. Exemplary sensor types include (but are not limited to):

Motion sensor—One type of motion sensor 90 detects motion within a range of sensor 90. Thus, motion sensor 90 may be placed to detect when people, animals and/or objects move within sensor's 90 field of vision. Another type of sensor 90 may sense motion in the structure to which sensor 90 is attached. Although structures typically do not move, in the event of an earthquake, flood, damage to that part of the structure, and/or other devastating event, motion sensor 90 may detect the movement of the structure itself.

Temperature sensor—Temperature sensor 90 detects the temperature of the desired medium. Thus, temperature sensor 90 may be configured to measure the temperature of ambient air or of a specific surface (e.g., the wall to which temperature sensor 90 is attached). It is contemplated herein that temperature sensor 90 may be placed outside the structure (e.g., on an outside wall and/or the roof), inside the structure (e.g., on an interior wall, an interior ceiling, an interior floor, a basement, an attic, a kitchen, a bathroom, a bedroom, a workspace, etc.), or at a boundary there between.

Humidity sensor—As with other sensors 90, humidity sensor 90 may be placed anywhere inside/outside/on the structure as recognized by those skilled in the art.

Gas detection sensor—Detects the presence of various gasses. As with other sensors 90, gas detection sensor 90 may be placed anywhere inside/outside/on the structure as recognized by those skilled in the art. For exemplary purposes, only and without limitation, gas detection sensor may be configured to detect the presence of carbon monoxide (or any other harmful gasses, such as radon), oxygen, and/or methane (or any other flammable gasses). Further, the readings may be binary (e.g., either the gas is present or it is not present), or the readings may be quantitative (e.g., the percentage of air the comprises the gas, parts per million of the gas).

Smoke detector sensor—Detects the presence of smoke. As with other sensors 90, smoke detection sensor 90 may be placed anywhere inside/outside/on the structure as recognized by those skilled in the art. The readings of smoke detection sensor may be binary (e.g., either the gas is present or it is not present), or the readings may be quantitative (e.g., the percentage of air the comprises smoke, parts per million of smoke).

Water pressure sensor—Detects the water pressure at various locations within the structure. Water pressure sensors may monitor water related conditions, including (but not limited to): the detection of water and water pressure detection, for instance in the plumbing system in the dwelling 300. With regards to a water pressure sensor, it may have one or more probes attached to various locations of the dwelling's 300 plumbing, and thus device 103 may record the pressure present in the plumbing, and/or any changes in that pressure. For example, plumbing systems may be designed to withstand a certain amount of pressure, and if the pressure rises above that amount, the plumbing system may be at risk for leaking, bursting, or other failure. Thus, device 103 may record the water pressure (and water flow) that is present in the plumbing system at various points in time. Water pressure sensors 90 may be placed anywhere inside or outside the structure and thus may provide information related to the stresses being induced upon the structure's plumbing system. This information may be utilized by management module to indicate a plumbing system that is operating close to stress limits, and thus, a structure for which water damage may be more likely.

Water flow sensor—Detects the amount of water flowing through selected points in the plumbing system. Water flow sensor 90 may be placed anywhere inside or outside the structure and thus may provide information related to the amount of water being routed to the structure, and more particularly, which parts of the structure are receiving exactly (or approximately) how much water. It is contemplated herein that water flow sensors 90 may detect, for exemplary purposes only and without limitation, hot water in a water heater, hot water input pipes, cold water input pipes, and/or output pipes (e.g., pipes removing utilized water).

Water detection sensor—Detects any amount of water escaping through selected points throughout the plumbing system. Water detection sensor 90 may be placed anywhere inside the structure and thus may provide information related to water escaping and accumulating inside the structure, which parts of the structure have water accumulation and how much water. It is contemplated herein that water detection sensors 90 may detect, for exemplary purposes only and without limitation, flood waters entering from exterior to interior of the structure, water overflow from sump pump(s), drains or broken pipes and/or sewer/water back-ups.

Leak detection sensor—configured and operational to preferably monitor the presence of leaks from gas and water plumbing pipes both inside and outside the walls of the structure. The leak detection sensor may have one or more probes attached to various locations of the structure's plumbing and piping, and may record the fact that there is a gas or water leak. An example of this is that a leak detection sensor can be placed behind the washing machine. If the hoses that connect the washing machine to the water line were to break the leak detection sensor would know that there was a water leak and notify the insured and/or the insurance company. The insured can also give prior authorization to the insurance company to act on their behalf to correct the water leak. For instance, call a plumber to turn off the water at the street when the leak detector activates and the insured does not respond to the leak detection sensor after a certain period of time. The leak detection sensors do not need to necessarily be placed around the appliance or pipe that they are intended to check for leaks. For example, an insured could place a sensor on the main water line that goes into the dwelling 300 and this sensor could know by changes in pressure, temperature, etc. that there is a later or gas leak in the dwelling 300—even if the leak was inside the walls and not viewable inside the home. An analysis model could use the information about how often the leak detection sensor alerts, whether the insured uses leak detection sensor(s), and where they are placed in various ways such as rating the home insurance, tracking water pressure, and/or providing advice and guidance, such as rating the home insurance, tracking water pressure, and/or providing advice and guidance.

Wind speed sensor—Wind speed sensor 90 detects the wind speed at that location and may be placed anywhere inside or outside the structure.

Air pressure sensor—Air pressure sensor 90 may be placed anywhere inside or outside the structure. This information may be analyzed, for example, to determine how quickly and easily the structure equalizes air pressure changes to the outside ambient air.

Electrical system sensor—Electrical system sensor 90 detects the operational parameters of the structure's electrical system. Readings from sensor 90 could be used to determine if the voltage is (persistently) too high, too low, or if the voltage frequently drops and/or spikes. Such conditions may suggest that the dwelling 300 is at risk for fire. Other types of electrical measurements could be taken, such as readings of current flowing through the electrical system. Still other types of electrical measurements could be determined include how energy is used and at what times of day it is used, etc.

Structural sensor—Structural sensor 90 may be configured to detect the (changing) conditions of the structure's elements (e.g., support beams, floors, ceilings, roofs, walls, etc.). Structural readings from one or more locations inside and/or outside the structure could thus be recorded by sensor 90 and transmitted to management module 105.

Environmental Sensor—Environmental sensor 90 may be configured to detect various environmental conditions relating to dwelling 300, such as the air quality present in the structure, the presence of mold/bacteria/algae/lead paint or any contaminant adverse to human health (whether airborne or attached to a portion of the structure of the structure).

Camera Sensor—Camera sensors may be configured to detect various wavelengths, including without limitation visible light, infrared, and thermal. Moreover, camera sensors may include visible light cameras, infrared cameras, two-dimensional (2D) cameras, three-dimensional (3D)

cameras, radar-capable sensors, aerial imagery, thermal images, sensors that detect other wavelengths, and/or any combination thereof. It is contemplated herein that multiple 2D cameras may be used in cooperation and/or conjunction such that the location of detected objects may be determined, such as, again for exemplary purposes and without limitation, a common 3D camera configuration (e.g., two 2D cameras located a few inches apart horizontally), and a different 3D configuration (e.g., two 2D cameras located a few inches apart vertically, two or more 2D cameras located at different known locations such that the location of commonly detected objects can be calculated).

Although various camera types are illustrated in FIG. 1 and described below, the camera types described and shown herein are not intended to be exhaustive as embodiments of the present disclosure may encompass any type of known or unknown camera type which facilitates the purposes and objectives of the certain illustrated embodiments described herein. Exemplary camera types include but are not limited to:

Visible light two-dimensional (2D) camera—Generally speaking, this is the camera that is commonly used. This type of camera produces a 2D image of the visible light received and detected by the camera.

Visible light three-dimensional (3D) camera—In one embodiment, this camera comprises a pair of 2D cameras that are capturing approximately the same content, but from different perspectives. The two cameras may be the same vertical distance from the ground and a few inches apart horizontally, similar to how peoples' eyes are separated. However, it is contemplated herein that the cameras may have any arrangement, including, without limitation, only vertical differentiation, both vertical and horizontal differentiation, and/or three or more cameras. It is further contemplated herein two or more cameras may share a common lens, to the extent that such is practicable.

Infrared camera—Such a camera would record, detect, and communicate imagery of infrared emissions in its field of view. It is contemplated herein that such a camera may be specially designed to record infrared imagery, it may be a "normal" camera with a special filter designed to facilitate infrared imagery, it may be a "normal" camera re-equipped to detect infrared imagery, and/or any configuration and/or means for capturing infrared imagery as known in the art.

Infrared 3D camera— A combination of cameras that detect infrared emissions, that are typically, although not necessarily, operated in tandem and/or cooperation. As with visible light 3D cameras, the infrared 3D cameras may be arranged in any positions as known and/or practiced by those skilled in the art.

Multi-function camera—This camera, as the name suggests, performs a plurality of functions, such as, for exemplary purposes only and without limitation, a 2D visible light camera and a 2D infrared camera, a single camera that captures both visible light and infrared, a camera that captures wavelengths other than infrared and visible light, and/or any combination thereof.

Aerial imagery camera—This camera is mounted on an airplane, unmanned aerial vehicle (UAV), satellite, or another device that can take pictures of the dwelling from the sky. These cameras can provide a unique perspective of the dwelling that a picture from the ground cannot. The angles the that are taken in this manner can include by are not limited to nadir (looking straight down at the dwelling) and all sides of the dwelling.

Camera images from Smartphone or other smart device—this camera can capture metadata about the direction, GPS coordinate and other data elements about the picture. The pictures can be taken by the insured, by the insurance company or a 3rd party company.

Thermal imagery camera—It is contemplated herein that imagery captured by cameras 92 includes, for exemplary purposes only and without limitation, still picture cameras, video cameras, filtered cameras (e.g., only certain wavelengths, such as visible light green, visible light red, certain wavelengths of non-visible light), and/or combinations thereof.

It is contemplated herein that sensors may collect informatics related to the property at which they are located, structure(s) thereon, objects therein, such as appliances. With respect to objects, it is contemplated herein that objects may include appliances, vehicles, and/or anything to which warranty coverage may be applicable. Exemplary appliances include, for exemplary purposes only without limitation, washing machine, dryer, dishwasher, oven, stove, air conditioning, fans, water heater, heater, vacuum system, coffee machine, microwave, toaster oven, (de)humidifier, refrigerator, clothing iron, radiator, sewing machine.

Multi-function computing devices—Multi-function computing devices 90 include, for exemplary purposes only and without limitation, smart phones, tablets, cellular phones, laptops, desktops, webcams, smart TV camera devices (and other appliance camera devices), and/or similar devices. Such devices may passively contribute (e.g., periodically gather informatics and communicate it to management module 105 without user action) and/or actively contribute (e.g., the user should proactively gather data and/or proactively send the data after it has been gathered, the gathering being proactive and/or passive).

With exemplary sensors 90 and cameras 92 identified and briefly described above, and as will be further discussed below, it is to be generally understood an insurance customer's agreement to install and/or allow sensors 90 usage, and/or sharing of informatic data relating to a dwelling, may be related to an insurance company's decision to change a setting of the insurance policy in such a way as to benefit the customer. In another embodiment, sensors 90 and cameras 92 preferably record certain data parameters relating to products and services provided by an insurance carrier to determine and/or utilize discovered information, such as by amending or proposing to amend the terms of an insurance policy alterations and other value added services such as those described below. It is to be understood and appreciated the aforementioned sensors 90 and cameras 92 may be configured as wired and wireless types integrated in a networked environment (e.g., WAN, LAN, Wi-Fi, 802.11X, 3G, LTE, etc.), which may also have an associated IP address. It is to be further appreciated the sensors 90 may consist of internal sensors located within the structure of a structure; external sensors located external of a structure; sound sensors for detecting ambient noise (e.g., for detecting termite and rodent activity, glass breakage, intruders, etc.); camera sensors (e.g., visible light, infrared light and/or any wavelength) such as those consisting of camera standalone devices, or by integrating into existing camera devices in a structure. It is to be further appreciated cameras 92 be placed anywhere in and around an insured property, including without limitation, on a structure, within the structure, on the ground, in the ground, on or in an artificial stand, and/or on or in a tree or other naturally created structures.

It is additionally to be understood and appreciated that sensors 90 and cameras 92 can be networked into a central computer hub (e.g., device 300) in a dwelling to aggregate collected sensor data packets or sensors 90 and cameras 92 may be communicatively connected to other sensors 90 and cameras 92 and/or dwelling computing device 300 (e.g., hard wired to either). Aggregated data packets can be analyzed in either a dwelling computer system (e.g., dwelling computing device 300) or via an external computer environment (e.g., management module 105). Additionally, it is to be understood data packets collected from sensors 90 and cameras 92 can be aggregated in dwelling computing device 300 and sent as an aggregated packet to management module 105 for subsequent analysis whereby data packets may be transmitted at prescribed time intervals (e.g., a benefit is to reduce cellular charges in that some dwellings may not have Internet access or to send during low internet usage hours).

In accordance with an illustrated embodiment, in addition to the dwelling computing device 300 may additionally be coupled to a clock which may keep track of time for sensors 90 and cameras 92, thereby allowing a given item of data to be associated with the time at which the data was captured. For example, sensors 90 and cameras 92 may recurrently capture readings of temperature, wind speed, humidity, appliance operating times, etc., and may timestamp each reading. The time at which the readings are taken may be used to reconstruct events or for other analytic purposes, such as those described herein. For example, the timestamps on wind speed readings taken during a hurricane may allow it to be determined, after the hurricane has occurred, how quickly the wind speed rose in the vicinity of the structure.

A storage component may further be provided and utilized to store data readings and/or timestamps in sensors 90 and cameras 92. For example, a storage component may include, or may otherwise make use of, magnetic or optical disks, volatile random-access memory, non-volatile random-access memory, or any other type of storage device. There may be sufficient data storage capacity to store several hours or several weeks of data readings. For example, the severe part of a hurricane might last for half a day, a full day, or several days. A storage component might have sufficient storage capacity to allow twelve or more hours of readings to be stored, thereby allowing forensic reconstruction of how the hurricane affected the structure during the full time that the structure was experiencing the hurricane's impact.

A communication component may further be provided and utilized to communicate recorded information from dwelling computing device 300 to an external location, such as management module 105, which may be associated with an insurance carrier. The communication component may be, or may comprise, a network communication card such as an Ethernet card, a Wi-Fi card, or any other communication mechanism. However, the communication component could take any form and is not limited to these examples. The communication component might encrypt data that it communicates, in order to protect the security and/or privacy of the data. Additionally, data from sensors 90 and cameras 92, a computerized clock and/or a storage component may be communicated directly to management module 105, via network 50, thus obviating or mitigating the need for dwelling computing device 300.

Management module 105 may include, or otherwise may cooperate with, retrieval engine 110. Retrieval engine 110 receives information from sensors 90, cameras 92, and/or dwelling computing device 300. In one embodiment, retrieval engine 110 sends a query to dwelling computing device 300 to respond with data generated by sensors 90 and cameras 92. In another embodiment, retrieval engine 110 sends a query to sensors 90 to retrieve data they generated. In yet another embodiment, sensors 90 and cameras 92 send data to retrieval engine 110 as the data is generated. In still another embodiment, sensors 90 and cameras 92 store data and periodically (e.g., every night at 3:00A.M.) send to retrieval engine 110. However, such is not an exhaustive list of methods of communicating data from sensors 90 to retrieval engine 110, and it is contemplated herein that data may be sent in any way as known in the art, including permutations of methods described herein. In yet another embodiment, retrieval engine 110 monitors which sensors 90 are actively sending data to management module 105, including which sensors 90, if any, have been installed.

In one embodiment a single instance of management module 105 receives communications from sensors 90 and cameras 92 at a plurality of structures/locations (e.g., thousands of sensor locations communicating to a single management module 105, thousands of camera locations either from aerial photography or from the ground communicating to a single management module 105), however it is contemplated herein that any permutation of sensor(s) 90, camera(s) 92, and management module(s) 105 may be utilized as would be readily understood by those skilled in the art.

In still another embodiment, data received from sensors 90 is utilized to change, or consider changing the policy's settings and/or sending a notification.

Management module 105 may further include data engine 120 that analyzes data that has been generated by sensors 90 and cameras 92. Data analysis engine 120 may apply business rules to determine if conditions have been met to alter terms an insurance policy, such as lowering the deductible payments for an insurance policy. In one embodiment, policy settings may be changed based on the fact that sensors 90 have been installed, and the amount/type of the change may be based on how many sensors 90 were installed and/or what type of sensors 90 were installed. In another embodiment, policy settings may be changed based on the type and content of data received from sensors 90.

Informatics-Based Adjustments

For exemplary purposes only, if humidity sensors 90 in the structure's basement detect consistently low levels of humidity, such may indicate a water-tight seal in the basement, and such may be sufficient to lower the deductible (e.g., lowering the deductible for all claims, or lowering the deductible for all water damage claims, or lowering the deductible for water damage claims in the basement alone). In another example, if temperature sensors 90, possibly in combination with (infrared) cameras detect that point sources of heat/fire (e.g., candles, hot plates, toaster ovens, oven, stove, grill, space heater) are never and/or rarely operated outside the presence of an attendant person, then such may be sufficient to lower the deductible (e.g., for all claims, for only fire damage claims, for only fire damage claims caused by point sources of heat/fire).

In yet another example, if gas detection sensor 90 detects low and/or non-existent levels of certain types of gasses (e.g., propane, natural gas), such may indicate that the gas fixtures have been welded correctly, and such may be sufficient to lower the deductible (e.g., all claims, just fire-related damage claims, just fire-related damage claims caused by the gas being tested). In still another example, if gas detection sensor 90 detects low and/or non-existent levels of certain types of gasses (e.g., gasses that may leak into the basement through the wall such as radon) in the basement and/or the structure, such may indicate good waterproofing of the basement and/or a lack of cracks in the structure's support walls and foundation, and thus that may be sufficient to lower deductibles (e.g., for all claims, for only gas related claims, for only water damage claims, for all stability type claims such as those related to damages caused by earthquakes).

In another example, electrical sensor 90 or plumbing sensor 90 may indicate that the electrical system or the plumbing system, respectively, are operating (well) within normal parameters, and thus such data may be interpreted, by data analysis engine 120, as worthy of lowering the deductible (e.g., for all claims, just claims caused by the electrical system, just claims caused by the plumbing system).

In even another example, air pressure sensor 90, air speed sensor 90, and camera 92 may, working independently or in concert, indicate that the chance of a weather-related damage is low, and thus lower the deductible. One such situation may be if air speed sensor 90 indicates high speed winds occur infrequently. Another such situation may be if camera 92 indicates that no/few trees and/or other things are within range of falling on the structure in the event of (severely) adverse weather. Another such situation may be if air pressure sensor 90 indicates that rapid changes in air pressure are rare/infrequent, or the air pressure never/infrequently falls below a certain threshold (e.g., 980 millibars (mb), 985 mb, 990 mb, 1,000 mb).

Management module 105 may further include command generation engine 130.

Command generation engine 130 may send commands to sensors 90. Such commands may be sent through intermediary dwelling computing device 300, or such commands may be sent directly to sensors 90. Such commands may include, for exemplary purposes only and without limitation, an instruction to take an immediate reading, an instruction to take a series of readings (e.g., every five minutes for one hour, every minute for one week), an instruction to take more frequent readings (e.g., every hour rather than every six hours), an instruction to take less frequent readings (e.g., every day rather than every hour), and/or any permutations or derivations thereof as will be known by those skilled in the art.

Data engine 120 may also apply business rules to identify manuals related to an appliance that informatics has been communicated about, scheduling a repair for an appliance that informatics has been communicated about, sending a message to change a setting of an appliance that informatics has been communicated about, and/or sending a message about a repair and/or alteration including instructions on attending to such repair and/or alteration.

In one embodiment, informatics is gathered about one or more items in a house, such as an appliance. The type of the appliance may be identified by data engine 120, and manuals relating to the appliance may be identified and electronically sent, such as to the owner of the appliance. Particular reference to a portion of the manual may be specifically identified and/or provided regarding an action to be taken.

In another embodiment, informatics is gathered about an appliance and that informatics is analyzed to determine a working condition of the appliance. For exemplary purposes only, the informatics may relate to a sound that the appliance is making (e.g., a clicking sound may indicate that the appliance is broken), the informatics may relate to a length of time that certain actions require as compared to a previous length of time that the same or a similar action required (e.g., previously it was five minutes for the temperature of ambient air in a freezer to stabilize after it was opened to remove an object, but now it is six minutes), infrared readings of the object (e.g., detecting a greater heat leakage in the seals of a refrigerator, detecting an increased high temperature for a dryer, detecting an increased amount of time for an object, such as a washing machine, to cool down). Based on the gathered and analyzed informatics, a repair service appointment may be scheduled. It is also contemplated that once repair service is necessary an insurance company such as USAA can assist the owner of the appliance in scheduling the appointment using a contractor network or other network known to by the insurance company.

In another embodiment, based on the gathered and analyzed informatics, a message may be sent that recommends and identifies a setting change for an appliance (e.g., reduce HVAC burden, increase operating temperature of refrigerator because of sub-optimally performing cooling mechanism). It is also contemplated that advice and guidance can be provided to the insured by the insurance company based upon the gathered analyzed informatics about the appliance. This advice and guidance can be used to help extend the life of the appliance or help with scheduled maintenance.

In another embodiment, the informatics gathered using data engine 120 and this data can be compared to how the appliance is intended to perform as prescribed by the manufacturer. This information can be gathered from the manufacturer, from the manuals about the appliance, or other sources. When the appliance does not perform as intended by the manufacturer the insurance company or the appliance owner can be alerted. For example, the washing machine is intended to use X amount of water per minute. But the sensor in the appliance determines that a higher than acceptable amount of water is being consumed this could indicate that the appliance is in need of repair and is in danger of breaking and causing water damage to the surrounding area.

In still another embodiment, a work project is identified based on gathered informatics. For exemplary purposes only, the work project may be painting a wall, creating an addition, replacing an appliance, finishing drywall, waterproofing a basement, and replacing and/or upgrading a roof. Subsequent to data engine 120 determining and identifying the work project, that determination may be utilized to inform and/or cause future decisions/recommendations.

In yet another embodiment, sensors can determine if recoverable depreciation in a claim for a covered loss can be provided to the insured. An example of how this could occur is a sensor 90 can send notification to the data engine 120 that the insured has replaced, repaired or maintained an item in question with like kind and quality or item(s) of similar quality and usefulness. When this happens, the insurance company is notified and can provide the insured recoverable depreciation.

Camera-Based Adjustments

In some embodiments, the data analysis engine 120 may also analyze data that has been generated by cameras 90. As such, the data analysis engine 120 may utilize received imagery to determine conditions that exist at the insured property, changes to conditions, hazards to the dwelling, material recognition, object recognition, and/or, possibly with the cooperation of policy analysis engine 140, compare the determined conditions to an insurance policy.

In one embodiment, imagery is gathered by cameras 90. Such cameras may detect visible and/or infrared light, may record 2D or 3D imagery, and may record thermal imagery. Further, it is contemplated herein that an already installed camera that has been redesigned and/or reconfigured to function with the embodiments described herein.

In another embodiment, the imagery is analyzed to determine if vandalism has occurred. This analysis may include identifying a change of color between a recent image and an image previously taken. Or the analysis may include identifying a change in the moisture level using thermal imagery. This analysis may also include identifying a change to the structure (e.g., a hole in a wall), which may include merely analysis of 2D imagery, may include analysis of 3D imagery, and/or it may include analysis of thermal imagery.

In yet another embodiment, the imagery is analyzed to determine if an alteration has been made to the property. The alteration detected may include replacing/adding/removing an appliance, adding/renovating a room, and/or enlarging a room. The alteration may also include damage, such as damage caused by a weather event. The damage caused by a weather invent may include damage to a structure (e.g. window knocked out or cracked, roof torn apart, a wall with a hole, a wall that has been knocked over, and damage to a wall). The analysis may be conducted by viewing a single image, thermal image, by viewing several images taken approximately contemporaneously, comparing image(s) to previous images to detect changes, comparing image(s) to the terms of an existing insurance policy, and comparing image(s) to the terms of an application for an insurance policy.

In one or more embodiment, multiple pictures may be taken and stored for any period of time, up to and including permanent storage.

In another embodiment, imagery is analyzed through object recognition to determine a value for an object in the imagery (e.g., the value of a piece of jewelry, the value of an appliance, such as a TV). The visually appraised value may be compared to previous imagery of that object, such as to detect a change in "current" value. The visually appraised value may be compared to the terms of an insurance policy, and/or the visually appraised value may be compared to an application for an insurance policy. For exemplary purposes only, imagery may have utilized to detect and calculate the visually appraised value for one or more objects in a structure (up to and including all objects in the structure), compare the visually appraised value(s) to the terms of an insurance policy, and potentially send a notification if the visually appraised values exceed the terms of the insurance policy. Similarly, a notification may be sent if the visually appraised value exceeds the terms in an application for an insurance policy.

In another example, the camera images of the dwelling, gathered either on the ground by the insured, the insurance company, or a 3rd party or taken through aerial imagery can use object recognition to categorize the dwelling characteristics to visually appraise the replacement rebuild cost value or market value of the dwelling. The visually appraise the replacement rebuild cost value or market value of the dwelling can be without objects/items within the property or with objects/items within the property. The corresponding analysis and comparison to insurance may indicate whether to send a notification to the insured so that the insurance amount can be adjusted. The insurance company can also use this information captured to automatically adjust the insurance amount either at the policy issue, when the image is gathered, when the image is provided to the insurance company, or at the next policy renewal. In still another embodiment, the imagery may be analyzed to determine a number of occupants of the residence and/or the habits and trends of occupants in a dwelling. For example, the imagery may be focused on identifying when certain individuals leave a dwelling, and these times could be correlated with the time of the day (e.g., if a person arrives before midnight and leaves after 5A.M., they may be presumed to have slept there). Continuing this example, the system may count how often certain individuals sleep at the dwelling, and compare that to a threshold (e.g., 10 times in a month, 30 times in a 3-month period, 100 times in a year). Still continuing this example, rather than identify specific individuals, the system may merely track the number of people that sleep in the dwelling, and based on that information determine how many occupants reside in the dwelling.

In another example, the imagery may be focused on determining the number of hours individuals are in the dwelling (whether it be daytime or nighttime), and based on that information determine how many occupants reside there. Similar to the other example, the analysis may be focused on distinguishing between people to identify who is within the dwelling, or the analysis may be focused on merely counting how many people are within the dwelling.

Continuing with this embodiment, the occupant count may be compared against an insurance policy and/or an application for the same. Based on the comparison, a notification may be sent (e.g., if the policy describes three occupants, but there appear to be nine occupants, then a notification may be sent to the insurer). Further, it is contemplated herein that "occupants" may include people and/or pets.

In even another embodiment, the location of a heat source (e.g., candle, toaster oven, oven, stove, hot plate, electric kettle, space heater, water heater, appliance, electric charger) may be determined, such as by analyzing a 3D infrared image and/or by analyzing one or more infrared images. In one example, the temperature of a nearby item (e.g., wooden shelf) is measured when the heat source is not activated (e.g., unlit candle, room temperature oven, stove, hot plate, kettle, heater, appliance, electric charger). Subsequently, when the heat source is activated, the temperature of the nearby item is again measured. Based on a comparison between the two temperature measurements, a notification may be sent. Alternatively, a notification may be sent based on solely the temperature of the item when the heat source is activated. In yet another alternative, a notification may be sent based on a combination of the comparison and the second temperature.

In another embodiment, a distance between a heat source and an object is determined, and based on a comparison of the distance and a predetermined threshold (e.g., two feet) a notification may be sent. Alternatively, the predetermined threshold distance may be associated with the temperature of the heat source (e.g., 200 degrees means the threshold is one foot, 250 degrees means the threshold is two feet). Continuing with this alternative, the threshold distance may be based on (1) the temperature of the heat source, and (2) the flammability of the nearby object (e.g., the threshold distance is three feet for 200 degrees and if the nearby object is paper, and the threshold distance is one foot for 200 degrees and if the nearby object is metal).

It is contemplated that the location of any object, heat source or otherwise, may be calculated based on imagery such as, for exemplary purposes only and without limitation, a 3D image, one or more images (visible light, infrared, or otherwise). Thus, for example, the distance between a heat source and an object may be calculated based on first identifying/calculating the location of both the heat source and the object.

It another embodiment, a heat source is identified. For example, if an object is a higher temperature than surrounding objects, and a meaningful temperature differential is maintained, data analysis engine 120 may identify the object as a heat source. Further, if the heat source is moved, data analysis engine 120 may identify a new location for the heat source. Along those lines, and continuing the example, if the heat source is moved closer to an object, or if an object is moved closer to a heat source, system 100 may compare a predetermined threshold to the new distance between the heat source and the object, and, based on the comparison, send a notification. The notification may include, for exemplary purposes only and without limitation, an alert to a person associated with the structure (e.g., owner and/or resident), an alert to the insurance company that unsafe conditions may exist, and/or a combination thereof.

Another embodiment could include using an analysis engine 120 associate to the camera images of the inside or outside the dwelling that can recognize risks in the exterior or interior of the home. When these are identified the insurance company can provide advice and mitigation opportunities to the insured so that the chance of damage is reduced. For example, the camera image can identify that the insured has a tree branch touching the roof which can cause the roof to wear quickly when the branch moves and rubs against the roof. The analysis engine 120 could identify this and the insured would be notified that there is a risk and how to correct the risk. The camera images collected in the analysis engine 120 could also be used for acceptability, underwriting, and pricing.

In another embodiment, the camera could be fixed to an airplane, UAV, satellite or another device that will allow images from the sky above the home. These images can capture roof geometry, roof material, exterior siding material and other features about the home. These images can be used to establish how much to insure the home, risks associated and more. The camera images from above the home can identify risk hazards like hail damage to the roof and allow the transmission of this information to the insurance company. The insurance company can use this information, like whether the home has previous hail damage to the roof, to help with the underwriting and acceptability guidelines.

Another embodiment could include the insured, insurance company, or a 3rd party company taking pictures of the dwelling using a Smartphone of other camera that can capture metadata like the GPS coordinate, direction, etc. The insurance company can use the camera images captured to create a digital blueprint of the home. This digital blueprint can be used to create a graphical representation of the home for use by the insurance company. It can be used to display the digital blueprint to the insured on the company's website or other portals to the insured. The digital blueprint can also be saved to help with claims handling if there is a claim on the home. The insurance company can look at the pictures and location of objects in the home and know what the pre-loss status of the home was so that the insurance company can help the insured restore the home to pre-loss status. Another use of the camera images for the digital blueprint can be to develop an insurance amount on the home. The camera images can have object recognition capabilities and know whether the countertop is, for example, granite or concrete and use this information to establish an insurance amount.

Management module 105 may further include command generation engine 130. Command generation engine 130 may send commands to sensors 90 and cameras 92. Such commands may be sent through intermediary dwelling computing device 300, or such commands may be sent directly to sensors 90 and cameras 92. Such commands may include, for exemplary purposes only and without limitation, an instruction to take an immediate reading, an instruction to take a series of readings (e.g., every five minutes for one hour, every minute for one week), an instruction to take more frequent readings (e.g., every hour rather than every six hours), an instruction to take less frequent readings (e.g., every day rather than every hour), an instruction to change the location and/or shooting angle of camera 90, and/or any permutations or derivations thereof as will be known by those skilled in the art.

Management module 105 may further include policy engine 140. Policy engine 140 may analyze the data such as described above with respect to data engine 120. It is contemplated herein that data engine 120 and policy engine 140 may work in cooperation/tandem, independently of each other, without interaction with the other, or any other permutations or derivations thereof as will be known by those skilled in the art.

In one embodiment, policy engine 140 accesses a database that contains information about insurance policies and/or applications for insurance policies. However, it is contemplated herein that policy engine 140 may access/retrieve/receive said information by any means as known by those skilled in the art.

In another embodiment, policy engine 140 is responsible for some (including, in some embodiments, all) of the comparison between insurance information and information gleaned from imagery.

Upgrade Sensors

For exemplary purposes only, in one embodiment, if an insurance customer agrees to install and/or upgrade a sensor 90 at an insured property, then the policy may be eligible for a policy setting change.

In one or more embodiments, the policy setting change may include, for exemplary purposes only and without limitation, lowering a deductible payment for an entire insurance policy, lowering a deductible payment for one or more aspects of an insurance policy, lowering a premium for an insurance policy, increasing a coverage amount for an insurance policy (e.g., for the entire policy, for just one or more aspects of the policy), adding a coverage area (e.g., adding water damage), and adjusting a coverage type (e.g., adjusting a policy that just covers water damage from leaky pipes and adjusting it to also cover flood damage, such as from weather events).

In another embodiment, a customer enrolls in a policy and/or policy change whereby if/when they agree to install a sensor 90 at an insured property, the customer's insurance policy may be affected by an insurance policy setting change. The customer may enroll in the policy (change) via receiving an invitation to enroll, and accepting that invitation.

In yet another embodiment, if/when the customer agrees to a change to the sensor(s) 90, a second policy setting change is implemented. For exemplary purposes only, the customer may agree to upgrade a sensor 90 already onsite (e.g., upgrading a camera 92 to measure both infrared and visible light), the customer may agree to add an additional sensor 90 (e.g., adding a second camera 92).

In still another embodiment, the type and/or amount of the change to the insurance policy is, at least in part, based on the sensor 90 that was installed and/or upgraded. For exemplary purposes only and without limitation, if the sensor 90 is an infrared camera 92 the policy change may be more beneficial for the customer than if the sensor 90 is a visible light camera, or if the camera 92 is 3D the policy change may be more beneficial than if the camera 90 is 2D, or a combination of sensors 90 (e.g., motion, visible light and infrared) at certain locations (e.g., at every opening such as a door or window) may cause a policy setting change that is more beneficial to the customer than if the coverage is less thorough.

In yet another embodiment, the type and/or amount of the change to the insurance policy may be, at least in part, based on a certain percentage of the insured structure and/or the surrounding area that the sensors can detect (e.g., 20%). In this embodiment, there may be thresholds of coverage that cause certain policy setting changes.

Further continuing with this embodiment, different sensors may be weighted different amounts. For exemplary purposes only, a 2D visible light camera may be weighted to count as 20%, a 3D visible light camera may be weighted to count as 30%, an infrared camera may be weighted to count as 15%, a 3D infrared camera may be weighted to count as 25%, and a motion sensor may be weighted to count as 10%. Continuing with these examples, if a 2D visible light camera detects 50% of the insured property, given that, in this example, 2D visible light cameras are weighted at 20%, the weighted coverage amount of coverage is 10% (i.e., 50% times 20%). Still continuing with this example, if a 3D visible light camera and a 3D infrared camera each detect 50% of the insured property, the total weighted coverage amount of coverage is 27.5% (i.e., 50%*30%+50%*25%). The (total) weighted coverage amount may be compared to a threshold (e.g., 5%, 10%, 25%, 50%) to determine the type and/or amount of the policy's setting change.

Management module 105 may further include policy engine 140. Policy engine may implement changes to a policy's settings based on, for exemplary purposes only, if the customer agreed to sensors being installed/utilizing/upgraded, how many sensors are being utilized, a coverage amount of the sensors. Policy engine 140 may also analyze the data such as described above with respect to analysis engine 120. It is contemplated herein that analysis engine 120 and policy engine 140 may work in cooperation/tandem, independently of each other, without interaction with the other, or any other permutations or derivations thereof as will be known by those skilled in the art.

Warranties

Management module 105 may further include data engine 120 that analyzes data that has been generated by sensors 90. Data engine 120 may apply business rules to determine if conditions have been met to generate and/or alter terms of a warranty.

It is contemplated herein that informatics may include any information that may be generated by sensors described herein. For exemplary purposes only and without limitation, such informatics includes the cleanliness of the target object (i.e., the object being considered for warranty), the cleanliness of a second object (i.e., an object other than the one being considered for warranty), the cleanliness of one or more floors in the structure, the cleanliness of one or more windows in the structure, the cleanliness of one or more surfaces in the structure (e.g., countertop), the average temperature in the structure, the average temperature outside the structure, the humidity in the structure, the detection of gasses in the structure, harmful (e.g., radon, carbon monoxide) or otherwise (carbon dioxide, nitrogen), an amount of motion in the structure, such as in the proximate vicinity of the target object, the conditions of the plumbing system, such as compared against the expected and/or calculated stress tolerance thresholds for the plumbing system, wind speed inside or outside the structure, air pressure (changes) inside or outside the structure, the conditions of the electrical system, such as compared against the expected and/or calculated stress tolerances of the electrical system, information about the structure's stability, information related to air born particles, such as mold, or information related to light (e.g., visible light, infrared, radar).

In one example, informatics about an appliance is utilized to inform the terms of a warranty for the appliance. In another example, informatics about a structure is utilized to inform the terms of a warranty for an appliance. In still another example, informatics about a first object is utilized to inform the terms of a warranty for a second object.

In another example, an appliance type is selected (e.g., appliances generally in the kitchen). For a given structure, informatics is gathered about one or more objects at the structure that are of the selected appliance type. A condition score for the appliance type at that structure is generated, and based on the appliance-type score, warranty terms are generated.

In yet another example, informatics are gathered about the target object (for this example, a washing machine) as well as a second object (for this example, a clothes dryer). A condition score is generated for both objects. A relationship score is also generated for both objects, the relationship score indicating how closely related those objects are (e.g., in terms of how common it is for conditions of one to be reflective of the other's condition). A warranty for the target object is generated, and the terms of the warranty is based at least in part on (1) the condition score for the target object, and (2) the combination of (2a) the condition score for the second object and (2b) the relationship score. It is contemplated herein that the terms of the warranty may be 75% based on #1 and 25% on #2; 50% for #1, 25% for #2, and 25% for other factors, or any combination as would be recognized by one skilled in the art.

In one embodiment, a warranty includes a beginning time (e.g., now, the first of the month, after a previous warranty expires), an ending time (e.g., indefinite, some period of time after the beginning), a premium (e.g., a monthly payment offered by the owner of the object covered by the warranty), a coverage amount (e.g., replacement of the object for something of equivalent value, replacement of the object for a new(er) similar object, the value of the object at the beginning of the warranty, the value of the object when it is damaged/totaled), and coverage terms (e.g., only mechanical damage, any type of damage).

Detection-Based Adjustments

Management module 105 may further include data engine 120 that analyzes data that has been generated by detection devices 90. Data engine 120 may apply business rules to determine if damage has occurred, notify an insured party of changed conditions, communicate a coverage amount to the insured party, recommend a contractor to conduct repairs and/or upgrades, schedule a repair and/or upgrade, and/or recommend an upgrade.

For exemplary purposes only, in one embodiment, sensors 90 (e.g., detection devices) are utilized at an insured property. Sensors 90 may be installed at the insured property for utilization with system 100, they may be reconfigured to work in cooperation with system 100, and they may include personal computing devices (e.g., smart phone, tablet). Informatics from sensors 90 may be analyzed by data engine 120 to determine, for exemplary purposes only, what item was damaged (e.g., a wall, a window, a roof, an appliance, furniture), what type of damage occurred (e.g., fire damage, flood damage, rain damage, wind damage), and/or when the damage occurred (e.g., a specific time and/or a range or plurality of times).

In another embodiment, after an event is detected by sensors 90, a notification may be sent to the insured party. For exemplary purposes only, it is contemplated herein that an event may include, damage to the property, a structure on the property, and/or objects in the structure, and/or detecting specified information (e.g., a water level in the basement's sump that is above a threshold, a temperature difference between different portions of the structure, and a (sustained) humidity level in one or more parts of the structure).

In yet another embodiment, an amount of insurance coverage is determined and that amount is optionally communicated to the insured party. For example, if it is detected that the basement flooded, policy engine 140 may analyze and determine if coverage exists and an amount of coverage (e.g., $500,000.00) that the insured party has for water damage and/or flood damage; such information may optionally be communicated to the insured party and/or identified recipients (e.g., other residents/employees at the insured property). Further, it is contemplated herein that the notification of the event and the amount of coverage may be sent in the same message or successive messages. Continuing with this example, if the basement flooded, policy engine 140 may identify a section of an insurance policy that relates to the water damage, and language from that section may be sent and/or paraphrased and sent to the insured party. It is important to note, that when the notification is sent, that it explains the policy and if it would or would not be a covered loss based on the cause of loss.

In even another embodiment, after damage is detected via informatics, a recommendation for a contractor repair party may be generated and sent to the insured party. The recommendation may be at least partly based on the damage amount and/or type. For example, if the damage was a leaky pipe that flooded a bathroom and leaked into the floor below, one recommendation may be for a plumber to fix the pipe (however explaining that based on the cause of loss, the pipe repair itself may not be covered by insurance), and another may be for a general contractor to fix any damage resulting from the water (in this example two recommendations are generated and sent to the insured party, but it is contemplated herein that a single event may lead to any number of recommendations, including one or more). Further, the recommendation may be at least partly based on the coverage amount for the detected damage. For example, if the coverage amount is relatively high, then both a plumber and general contractor would be called. However, if the coverage amount is lower, then perhaps only the plumber would be called, or perhaps a less-expensive plumber would be called.

In another embodiment, and continuing with the water damage example solely for simplicity and continuity, the repairing party (e.g., plumber, general contractor) may be contacted at contractor computing device 300 with a message. The message may include, for exemplary purposes only, the location of the insured property (e.g., street address), the location of the damage in the house (e.g., the first floor bathroom), the type of damage, the items damaged (e.g., floor, walls), an estimated amount for the cost to repair, a pre-authorized amount of work that the contractor is authorized to perform (e.g., up to $750 in labor and $175 in parts, explaining what is covered and what is excluded), and a request for available times. Continuing with this embodiment and example, one or more available time periods for the contractor may be forwarded to the insured party, and the insured party may confirm and/or select one of the time periods to schedule repairs. Thus, the insured party's response is received by system 105 (e.g., a text, an email, a phone call to a representative at an insurance company), and subsequently, the contractor is confirmed to conduct repairs at the selected/confirmed time period. Such confirmation may include a legally binding obligation, by the insurance company to the contractor, to pay the contractor for the relevant work and parts for what is covered under the policy.

Alternatively, it is contemplated herein that the customer may propose a time or a time period that is communicated to one or more contractors, and subsequently one of the contractors agrees to the time or time period for repairs.

In another embodiment, detection devices 90 may detect a condition that warrants proactive adjustments by the insured party. In one example, sensors may detect that the water level in and around a basement (e.g., a basement's sump) is rising above a threshold, and that the insured party should improve their sump pump (e.g., increase its bandwidth, lower the level it draws water from). In another example, the sensors may detect the capacity of a hot water heater (e.g., 50 gallons), and they may further detect that a small amount of that water is utilized (e.g., over a three month period there is never less than 25 gallons of hot water remaining), and based on that information, a notification may be sent to the insurance company and/or the insured party that the working capacity of the hot water heater may be reduced.

In still another embodiment, an electronic interface is provided by management module 105. The interface may provide historical, real-time, and/or near real-time display of data readings by detections devices (e.g., which lights are on, which motion detectors have detected movement how recently, which cameras have detected movement how recently, which cameras have detected which people how recently, a chart of humidity levels, a chart of temperature readings, a chart of available hot water, an identification of when and how often which electrical circuits are utilized at or near capacity, and/or a (persistently) increasing amount of harmful gasses detected even if the amount detected is currently below a predetermined dangerous threshold).

In even another embodiment, upon informatics being sensed by detection devices 90 and communicated to management module 105, policy engine 140 may immediately start generating an insurance claim. Subsequently, the insured party may be notified that an insurance claim is processed, and the notification may include, for exemplary purposes only and without limitation, a description of the damage, images of the damage, the relevant portion of an insurance contract/provision, the amount of coverage (to include any explanation of recoverable depreciation), any coverage exclusions, and a financial instrument that covers the insured damages (it is contemplated herein that the check may include cash, a check, a direct deposit, or any other means of transferring money as known by those skilled in the art).

Policy Term Adjustments

Data engine 120 may also apply business rules to determine terms of a policy, the terms including, for exemplary purposes only and without limitation, a coverage amount of the policy, a time period for the policy, and an identification of items and/or structures covered by the policy.

For exemplary purposes only, in one embodiment, detection sensors may detect a sticker and/or label on an item, such as an appliance, that is consistent with warranty coverage for the item. The label may identify a coverage for the item (e.g., language such as "three-year warranty") and/or the label may identify a repairing party and when the repairs were performed (in which case, the parts that were worked on may be covered by a warranty provided by the repairing party).

In another embodiment, informatics gathered by detection devices 90 may indicate and/or identify a repairing party, and such informatics may further indicate and/or identify an item that the repairing party worked on.

In still another embodiment, the value of one or more items is calculated based on the informatics. For exemplary purposes only, the value of the item may be calculated based on the visual appearance of the item, the ability of the item to manage and dispense heat (e.g., what temperature a washing machine gets to, which parts of the washing machine get to what temperature, how quickly it cools down, which nearby parts have their temperature affected by it). Continuing with this example, if any of the measurements, such as temperature measurements, are outside of a predetermined threshold, then the estimated value of the item is thus reduced.

In even another embodiment, the value of one or more structures is estimated, the structure(s) being covered by an insurance policy. The value of the structure(s) may be estimated based on visual appearance of the structure, data gathered by one or more air sensors (e.g., whether spores and/or contaminating elements are detected), the value of one or more appliances in the structure(s), and/or the performance of one or more items/appliances in the structure. The informatics may be analyzed to determine a potential liability for the structure(s) and/or items/appliances, and that potential liability may be utilized to identify a term, such as a coverage amount, of a warranty and/or insurance policy relating to the structure(s) and/or items/appliances in and around the structure(s).

In another example, electrical sensor 90 or plumbing sensor 90 may indicate that the electrical system or the plumbing system, respectively, are operating (well) within normal parameters, and thus such data may be interpreted, by data engine 120, as indicative of insurance coverage for water damage and/or fire/electrical damage.

Score-Based Adjustments

Management module 105 may further include data engine 120 that analyzes data that has been generated by sensors 90. Data engine 120 may apply business rules to determine if conditions have been met to configure and/or re-configure terms to an insurance policy (e.g., such as a policy for a structure wherein the informatics are related to another structure and/or a vehicle).

For exemplary purposes only, informatics that relates to a first property may be utilized to determine a score, which is utilized to generate one or more terms of an insurance policy for a target property. It is contemplated herein that both first and target property may each be residential properties, commercial property, industrial properties, vacant lots, and/or any manifestation of real property as would be recognized by those skilled in the art. It is further recognized that a first property may be something other than real property, such as, for exemplary purposes only and without limitation, an appliance and a vehicle (e.g., car, truck, motorcycle, air vehicle, water vehicle).

In one embodiment, the informatics relates to a cleanliness of the first property, a structural element at the first property (e.g., basement, roof, wall) and/or an item at the first property. Alternatively, the informatics may relate to the structural integrity of dwelling or item and the maintenance performed regarding the upkeep of a dwelling, portion thereof or item located therewithin. Pursuant to the cleanliness scenario, it is contemplated herein that cleanliness may relate to how often at least part of the first property is cleaned, how generally clean the item is, and how often and/or quickly the item gets dirty. It is further contemplated herein that the cleanliness determination may be made based on measurements from, such as, for exemplary purposes only and without limitation, sensor 90 that detects visible light, sensor 90 that detects infrared light, sensor 90 that detects particles and/or gasses, and/or sensor 90 that detects wind speed. For example, if an item is generally cleaner than a predetermined threshold, or if the item gets dirty slower than a predetermined rate, the score upon which the policy terms are based may indicate that the terms will be more favorable to the insured.

In another embodiment, the informatics relate to a working condition of an item, such as an appliance, at the first property. For exemplary purposes only, this may be determined by an analysis of how the appliance looks (e.g., visible light, infrared light), an analysis of sounds that the appliance does and/or does not make, an analysis of water/electrical input to the appliance, an analysis of water output from the appliance, an analysis of heat output from the appliance, and an analysis of air particle output, or lack thereof, from the appliance.

In another embodiment, the informatics relates to the age of an appliance at the first property. The age may be determined via any means as described herein and as would be recognized by those skilled in the art. The score upon which policy terms are determined may be based on the appliance's age, or the score may be determined as follows. For exemplary purposes only, a type for the appliance may be identified (e.g., washer, dryer, laundry machine), and based on that type one or more age ranges may be identified. For example, for a washing machine the age ranges may be 0-3 years "New", 3-9 years "Intermediate age", 9-15 years "Old", and 15+ years "Ancient". Based on which age range the appliance's age falls within, the policy's terms may be adjusted either for or against the insured's benefit. As in, if the appliance's age is within the "New" range, the insurance policy for the target property may be adjusted to be more beneficial for the insured (e.g., lower premiums, higher coverage amount, lower deductible, more coverage categories). It is contemplated herein that the age ranges may be any time periods, and it is further contemplated that the number of age ranges may be four and/or any other number of age ranges.

In another embodiment, informatics at the first property indicates that work is being performed at the first property (e.g., necessary structural repair, optional structural repair, remodeling). Based on this information, the resultant terms of the insurance policy for the target property may be adjusted. For exemplary purposes only, if optional structural repairs and/or a remodeling is performed at the first property, the insurance policy terms may be adjusted so as to be more beneficial for the insured, and/or if necessary structural repairs are performed at the first property, the insurance policy terms may be adjusted so as to be less beneficial for the insured. It is contemplated herein that an optional structural repair and/or remodeling is identified based on the heretofore previous working condition and/or stability of the previous appliances, items, and/or structural components.

In another embodiment, informatics may relate to a vehicle. The sensor that collects informatics from the vehicle may be placed on/in the vehicle, and/or the sensor may be placed on a structure and/or property. Independent of the sensor's placement, informatics about the vehicle may be utilized to determine and/or adjust the resultant insurance policy terms for the target property. The informatics relating to the vehicle may include, for exemplary purposes only, the vehicle's working condition, the vehicle's cleanliness, and/or the vehicle's usage characteristics (e.g., age of most common driver, average age of drivers, weighted average age of drivers per time spent with the car, weighted average age of drivers per miles driven). Informatics that indicate generally safer and/or more "well kept" characteristics may result in an insurance policy with terms that are more beneficial for the insured; and conversely, informatics that indicate generally less safe and/or less "well kept" characteristics may result in an insurance policy with terms that are less beneficial for the insured.

Informatics-Based Adjustments

Figure 3:
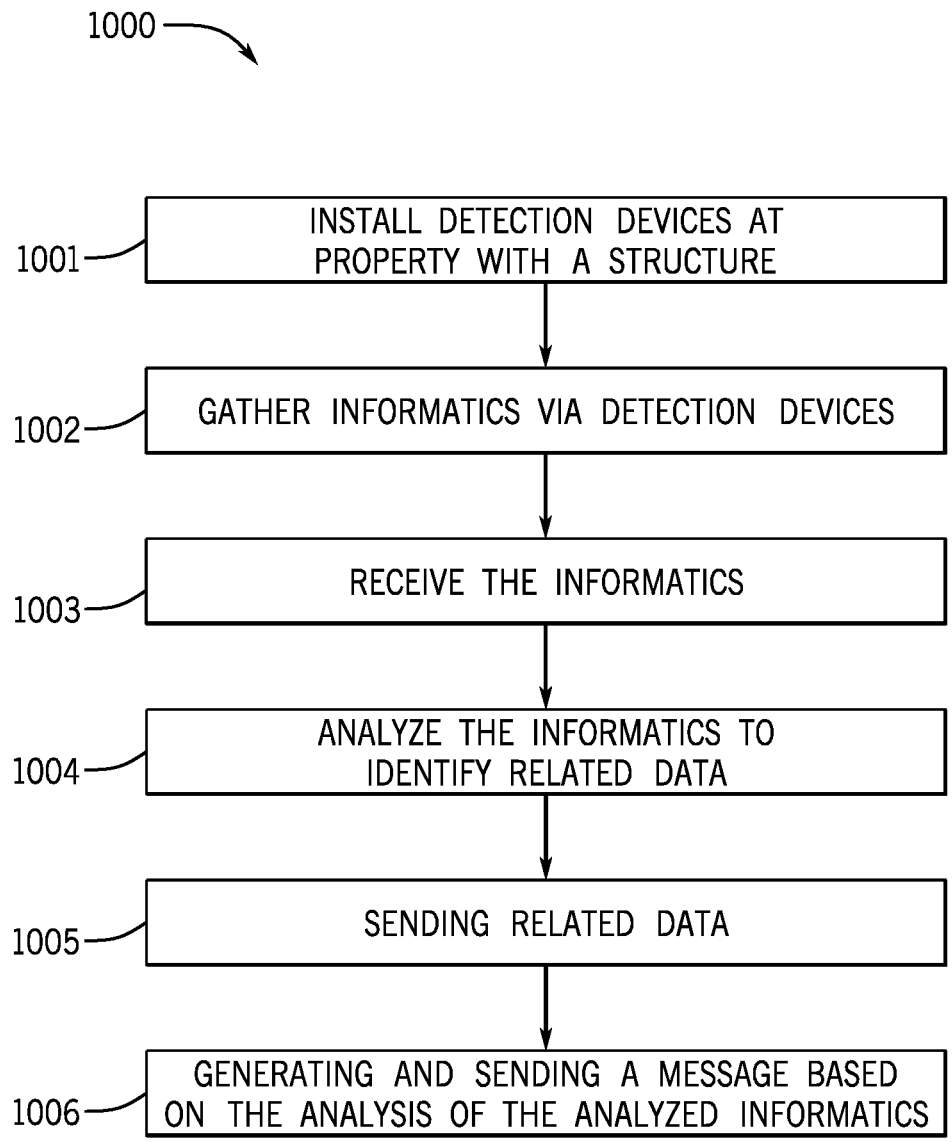
FIG. 3 is a flow diagram of a method for acquiring structural informatics using the system of FIG. 1, in accordance with embodiments presented herein.

Referring back to the figures, FIG. 3 shows, in the form of a flow chart (process 1000), exemplary operational steps of utilizing system 100. Before turning to descriptions of FIG. 3, it is noted that the flow diagram shown therein are described, by way of example, with reference to components shown in FIGS. 1-2, although these operational steps may be carried out in any system and are not limited to the scenario shown in the aforementioned figures. Additionally, the flow diagrams in FIG. 3 shows an example in which operational steps are carried out in a particular order, as indicated by the lines connecting the blocks, but the various steps shown in these diagrams can be performed in any order, or in any combination or sub-combination.

With reference to FIG. 3, starting at step 1001, detection devices, such as sensors 90, are installed at a property, such as a structure, covered by the insurance policy. In one embodiment, sensors 90 may have been previously installed for other reasons (e.g., security cameras) and later re-configured to integrate with system 100. In another embodiment, sensors 90 are installed for at least the reason of integrating with and working with system 100. In still another embodiment, sensors 90 include a combination of pre-installed sensors 90 and newly-installed sensors 90.

Subsequently, information is gathered (step 1002) and received from sensors 90 (step 1003). As discussed above, information may be sent from sensors 90 to dwelling computing device 300, and subsequently to management module 105. In another embodiment, dwelling computing device 300 is not installed onsite and sensors 90 communicate directly to management module 105. In yet another embodiment, dwelling computing device 300 is installed onsite, and sensors 90 communicate directly to management module 105, through dwelling computing device, and/or a combination thereof.

Information is analyzed by management module (step 1004), such as by data engine 120 and/or policy engine 140. In one embodiment, data engine 120 considers the data and identifies appliances and their correlated documentation, such as repair instructions, recommends and/or schedules repair services, and/or provides recommendations based on a valuation of an appliance's working condition.

In one embodiment, command generation engine 130 may send additional commands to sensors 90 and/or dwelling computing device 300, such as via dwelling computing device 300 and/or directly to sensors 90. These commands may alter the types of measurements being performed, the frequency of measurements, the speed/frequency in which information is communicated from sensors 90, and/or any other settings. Subsequent to additional commands being sent to sensors 90, sensors 90 and/or dwelling computing device 300 execute and/or perform the additional commands and send additional information to management module 105. The additional information may be analyzed independent of the previously received information, and/or it may be analyzed and/or correlated with the previously received information.

Related information, such as, for exemplary purposes only and without limitation, maintenance advice, repair instructions, operating manuals, and/or repair services, may be sent (step 1005). Finally, a message, such as, for exemplary purposes only and without limitation, operating advice, may be sent to the operator of the item/appliance (step 1006).

Camera-Based Adjustments

Figure 4:
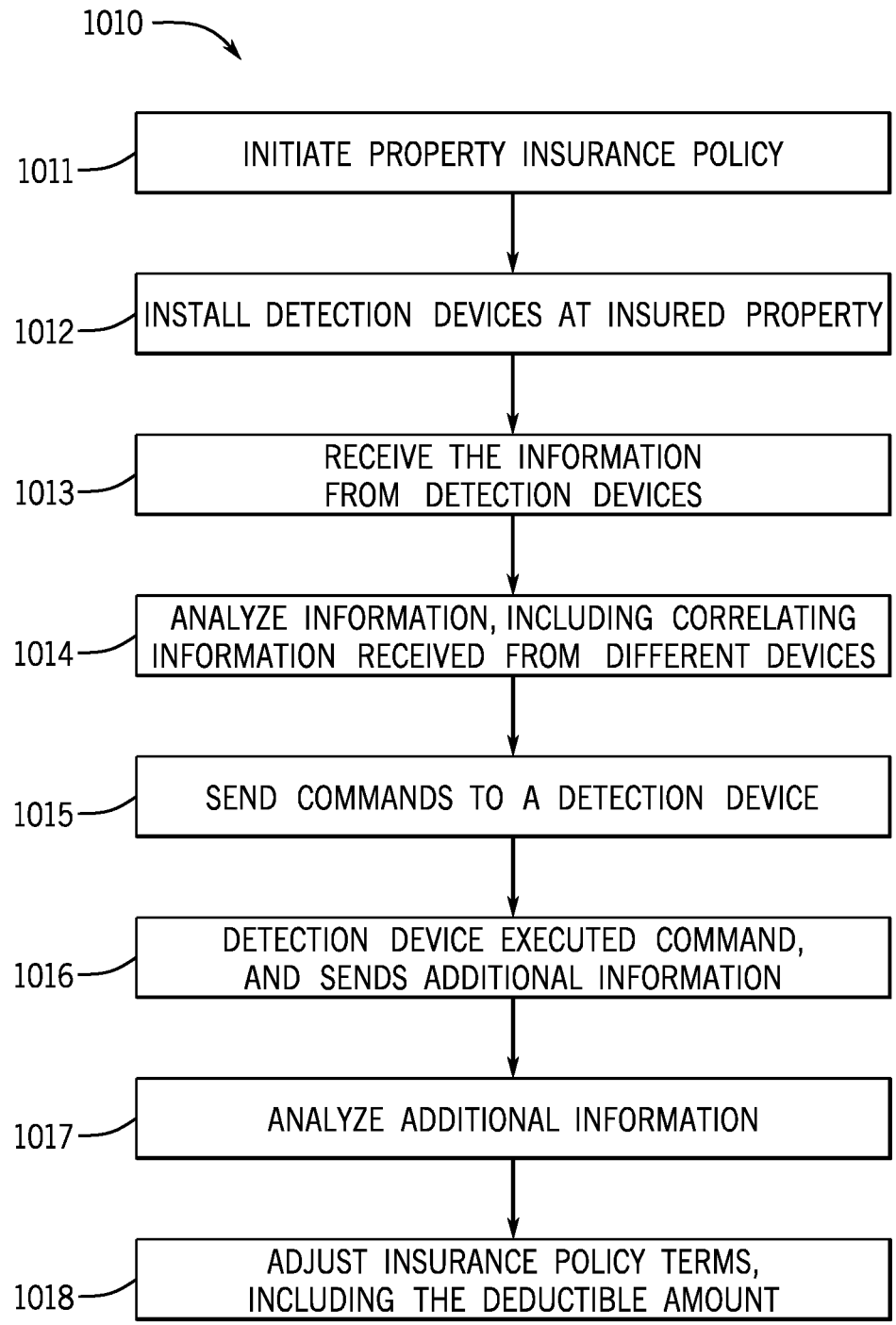
FIG. 4 is a flow diagram of a method for adjusting insurance policy data based on information acquired using the system of FIG. 1, in accordance with embodiments presented herein.

FIG. 4 shows, in the form of a flow chart (process 1010), exemplary operational steps of utilizing system 100. Before turning to descriptions of FIG. 4, it is noted that the flow diagram shown therein are described, by way of example, with reference to components shown in FIGS. 1-2, although these operational steps may be carried out in any system and are not limited to the scenario shown in the aforementioned figures. Additionally, the flow diagrams in FIG. 4 shows an example in which operational steps are carried out in a particular order, as indicated by the lines connecting the blocks, but the various steps shown in these diagrams can be performed in any order, or in any combination or sub-combination.

With reference to FIG. 4, starting at step 1011, a property insurance policy is initiated. This policy may be stored in memory 340, such as database 346. In one embodiment, policy engine 140 has access to the policy, such as to the terms of the policy (e.g., premium, deductible, coverage amount, coverage type).

Detection devices, such as sensors 90, are installed at a property, such as a structure, covered by the insurance policy (step 1012). In one embodiment, sensors 90 may have been previously installed for other reasons (e.g., security cameras) and later re-configured to integrate with system 100. In another embodiment, sensors 90 are installed for at least the reason of integrating with and working with system 100. In still another embodiment, sensors 90 include a combination of pre-installed sensors 90 and newly-installed sensors 90.

Subsequently, information is received from sensors 90 (step 1013). As discussed above, information may be sent from sensors 90 to dwelling computing device 300, and subsequently to management module 105. In another embodiment, dwelling computing device 300 is not installed onsite and sensors 90 communicate directly to management module 105. In yet another embodiment, dwelling computing device 300 is installed onsite, and sensors 90 communicate directly to management module 105, through dwelling computing device, and/or a combination thereof.

Information is analyzed by management module 105 (step 1014), such as by data engine 120 and/or policy engine 140. In one embodiment, data engine 120 considers the data and identifies prospective situations that may justify adjusting the terms (step 1018) of an insurance policy (e.g., lowering deductible, increasing coverage amount, lowering premium, increasing types of situations covered, adjusting one term of a specific coverage and/or the entire policy). In this embodiment, prospective situations are communicated to policy engine 140, and policy engine 140 decides if an adjustment to the insurance policy is warranted. This may include considering the initial policy terms and, based on the initial policy terms, deciding if a first adjustment is allowable. This may also include considering the initial policy terms and, based on the initial policy terms, deciding if an additional adjustment is allowable. This may further include considering the current policy terms and, based on the current policy terms, deciding if an adjustment is allowable. This may also include identifying a qualification deductible for the given information received from sensors 90, and, if the policy's deductible does not match the qualification deductible, either lowering or increasing the policy's deductible to match the qualification deductible.

In one embodiment, command generation engine 130 may send additional commands to sensors 90 and/or dwelling computing device 300 (step 1015), such as via dwelling computing device 300 and/or directly to sensors 90. These commands may alter the types of measurements being performed, the frequency of measurements, the speed/frequency in which information is communicated from sensors 90, and/or any other settings. Subsequent to additional commands being sent to sensors 90, sensors 90 and/or dwelling computing device 300 execute and/or perform the additional commands and send additional information to management module 105 (step 1016). The additional information may be analyzed independent of the previously received information, and/or it may be analyzed and/or correlated with the previously received information (step 1017).

In one embodiment, information received at management module 105 is immediately analyzed and then discarded. In another embodiment the information is analyzed and stored temporarily. In yet another embodiment, the information is stored for later analysis. And in still another embodiment, the information is stored via another device/module/engine.

If the customer qualifies for an adjustment to the insurance policy, in one embodiment policy engine 140 adjusts the policy's terms and optionally subsequently notifies the customer and/or the insurer. In another embodiment, the policy engine 140 sends a notification that the customer qualifies for a policy term adjustment, the notification being sent to the customer and/or the insurer.

Figure 5:
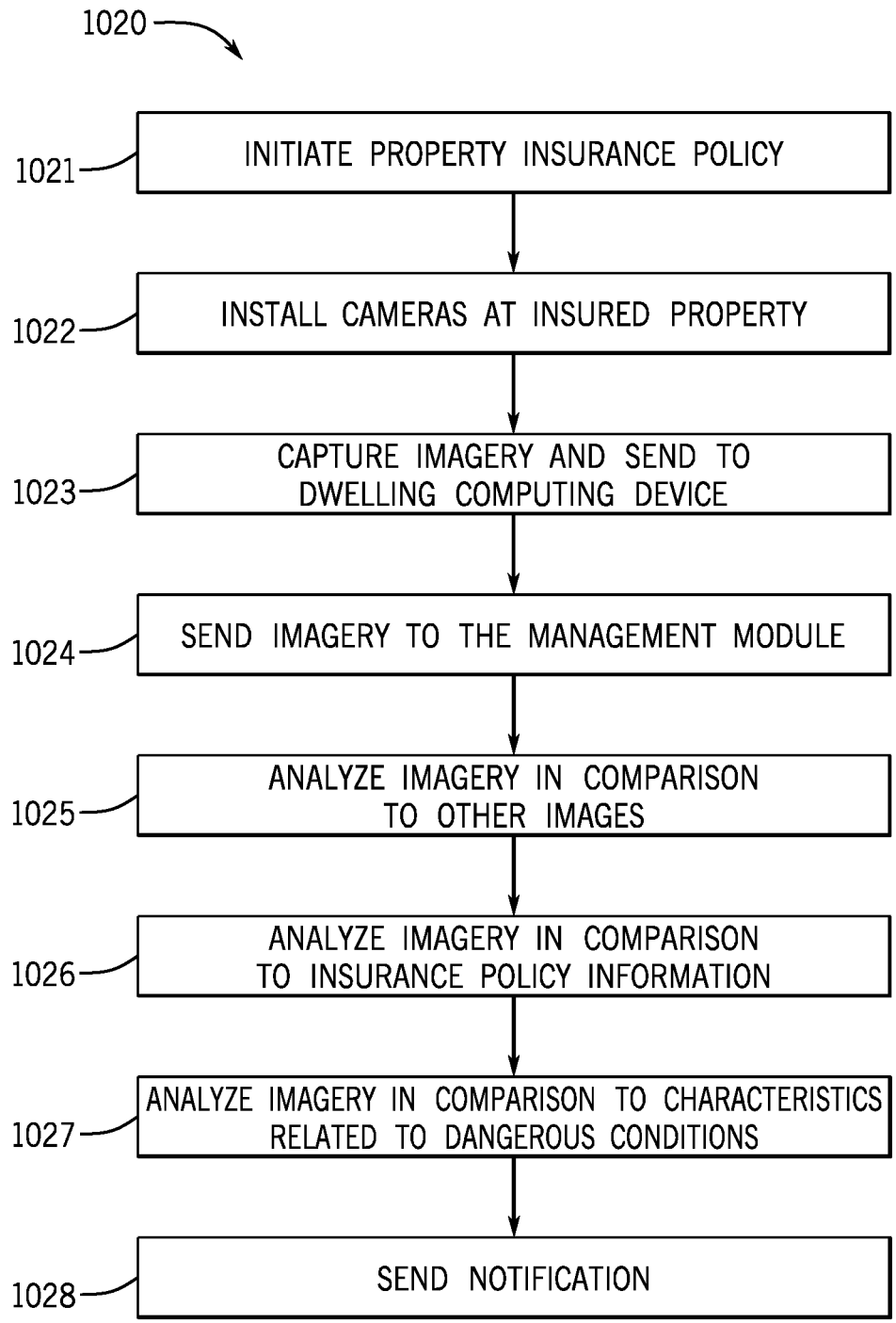
FIG. 5 is a flow diagram of a method for adjusting insurance policy data based on information acquired using the system of FIG. 1, in accordance with embodiments presented herein.

FIG. 5 shows, in the form of a flow chart (process 1020), exemplary operational steps of utilizing system 100. Before turning to descriptions of FIG. 5, it is noted that the flow diagram shown therein are described, by way of example, with reference to components shown in FIGS. 1-2, although these operational steps may be carried out in any system and are not limited to the scenario shown in the aforementioned figures. Additionally, the flow diagrams in FIG. 5 shows an example in which operational steps are carried out in a particular order, as indicated by the lines connecting the blocks, but the various steps shown in these diagrams can be performed in any order, or in any combination or sub-combination.

With reference to FIG. 5, starting at step 1021, a property insurance policy is initiated. This policy may be stored in memory 340, such as database 346. In one embodiment, policy engine 140 has access to the policy, such as to the terms of the policy (e.g., premium, deductible, coverage amount, coverage type).

Cameras 92 are installed at a property, such as a structure, covered by the insurance policy (step 1022). In one embodiment, cameras 92 may have been previously installed for other reasons (e.g., security cameras) and later re-configured to integrate with system 100. In another embodiment, cameras 92 are installed for at least the reason of integrating with and working with system 100. In still another embodiment, cameras 92 include a combination of pre-installed cameras 92 and newly-installed cameras 92.

Subsequently, information, such as imagery, is received from cameras 92 (step 1023). As discussed above, information may be sent from cameras 92 to dwelling computing device 300, and subsequently to management module 105 (step 1024). In another embodiment, dwelling computing device 300 is not installed onsite and cameras 92 communicate directly to management module 105. In yet another embodiment, dwelling computing device 300 is installed onsite, and cameras 92 communicate directly to management module 105, cameras 92 communicate to management module 105 through dwelling computing device 300, and/or a combination thereof.

Information is analyzed by management module (step 1025), such as by data analysis engine 120 and/or policy engine 140. The situations may be compared to insurance policy information as provided by policy analysis engine 140 (step 1026). In one embodiment, data analysis engine 120 considers the images and identifies prospective situations such as described herein (step 1027). Finally, based on the comparisons and/or analysis, notifications may be sent (step 1028).

In one embodiment, command generation engine 130 may send additional commands to cameras 92 and/or dwelling computing device 300, such as via dwelling computing device 300 and/or directly to cameras 92. These commands may alter the types of imagery being taken/recorded, the frequency of image captures, the speed/frequency in which images are communicated from cameras 92, and/or any other settings. Subsequent to additional commands being sent to cameras 92, cameras 92 and/or dwelling computing device 300 execute and/or perform the additional commands and send additional information to management module 105. The additional information may be analyzed independent of the previously received information, and/or it may be analyzed and/or correlated with the previously received information.

Upgrade Sensors

Figure 6:
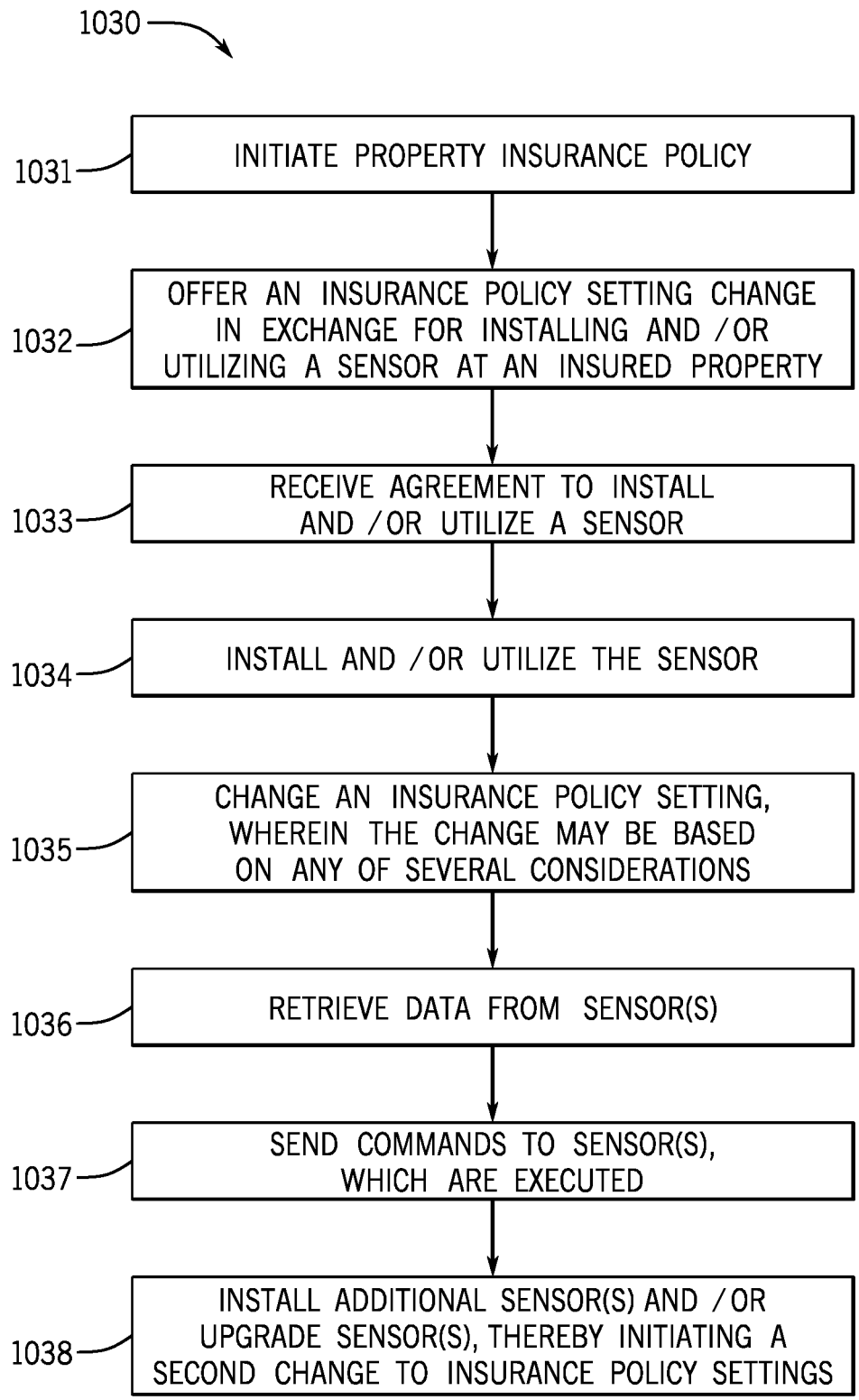
FIG. 6 is a flow diagram of a method for making additional adjustments to an insurance policy data based on information acquired using the system of FIG. 1, in accordance with embodiments presented herein.

FIG. 6 shows, in the form of a flow chart (process 1030), exemplary operational steps of utilizing system 100. Before turning to descriptions of FIG. 6, it is noted that the flow diagram shown therein are described, by way of example, with reference to components shown in FIGS. 1-2, although these operational steps may be carried out in any system and are not limited to the scenario shown in the aforementioned figures. Additionally, the flow diagrams in FIG. 3 shows an example in which operational steps are carried out in a particular order, as indicated by the lines connecting the blocks, but the various steps shown in these diagrams can be performed in any order, or in any combination or sub-combination.

With reference to FIG. 6, starting at step 1031, a property insurance policy is initiated. This policy may be stored in memory 340, such as database 346. In one embodiment, policy engine 140 has access to the policy, such as to the terms of the policy (e.g., premium, deductible, coverage amount, coverage type).

A change to the insurance policy's settings may be offered to the customer in exchange for installing/utilizing a sensor at an insured property (step 1032). Subsequently, the customer may agree to the exchange and communicates the agreement to the insurance company (step 1033).

Detection devices, such as sensors 90, are installed/upgraded at a property, such as a structure, covered by the insurance policy (step 1034). In one embodiment, sensors 90 may have been previously installed for other reasons (e.g., security cameras) and later re-configured to integrate with system 100. In another embodiment, sensors 90 are installed for at least the reason of integrating with and working with system 100. In still another embodiment, sensors 90 include a combination of pre-installed sensors 90 and newly-installed sensors 90.

Subsequent to the sensors' 90 installation, the policy's settings are adjusted (step 1005), preferably, although not necessarily, to the customer's benefit. It is contemplated herein that the settings adjustment may be performed subsequent to the agreement and before the sensors' 90 installation, although it is recognized herein that the timing of (1) the settings change, (2) the agreement, and (3) sensor installation, may be any combination as would be recognized by those skilled in the art. Based upon business rules by the insurance company the change to the insured policy could occur backdated to the start of the current policy effective date, the day the sensors were installed or at the next renewal.

Subsequently, information is received from sensors 90 (step 1036). As discussed above, information may be sent from sensors 90 to dwelling computing device 300, and subsequently to management module 105. In another embodiment, dwelling computing device 300 is not installed onsite and sensors 90 communicate directly to management module 105. In yet another embodiment, dwelling computing device 300 is installed onsite, and sensors 90 communicate directly to management module 105, through dwelling computing device, and/or a combination thereof.

In one embodiment, command generation engine 130 may send additional commands to sensors 90 and/or dwelling computing device 300 (step 1037), such as via dwelling computing device 300 and/or directly to sensors 90. These commands may alter the types of measurements being performed, the frequency of measurements, the speed/frequency in which information is communicated from sensors 90, and/or any other sensor 90 settings.

Finally, additional sensor(s) 90 may be installed and/or sensor(s) may be upgraded, thereby initiating a second change to the policy's settings (step 1038). It is recognized herein that any number of agreements/installations may be combined with a similar number of settings changes.

Warranties

Management module 105 may further include the warranty engine 142, as mentioned above. Warranty engine 142 may analyze the data such as described above with respect to data engine 120. It is contemplated herein that data engine 120 and warranty engine 142 may work in cooperation/tandem, independently of each other, without interaction with the other, or any other permutations or derivations thereof as will be known by those skilled in the art.

Figure 7:
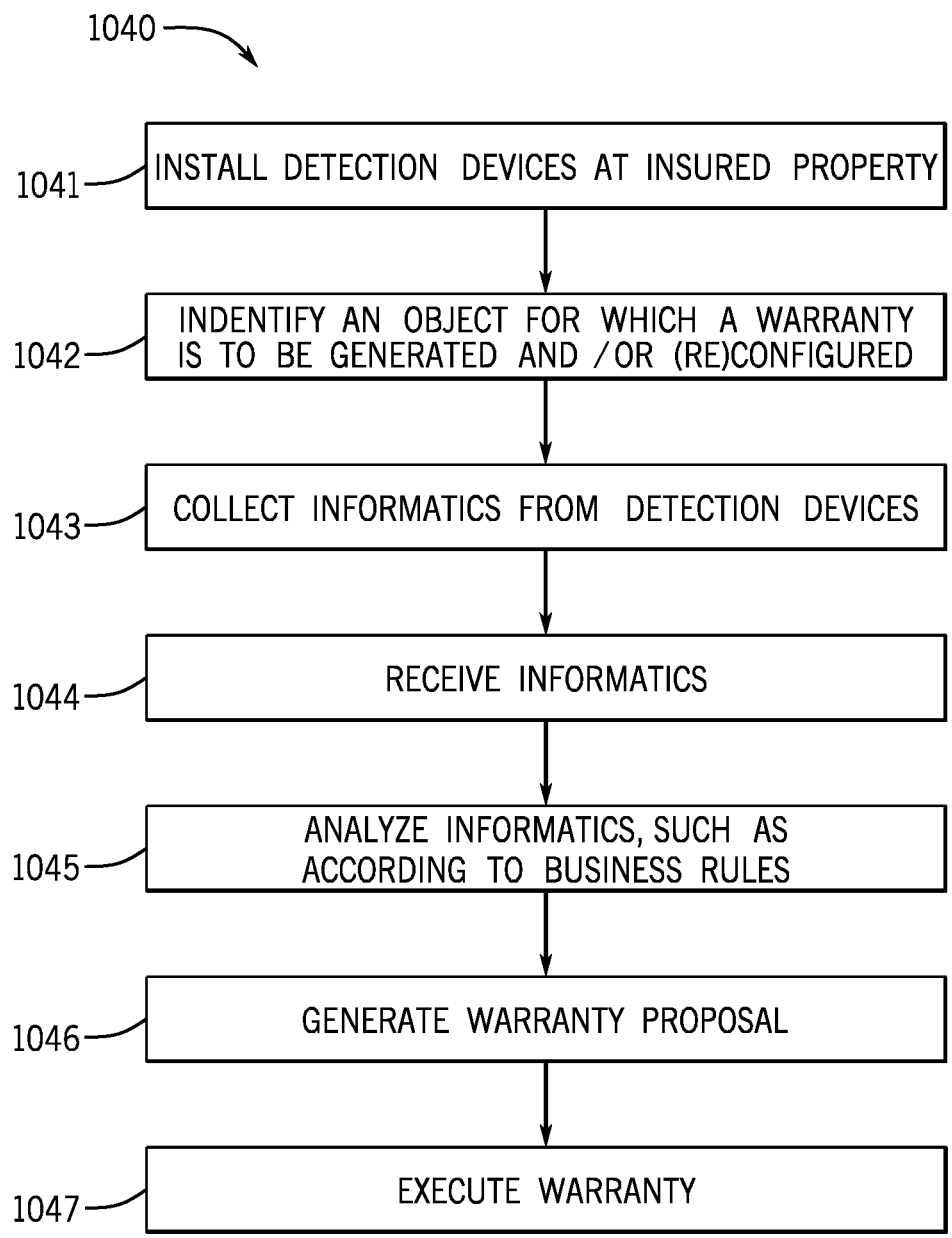
FIG. 7 is a flow diagram of a method for generating a warranty based on information acquired using the system of FIG. 1, in accordance with embodiments presented herein.

FIG. 7 shows, in the form of a flow chart (process 1040), exemplary operational steps of utilizing system 100. Before turning to descriptions of FIG. 7, it is noted that the flow diagram shown therein are described, by way of example, with reference to components shown in FIGS. 1-2, although these operational steps may be carried out in any system and are not limited to the scenario shown in the aforementioned figures. Additionally, the flow diagrams in FIG. 7 shows an example in which operational steps are carried out in a particular order, as indicated by the lines connecting the blocks, but the various steps shown in these diagrams can be performed in any order, or in any combination or sub-combination.

With reference to FIG. 7, starting at step 1041, sensors 90, such as detection devices, are installed at a location. In one embodiment, sensors 90 may have been previously installed for other reasons (e.g., security cameras) and later re-configured to integrate with system 100. In another embodiment, sensors 90 are installed for at least the reason of integrating with and working with system 100. In still another embodiment, sensors 90 include a combination of pre-installed sensors 90 and newly-installed sensors 90.

Subsequently, an object is identified for which a warranty may be generated and/or reconfigured (step 1042). Informatics, such as described herein, is collected by sensors (step 1043), and communicated to management module (step 1044). As discussed herein, information may be sent from sensors 90 to dwelling computing device 300, and subsequently to management module 105. In another embodiment, dwelling computing device 300 is not installed onsite and sensors 90 communicate directly to management module 105. In yet another embodiment, dwelling computing device 300 is installed onsite, and sensors 90 communicate directly to management module 105, through dwelling computing device, and/or a combination thereof.

The informatics is analyzed (step 1045), such as according to business rules and/or considerations described herein. A warranty proposal is generated (step 1046) and communicated to the (potential) customer, and the warranty proposal may be a new warranty for an object, extending a warranty for an object, or changing the terms of the warranty for an object. It is contemplated herein that a warranty may have dynamic terms (e.g., if one or more condition scores are above/below a predetermined threshold, the terms of the warranty improve/get worse from the customer's perspective). Finally, the warranty (modification) is executed via step 1047.

In one embodiment, command generation engine 130 may send additional commands to sensors 90 and/or dwelling computing device 300, such as via dwelling computing device 300 and/or directly to sensors 90. These commands may alter the types of measurements being performed, the frequency of measurements, the speed/frequency in which information is communicated from sensors 90, and/or any other settings. Subsequent to additional commands being sent to sensors 90, sensors 90 and/or dwelling computing device 300 execute and/or perform the additional commands and send additional information to management module 105.

Detection-Based Adjustments

Figure 8:
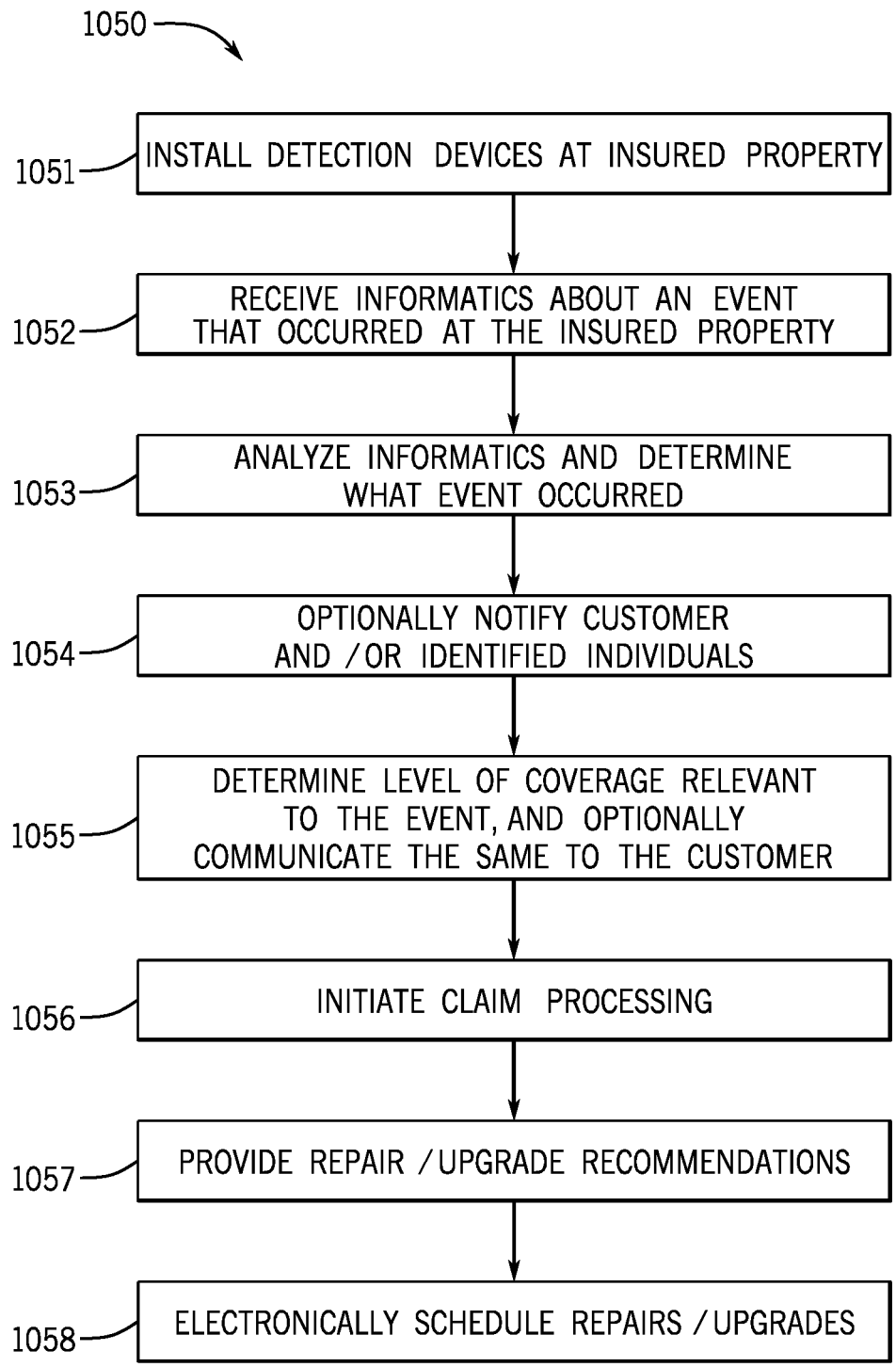
FIG. 8 is a flow diagram of a method for scheduling repairs based on information acquired using the system of FIG. 1, in accordance with embodiments presented herein.

FIG. 8 shows, in the form of a flow chart (process 1050), exemplary operational steps of utilizing system 100. Before turning to descriptions of FIG. 8, it is noted that the flow diagram shown therein are described, by way of example, with reference to components shown in FIGS. 1-2, although these operational steps may be carried out in any system and are not limited to the scenario shown in the aforementioned figures. Additionally, the flow diagrams in FIG. 8 shows an example in which operational steps are carried out in a particular order, as indicated by the lines connecting the blocks, but the various steps shown in these diagrams, and the various embodiments described herein, can be performed in any order, combination and/or sub-combination.

With reference to FIG. 8, starting at step 1051, sensors 90, such as those described and referenced herein, are installed at property. In one embodiment, sensors 90 may have been previously installed for other reasons (e.g., security cameras) and later re-configured to integrate with system 100. In another embodiment, sensors 90 are installed for at least the reason of integrating with and working with system 100. In still another embodiment, sensors 90 include a combination of pre-installed sensors 90 and newly-installed sensors 90.

Informatics is received from sensors 90, such as informatics about damage that occurred and/or an event or data that has been detected (step 1052). Subsequently, data engine 120 analyzes the informatics to determine what event transpired (step 1053). As discussed herein, information may be sent from sensors 90 to dwelling computing device 300, and subsequently to management module 105. In another embodiment, dwelling computing device 300 is not installed onsite and sensors 90 communicate directly to management module 105. In yet another embodiment, dwelling computing device 300 is installed onsite, and sensors 90 communicate directly to management module 105, through dwelling computing device, and/or a combination thereof.

The customer and/or selected parties are optionally notified (step 1054). Policy engine 140 analyzes the relevant insurance contract/policy/provision and identifies a relevant coverage amount and/or portion (step 1055). Claim processing is initiated (step 1056), and repair recommendations may be optionally provided to the insured party (step 1057). Finally, repairs are electronically scheduled (step 1058), which optionally includes providing a legally binding commitment to the repairing party that they will be reimbursed (up to a specified amount).

In one embodiment, command generation engine 130 may send additional commands to sensors 90 and/or dwelling computing device 300, such as via dwelling computing device 300 and/or directly to sensors 90. These commands may alter the types of measurements being performed, the frequency of measurements, the speed/frequency in which information is communicated from sensors 90, and/or any other settings. Subsequent to additional commands being sent to detection devices 90, detection devices 90 and/or dwelling computing device 300 execute and/or perform the additional commands and send additional information to management module 105. The additional information may be analyzed independent of the previously received information, and/or it may be analyzed and/or correlated with the previously received information.

Policy Term Adjustments

Figure 9:
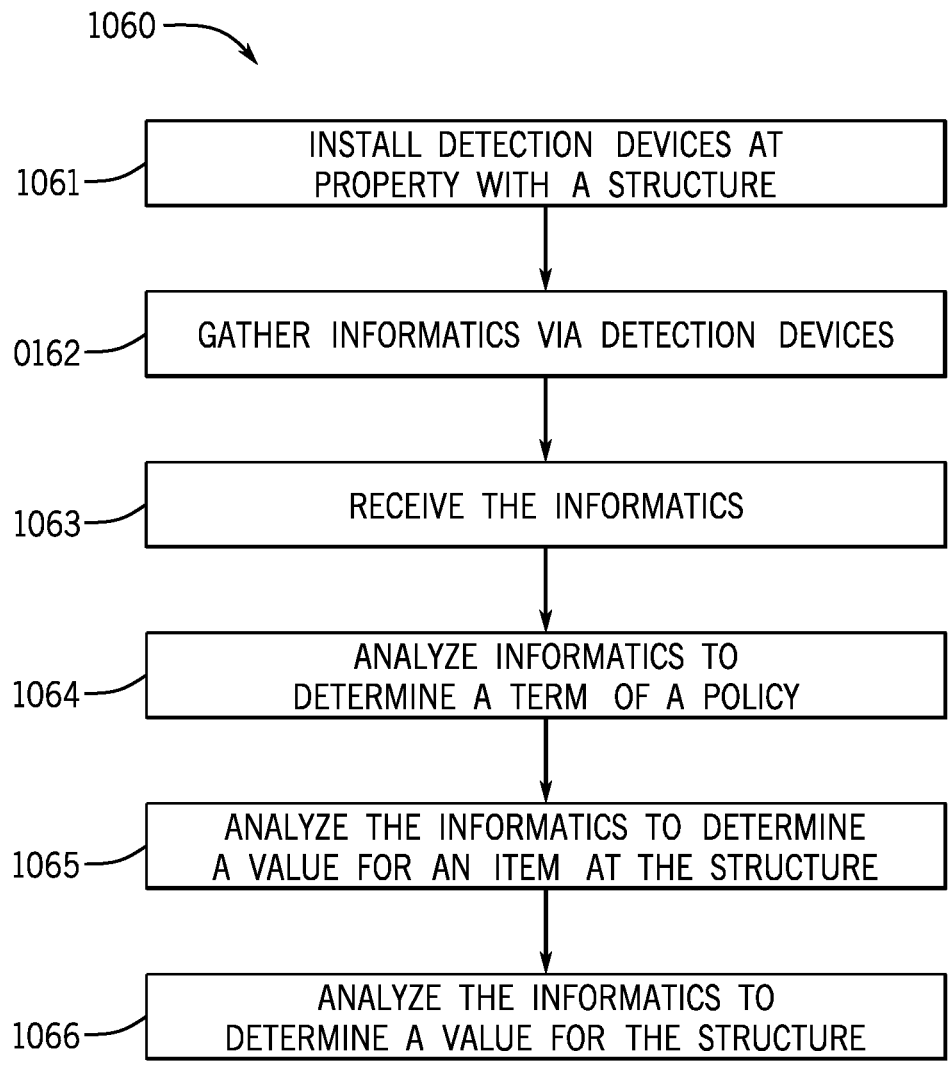
FIG. 9 is a flow diagram of a method for determining a value of a structure based on information acquired using the system of FIG. 1, in accordance with embodiments presented herein.

FIG. 9 shows, in the form of a flow chart (process 1060), exemplary operational steps of utilizing system 100. Before turning to descriptions of FIG. 9, it is noted that the flow diagram shown therein are described, by way of example, with reference to components shown in FIGS. 1-2, although these operational steps may be carried out in any system and are not limited to the scenario shown in the aforementioned figures. Additionally, the flow diagrams in FIG. 9 shows an example in which operational steps are carried out in a particular order, as indicated by the lines connecting the blocks, but the various steps shown in these diagrams can be performed in any order, or in any combination or sub-combination.

With reference to FIG. 9, starting at step 1061, detection devices, such as sensors 90, are installed at a property, such as a structure, covered by the insurance policy. In one embodiment, sensors 90 may have been previously installed for other reasons (e.g., security cameras) and later re-configured to integrate with system 100. In another embodiment, sensors 90 are installed for at least the reason of integrating with and working with system 100. In still another embodiment, sensors 90 include a combination of pre-installed sensors 90 and newly-installed sensors 90.

Subsequently, information is gathered by from sensors 90 (step 1062) and received at management module (step 1063). As discussed above, information may be sent from sensors 90 to dwelling computing device 300, and subsequently to management module 105. In another embodiment, dwelling computing device 300 is not installed onsite and sensors 90 communicate directly to management module 105. In yet another embodiment, dwelling computing device 300 is installed onsite, and sensors 90 communicate directly to management module 105, through dwelling computing device, and/or a combination thereof.

Information is analyzed by management module 105 (step 1064), such as by data engine and/or policy engine 140. In one embodiment, data engine 120 considers the data and identifies prospective terms of a warranty policy and/or an insurance policy.

Information may also be analyzed by management module 105 to determine a value of one or more structures (step 1066) and/or one or more items (step 1065), such as appliances, that may be in and around the one or more structures.

Score-Based Adjustments

It is contemplated herein that the insurance policy terms may be based on a score calculated from the informatics, the terms may be based on an average of scores that were calculated from the informatics, or the terms may be directly based on the informatics.

Figure 10:
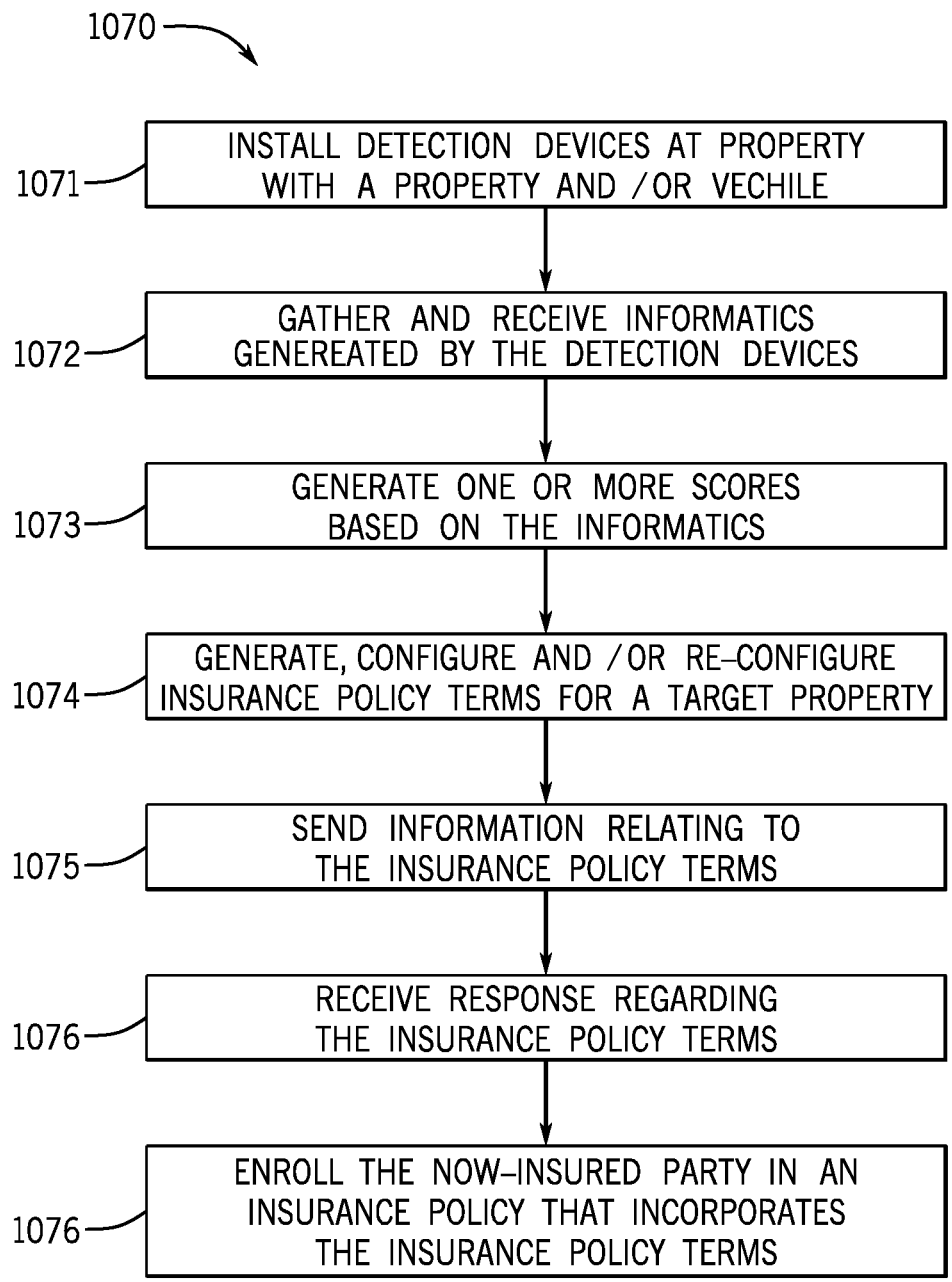
FIG. 10 is a flow diagram of a method for adjusting insurance terms based on information acquired using the system of FIG. 1, in accordance with embodiments presented herein.

FIG. 10 shows, in the form of a flow chart (process 1070), exemplary operational steps of utilizing system 100. Before turning to descriptions of FIG. 10, it is noted that the flow diagram shown therein are described, by way of example, with reference to components shown in FIGS. 1-2, although these operational steps may be carried out in any system and are not limited to the scenario shown in the aforementioned figures. Additionally, the flow diagrams in FIG. 10 shows an example in which operational steps are carried out in a particular order, as indicated by the lines connecting the blocks, but the various steps shown in these diagrams can be performed in any order, or in any combination or sub-combination.

With reference to FIG. 10, starting at step 1071, a property insurance policy is initiated and detection devices are installed at a property and/or on a vehicle. This policy may be stored in memory 340, such as database 346. In one embodiment, policy engine 140 has access to the policy, such as to the terms of the policy (e.g., premium, deductible, coverage amount, coverage type).

In one embodiment, sensors 90 may have been previously installed for other reasons (e.g., security cameras) and later re-configured to integrate with system 100. In another embodiment, sensors 90 are installed for at least the reason of integrating with and working with system 100. In still another embodiment, sensors 90 include a combination of pre-installed sensors 90 and newly-installed sensors 90.

Subsequently, information is gathered and received from detection devices 90 (step 1072). As discussed above, information may be sent from sensors 90 to dwelling computing device 300, and subsequently to management module 105. In another embodiment, dwelling computing device 300 is not installed onsite and sensors 90 communicate directly to management module 105. In yet another embodiment, dwelling computing device 300 is installed onsite, and sensors 90 communicate directly to management module 105, through dwelling computing device, and/or a combination thereof.

Based on analysis of the informatics, one or more scores may be generated (step 1073). In one embodiment, a plurality of scores may be averaged together to generate a single score, and the average score may be weighted. For example certain characteristics (e.g., working condition) may be weighted more heavily than other characteristics (e.g., cleanliness).

Based on the scores, or in some embodiments based on the informatics directly, insurance policy terms are generated, configured and/or reconfigured (step 1074). In one embodiment, a base insurance policy is generated, and the score and/or informatics results in adjusted terms for that insurance policy. In one example, a default home insurance policy may be a premium of $3.50 for every $1,000.00 of coverage. However, if the score(s) and/or informatics are positive, than the rate may be decreased (e.g., $0.50 less per $1000 of coverage) and/or the deductible amount may be decreased. In another example, certain informatics may inform certain terms (e.g., the score/informatics related to working condition affects the premium rate, whereas the cleanliness affects the deductible amount). Although certain embodiments are described herein, the permutations thereof as would be recognized by those skilled in the art are also contemplated herein.

The policy terms may be sent to the customer (step 1075), and a response thereto may be received (step 1076). If the response was positive, then the newly-insured will be enrolled in the policy terms generated by system 100 (step 1077).

In one embodiment, information received at management module 105 is immediately analyzed and then discarded. In another embodiment the information is analyzed and stored.

In one embodiment, information received at management module 105 is immediately analyzed and then discarded. In another embodiment the information is analyzed and stored temporarily. In yet another embodiment, the information is stored for later analysis. And in still another embodiment, the information is stored via another device/module/engine.

The term "module"/"engine" is used herein to denote a functional operation that may be embodied either as a stand-alone component or as an integrated configuration of a plurality of subordinate components. Thus, "modules"/ "engines" may be implemented as a single module or as a plurality of modules that operate in cooperation with one another. Moreover, although "modules"/"engines" may be described herein as being implemented as software, they could be implemented in any of hardware (e.g. electronic circuitry), firmware, software, or a combination thereof.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this disclosure, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

Figure 11:
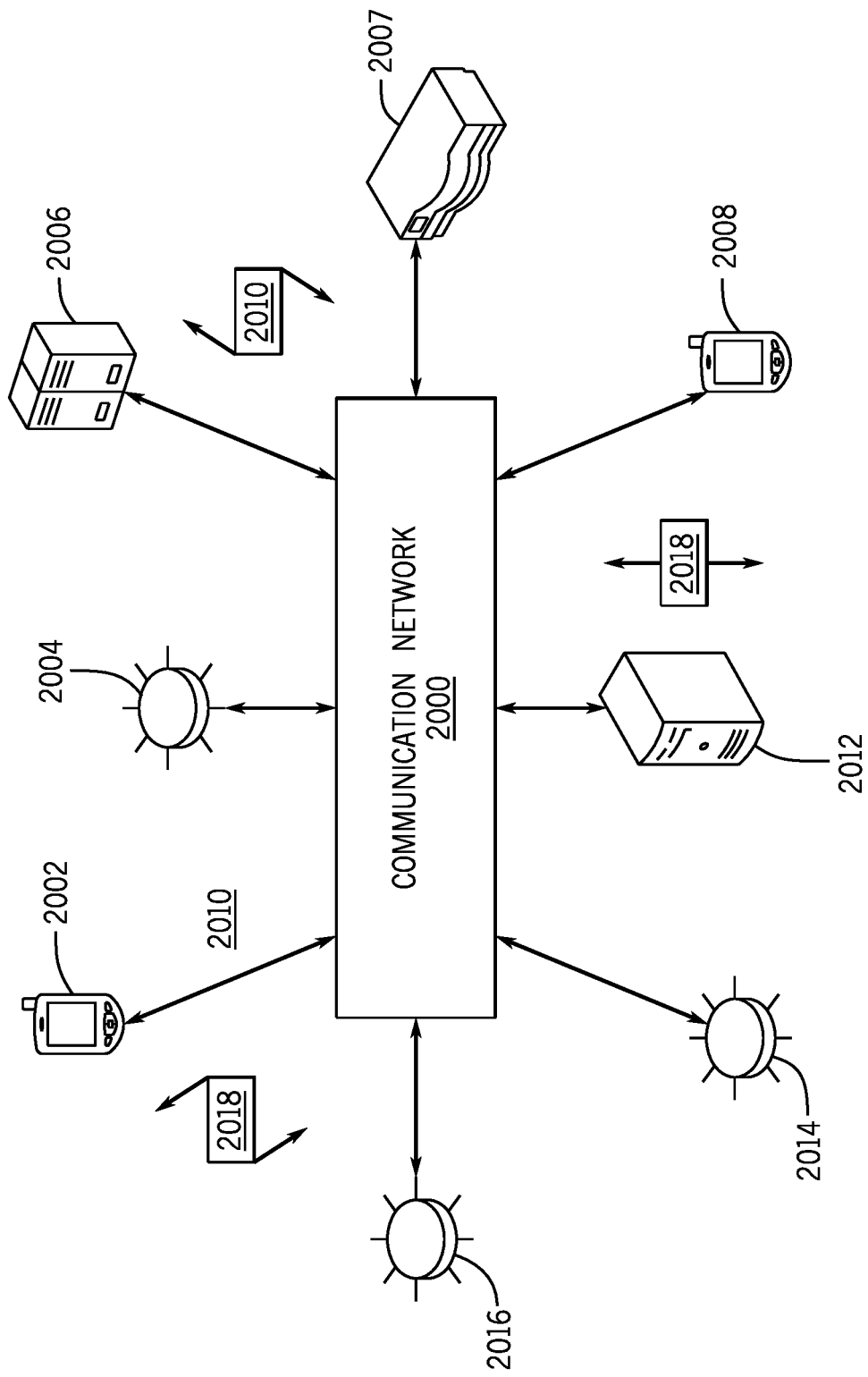
FIG. 11 is a schematic block diagram of an example communication network illustratively comprising nodes/devices (e.g., sensors, client computing devices, routers/switches, smart phone devices, servers, and the like) interconnected by various methods of communication, in accordance with embodiments presented herein.
Figure 12A:
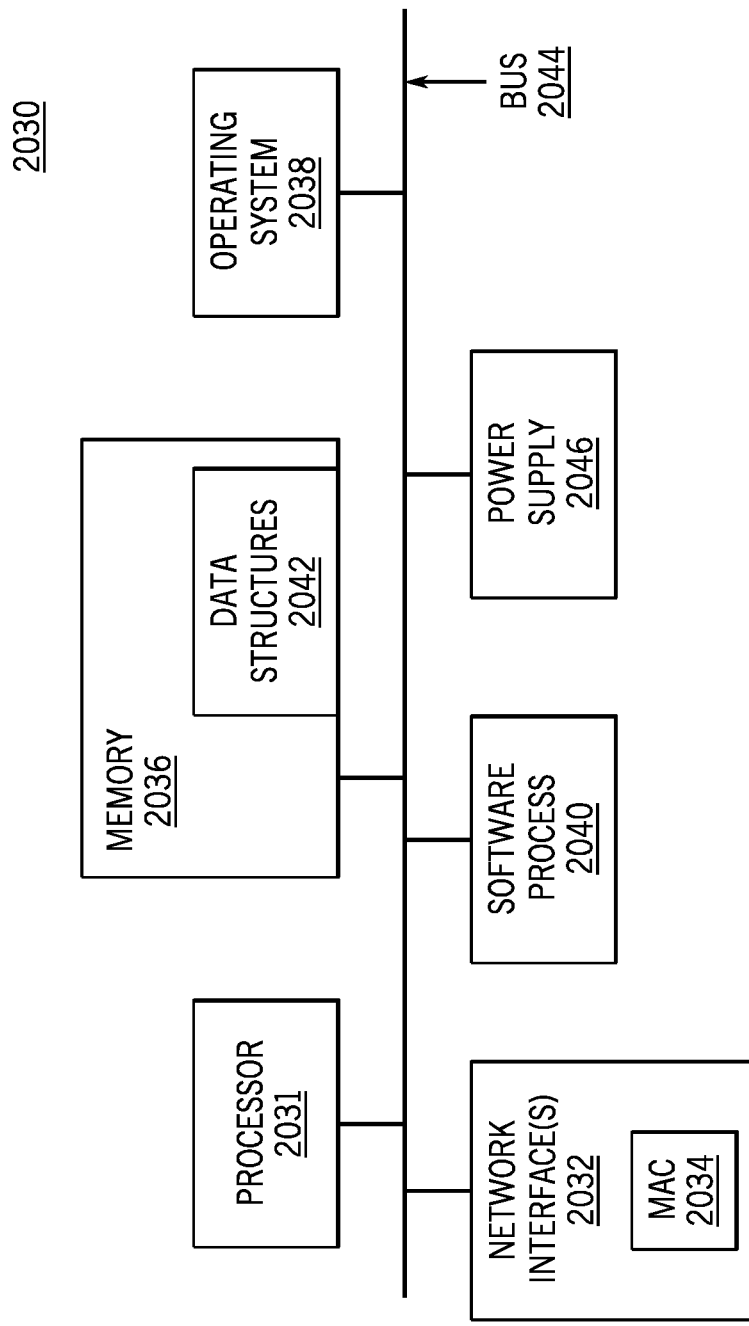
FIG. 12A is a schematic block diagram of an example network-computing device 2030 (e.g., one of network devices) that may be used (or components thereof), in accordance with embodiments presented herein.
Figure 12B:
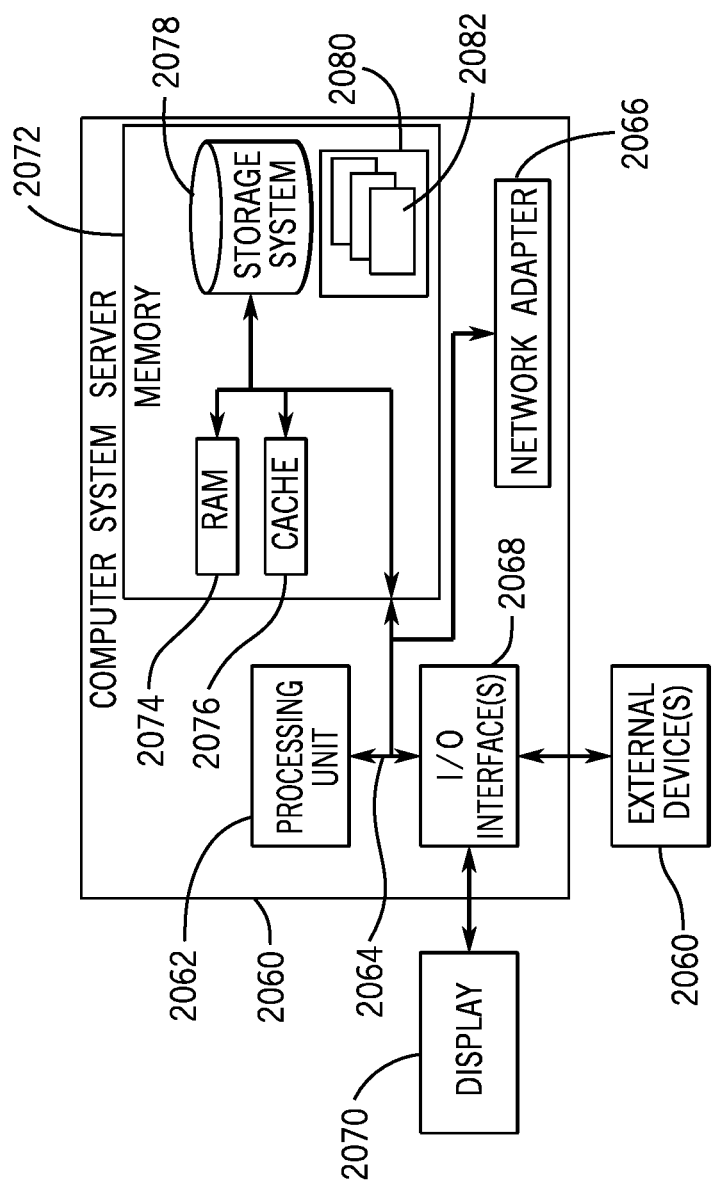
FIG. 12B is a block diagram illustrating a device of FIG. 12A, in accordance with embodiments presented herein.

FIGS. 11, 12A, and 12B are intended to provide a brief, general description of an illustrative and/or suitable exemplary environment in which embodiments may be implemented. FIGS. 11, 12A, and 12B are exemplary of a suitable environment and is not intended to suggest any limitation as to the structure, scope of use, or functionality of an embodiment of the present disclosure. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

It is to be understood a communication network 2000 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a dwelling 2200 or campus. WANs, on the other hand, typically connect geographically dispersed nodes over long-distance communications links, such as common carrier telephone lines, optical light paths, synchronous optical networks (SONET), synchronous digital hierarchy (SDH) links, or Powerline Communications (PLC), and others.

FIG. 11 is a schematic block diagram of an example communication network 2000 illustratively comprising nodes/devices 2001-2016 (e.g., sensors 2004, client computing devices 2006, routers/switches 2007, smart phone devices 2008, servers 2012, and the like) interconnected by various methods of communication. For instance, the links 2010 may be wired links or may comprise a wireless communication medium, where certain nodes are in communication with other nodes, e.g., based on distance, signal strength, current operational status, location, etc. Moreover, each of the devices can communicate data packets (or frames) with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 12A is a schematic block diagram of an example network-computing device 2030 (e.g., one of network devices 2002-2016) that may be used (or components thereof) with one or more embodiments described herein, e.g., as one of the nodes shown in the network 2000. Device 2030 may comprise one or more network interfaces 2032, at least one processor 2031, and a memory 2036 interconnected by a system bus 2044.

The network interface(s) 2032 contain the mechanical, electrical, and signaling circuitry for controlling operation of device 2030 and can include a media access controller (MAC) 2034, which can communicate data to/from network 2000 using a variety of different communication protocols.

Memory 2036 preferably comprises a plurality of storage locations that are addressable by the processor 2031, MAC 2034 and the network interfaces 2032 for storing software programs and data structures associated with the embodiments described herein. Note that certain embodiments of device 2030 may have limited memory or no memory (e.g., no memory for storage other than for programs/processes operating on the device and associated caches). The processor 2031 may comprise hardware elements or hardware logic adapted to execute the software programs and manipulate the data structures 2042. An operating system 2038, portions of which are typically resident in memory 2036 and executed by the processor and/or network interfaces 2032 (i.e., via MAC 2034), functionally organizes the device by, inter alia, invoking operations in support of software processes 2040 and/or services executing on the device (2002-2016). These software processes and/or services are preferably used in correlation with the data analysis component 2262 of FIG. 4, as described herein. Note that such process/service 2040 may be centralized in memory 2036, or alternatively, such process/service can be employed within the network interfaces 2032. Further, power supply 2046 may supply power to the device 2030.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes. Illustratively, the techniques described wherein may be performed by hardware, software, and/or firmware, such as in accordance with process 2040, which may contain computer executable instructions executed by the processor 2031 (and/or MAC 2034) to perform functions relating to the techniques described herein.

In the description that follows, certain embodiments may be described with reference to acts and symbolic representations of operations that are performed by one or more computing devices (2002-2016), such as the computing system 2030 of FIG. 12A. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

It is to be further appreciated, embodiments may be implemented with numerous other general-purpose or special-purpose computing devices and computing system environments or configurations. Examples of well-known computing systems, environments, and configurations that may be suitable for use with an embodiment include, but are not limited to, personal computers, handheld or laptop devices, personal digital assistants, tablet devices, smart phone devices, multiprocessor systems, microprocessor-based systems, set top boxes, programmable consumer electronics, network, sensors, minicomputers, server computers, game server computers, web server computers, mainframe computers, and distributed computing environments that include any of the above systems or devices. Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

As explained above, in different embodiments these various devices be configured to communicate with each other in any suitable way, such as, for example, via communication network 2000. Device 2030 is only one example of a suitable system and is not intended to suggest any limitation as to the scope of use or functionality of embodiments of the disclosure described herein. Regardless, computing device 2030 is capable of being implemented and/or performing any of the functionality set forth herein.

Computing device 2030 is operational with numerous other general purpose or special purpose computing system environments or configurations. Examples of well-known computing systems, environments, and/or configurations that may be suitable for use with computing device 2030 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

Computing device 2030 may be described in the general context of computer system—executable instructions, such as program modules, being executed by a computer system. Generally, program modules may include routines, programs, objects, components, logic, data structures, and so on that perform particular tasks or implement particular abstract data types. Computing device 2030 may be practiced in distributed data processing environments where tasks are performed by remote processing devices that are linked through a communications network. In a distributed data processing environment, program modules may be located in both local and remote computer system storage media including memory storage devices.

Device 2030 is shown in FIG. 12B in the form of a general-purpose computing device 2030. The components of device 2030 may include, but are not limited to, one or more processors or processing units 2062, a system memory 2072, and a bus 2064 that couples various system components including system memory 2072 to processor 2062.

Bus 2064 represents one or more of any of several types of bus structures, including a memory bus or memory controller, a peripheral bus, an accelerated graphics port, and a processor or local bus using any of a variety of bus architectures. By way of example, and limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 2030 typically includes a variety of computer system readable media. Such media may be any available media that is accessible by device 200, and it includes both volatile and non-volatile media, removable and non-removable media.

System memory 2072 can include computer system readable media in the form of volatile memory, such as random access memory (RAM) 2074 and/or cache memory 232. Computing device 2030 may further include other removable/non-removable, volatile/non-volatile computer system storage media. By way of example only, storage system 2078 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 2064 by one or more data media interfaces. As will be further depicted and described below, memory 2072 may include at least one program product having a set (e.g., at least one) of program modules that are configured to carry out the functions of embodiments of the disclosure.

Program/utility 2080, having a set (at least one) of program modules 2082, such as dwelling analyzer module 2212 and appliance analyzer module 2214 described below, may be stored in memory 2072 by way of example, and not limitation, as well as an operating system, one or more application programs, other program modules, and program data. Each of the operating system, one or more application programs, other program modules, and program data or some combination thereof, may include an implementation of a networking environment. Program modules 2082 generally carry out the functions and/or methodologies of embodiments of the disclosure as described herein.

Device 2030 may also communicate with one or more external devices 2060 such as a keyboard, a pointing device, a display 2070, etc.; one or more devices that enable a user to interact with computing device 200; and/or any devices (e.g., network card, modem, etc.) that enable computing device 2030 to communicate with one or more other computing devices. Such communication can occur via Input/Output (I/O) interfaces 2068. Still yet, device 2030 can communicate with one or more networks such as a local area network (LAN), a general wide area network (WAN), and/or a public network (e.g., the Internet) via network adapter 2066. As depicted, network adapter 2066 communicates with the other components of computing device 2030 via bus 2064. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

With the exemplary communication network 2000 (FIG. 11) and computing device 2030 (FIGS. 12A and 12B) being generally shown and discussed above, description of certain illustrated embodiments of the present disclosure will now be provided. With reference now to FIG. 3, shown is an example of a dwelling 2200, which is to be understood to be any type of dwelling structure (e.g., residential, commercial, retail, municipal, etc.) in which the capture and analysis of sensor data (2004) is useful for the reasons at least described below. Dwelling 2200 preferably includes a computing device 2006 for capturing data from a plural of sensors 2004 which capture data regarding various aspects of dwelling 2200, as further described below. It is to be understood dwelling computing device 2006 may be located in any location, and its position is not limited to any one particular location.

Computing device 2006 is preferably configured and operational to receive (capture) data from various sensors 2004 regarding certain aspects (including functional and operational) of dwelling 2200 (described further below) and transmit captured data to a remote server 206, preferably via network 2000. It is noted device 2006 may perform analytics regarding the captured sensor data for dwelling 2200, and/or the remote server 206, preferably located or controlled by an insurance company/carrier, may perform such analytics, as also further described below. It is also to be understood in other embodiments, data from sensors 2004 may be transmitted directly to remote server 2012, via network 2000, thus either obviating the need for dwelling computing device 2006 or mitigating its functionality to capture data from all sensors 2004.

In the illustrated embodiment of FIG. 13, dwelling-computing device 2006 is shown coupled to various below described sensor types 2004. Although various sensor types 2004 are described below and shown in FIG. 13, the sensor types described and shown herein are not intended to be exhaustive as the present disclosure may encompass any type of known or unknown sensor type which facilitates the purposes and objectives of the certain illustrated embodiments described herein. Exemplary sensor types include (but are not limited to):

Temperature sensor—configured and operational to preferably detect the temperature present at the dwelling 2200. For example, the temperature may rise and fall with the change of seasons and/or the time of day. Moreover, in the event of a fire, the temperature present at the dwelling 2200 may rise quickly—possibly to a level of extreme high heat. The temperature sensor may make use of probes placed at various locations in and around the dwelling 2200, in order to collect a representative profile of the temperature present at the dwelling 2200. These probes may be connected to device 2006*by* wire, or by a wireless technology. For example, if device 2006 is positioned in the attic of the dwelling 2200, the temperature may be higher than the general temperature present in the dwelling. Thus, probes placed at various locations (e.g., in the basement, on the various levels of a multi-level dwelling 2200, in different rooms that receive different amounts of sun, etc.), in order to obtain an accurate picture of the temperature present at the dwelling. Moreover, device 2006 may record both the indoor and outdoor temperature present at the dwelling 2200. For example, data about the indoor temperature, the outdoor temperature, and/or the differential between indoor and outdoor temperatures, may be used as part of some analysis model, and thus all of the different values could be stored. Device 2006 may store an abstract representation of temperature (e.g., the average indoor temperature, as collected at all of the probes), or may store each temperature reading individually so that the individual readings may be provided as input to an analysis model.

Humidity sensor—configured and operational to preferably detect the humidity present at the dwelling 2200. Humidity sensor may comprise the humidity-detection hardware, or may employ one or more remote probes, which may be located inside and/or outside the dwelling 2200. Humidity readings from one or more locations inside and/or outside the dwelling could thus be recorded by device 2006.

Water pressure sensor—configured and operational to preferably monitor water pressure in the plumbing system in the dwelling 2200. Water pressure sensor may have one or more probes attached to various locations of the dwelling's 2200 plumbing, and thus device 2006 may record the pressure present in the plumbing, and/or any changes in that pressure. For example, plumbing systems may be designed to withstand a certain amount of pressure, and if the pressure rises above that amount, the plumbing system may be at risk for leaking, bursting, or other failure. Thus, device 2006 may record the water pressure (and water flow) that is present in the plumbing system at various points in time.

Water flow sensor—configured and operational to preferably monitor water flow rate in the plumbing system in the dwelling 2200. Water flow sensor may have one or more probes attached to various locations of the dwelling's 300 plumbing, such as faucets, showerheads and appliances, and thus water flow sensor may measure and/or record the amount of water flowing through the dwelling's 300 water supply system. Thus, device 103 may record the water flow that is present in the plumbing system at various points in time. An analysis model could use the information about water flow in various ways such as rating the home insurance, tracking water consumption, or providing advice and guidance. The readings of the amount of water used at dwelling 2200 can be used to analyze and forecast an expected water bill. This can also be used for budgeting and finance management because a history of water usage at the dwelling 2200 or certain appliances can be measured and displayed to the homeowner or insurance company. These readings and usage can be provided to the homeowner so that he can budget X amount of money each month for the water bill. Also, the homeowner or insurer can track water use and determine based upon the rate of energy consumption that the homeowner is on a pace to use more or less water use than is budgeted. If the homeowner is on pace to use more water than is budgeted the insurance company can provide advice and guidance on how the homeowner can reduce water use. If the homeowner is on pace to use less water than is budgeted the insurance company can help the homeowner in moving the unspent portion of the budget amount to a savings device like a CD or money market.

Water Detection sensor—configured and operations to preferably monitor water leaks or moisture in the plumbing system in the dwelling 2200. Water detection sensor may have one or more probes/sensors attached to various locations of the dwelling's 2200 plumbing, and thus device 2006 may record a potential water leak or area of moisture buildup in the home.

Wind speed sensor—configured and operational to record the wind speed present at the dwelling 2200. For example, one or more wind sensors may be placed outside the dwelling 2200, and the wind speed and/or direction may be recorded at various points in time. Device 2006 may record these wind speed and/or wind direction readings. The wind speed may be used by an analysis model for various purposes. For example, the wind speed and/or direction at specific points in time during a hurricane may help to understand how well the dwelling 2200 withstood a hurricane or to predict emergence of a dangerous situation. If the wind speed rises to a certain level just before a house is destroyed in a hurricane, this fact may be used to estimate the amount of wind that the house could withstand. Or, as another example, measurements of wind speed and/or direction taken at a time other than when a hurricane is occurring could be used to forecast the risk that a house will suffer damage. Even non-hurricane-force winds can cause damage to a dwelling 2200, and an insurer might be interested to know if the prevailing wind speed in the vicinity of the dwelling 2200 is increasing or decreasing. This information could be used to plan for future losses and/or to make future underwriting decisions.

Motion sensor-configured and operational to sense motion in the dwelling 2200 to which device 2006 is attached. Typically, dwelling's 2200 do not move significantly, except in the event of a catastrophe. Motion may indicate that the dwelling 2200 is sliding down a hill (e.g., in the event of an extreme flood or mudslide), or is experiencing a measurable earthquake. Moreover, in the event of a complete collapsed, it is likely that device 2006 (or a motion sensor probe used by device 2006) will move, and thus such motion could be used to identify the moment at which the dwelling 2200 collapsed. Motion sensor also encompasses the type to detect movement inside of a dwelling for alarm purposes and/or to determine the habits/trends of dwelling inhabitants. An analysis model could use the information about motion in various ways. For example, if an abrupt motion indicates that the dwelling 2200 collapsed at a certain point in time, then data such as temperature, wind speed, etc., could be used to determine what was happening (e.g., fire, high winds, etc.) at the time of the collapse. A motion sensor may further include earth sensors for detecting sink holes and earth movement. This information may be used to understand the cause of the collapse. Or, as another example, the information could be used to assess an insurance claim (e.g., an insurer's liability for wind damage might be different than for fire damage, and thus knowing what was happening at the moment of the collapse might be used to determine what, if any, settlement is due to an insured). Or, as another example, a motion sensor may be configured and operational to determine how often a kitchen is used and/or what time the dwelling inhabitants sleep, leave and return from work, etc.

Electrical system sensor/analyzer configured and operational to assess the condition of the dwelling's 2200 electrical system. For example, potentiometers may be connected to various points in the dwelling's 2200 electrical system to measure voltage. Readings from the potentiometers could be used to determine if the voltage is persistently too high, or too low, or if the voltage frequently drops and/or spikes. Such conditions may suggest that the dwelling 2200 is it at risk for fire. Other types of electrical measurements could be taken, such as readings of current flowing through the electrical system. Still other types of electrical measurements that could be determined include how energy is used and at what times of day it is used, etc. Any type of data about the dwelling's 2200 electrical system could be captured by device 2006. An analysis model could use the information about electrical energy in various ways. Additionally, the home's energy usage could be identified and calculated. This energy consumption could then be tied in to the homeowner's budget and act as barometer for how well they are on track to meet their goal.

Positional sensor configured and operational to record the position of device 2006. For example, the positional sensor may be, or may comprise, a Global Positioning System (GPS) receiver, which may allow the position of device 2006 to be determined. Or, as another example, positional sensor may use triangulation technology that communicates with fixed points (such as wireless communication towers) to determine its position. While a dwelling 2200 normally does not move, positional sensor may allow device 2006 to be recovered in the event of a catastrophe. For example, if a dwelling 2200 explodes, or is otherwise catastrophically damaged, device 2006 may be propelled to an unknown location. Positional sensor may indicate the geographical area of a dwelling 2200 which an analysis model could use in various ways. Positional sensor may record the position of device 2006, which device 2006 could communicate to an external source, thereby allowing device 2006 to be found.

Structural sensor—configured and operational to preferably detect various structural conditions relating to dwelling 2200. A structural sensor may comprise detection hardware, or may employ one or more remote probes, which may be located inside and/or outside the dwelling 2200. Conditions recorded by structural sensor 300 may include (but are not limited to) the condition of the wall structure, floor structure, ceiling structure and roof structure of dwelling 2200, which may be achieved via: load bearing detectors; components which measure the slope of a floor/wall/ceiling; carpet conditions (e.g., via nano sensors) or any another components functional to detect such conditions. Structural readings from one or more locations inside and/or outside the dwelling 2200 could thus be recorded by device 2006 and used by an analysis model in various ways.

Environmental Sensor—configured and operational to preferably detect various environmental conditions relating to dwelling 2200. An environmental sensor may comprise detection hardware, or may employ one or more remote probes, which may be located inside and/or outside the dwelling 2200. Conditions recorded by an environmental sensor 300 may include (but are not limited to) the air quality present in dwelling 2200, the presence of mold/bacteria/algae/lead paint or any contaminant adverse to human health (whether airborne or attached to a portion of the structure of dwelling 2200). Such environmental readings from one or more locations inside and/or outside the dwelling 2200 could thus be recorded by device 2006 and used by an analysis model in various ways.

Appliance Sensor—configured and operational to preferably detect various operating parameters relating to appliances within a dwelling 2200. Examples of appliances include (but are not limited to) all kitchen appliances (e.g., refrigerator, freezer, stove, cooktop, oven, grill, dishwasher, etc.); HVAC components (air conditioner, heating system, air handlers, humidifiers/de-humidifiers, etc.), water purification system, media entertainment system (e.g., televisions), networking components (routers, switches, extenders, etc.), electrical generator system, pool filtration and heating system, garage door openers, sump pump and water well system, septic tank system, garage door opener, etc. An appliance sensor may comprise detection hardware, or may employ one or more remote probes, which may be located inside and/or outside the dwelling 2200 functional to detect certain operating parameters of appliances. Operating parameters detected by an appliance sensor 300 may include (but are not limited to): the operating efficiency of an appliance (energy usage, output performance); the time an appliance operates; the age of an appliance; maintenance needs of an appliance (e.g., change a filter component or schedule a periodic examination/tune-up); and repair needs of an appliance (which may also include the identification of parts needed). Such appliance readings from one or more dwelling appliances could thus be recorded by device 2006 and used by an analysis model in various ways.

Optical Recognition Sensor—configured and operational to recognize objects within a dwelling 2200 using optical characteristics.

Activity Monitoring Sensor—configured and operational to obtain information related to physical activity of the policyholder associated with a dwelling 2200. Three general categories of sensors can be used for measuring physical activity: movement sensors, physiological sensors, and contextual sensors. Many movement sensors can be used to measure human physical activities, including electromechanical switches (for heel strike detections), mercury switches, pedometers, inclinometers, gyroscopes and goniometers (for angles or postures), and accelerometers. Collectively, accelerometers are well-suited for measuring intensity of movements, thus are predominately used for assessing outcomes, such as overall physical activity levels and estimated energy expenditure. Examples of physiologic sensors may include (but are not limited to) heart rate, gas exchange ($O_2$ and $CO_2$ in breath and in blood), blood pressure, temperature (skin and core body), heat flux, sweating (galvanic skin response), blood chemistry (continuous glucose), electromyogram (electrical activity of muscle), and breathing frequency and volume. Some additional physiologic sensors may be useful for measuring specific components of physical activity that could not be achieved using movement sensors, such as using an electromyogram to assess skeletal muscle function and implantable sensors to detect blood glucose levels. Local contextual sensors can be used to answer questions about physical activity within structures, such as work-based activity patterns or movement patterns within the dwelling 2200.

With exemplary sensors 2004 identified and briefly described above, and as will be further discussed below, it is to be generally understood sensors 2004 preferably record certain data parameters relating to products and services provided by an insurance carrier, to enhance loss mitigation (e.g., push data in real-time from dwelling 2200 for maximizing preventable losses); determine dwelling damage; determine risk situations present; provide alarms/alerts; determine maintenance and repair needs; determine age and condition of a dwelling; determine habits and trends of dwelling 2200 inhabitants; and determine status of dwelling 2200 repairs and/or remodeling efforts (e.g., determine where and what type of work is being performed in a dwelling); and other value added services such as those described below.

It is to be understood and appreciated the aforementioned sensors 2004 may be configured as wired and wireless types integrated in a networked environment (e.g., WAN, LAN, Wi-Fi, 802.11X, 30, LTE, etc.), which may also have an associated IP address. It is to be further appreciated the sensors 2004 may consist of internal sensors located within the structure of dwelling 2200; external sensors located external of the structure of dwelling 2200; sound sensors for detecting ambient noise (e.g., for detecting termite and rodent activity, glass breakage, intruders, etc.); camera sensors such as those consisting of camera standalone devices, or by integrating into existing camera devices in a dwelling 2200. It is additionally to be understood and appreciated that sensors 2004 can be networked into a central computer hub (e.g., device 2006) in a dwelling to aggregate collected sensor data packets. Aggregated data packets can be analyzed in either a dwelling computer system (e.g., device 2006) or via an external computer environment (e.g., server 206). Additionally, it is to be understood data packets collected from sensors 2004 can be aggregated in dwelling computing device 2006 and send as an aggregated packet to server 2012 for subsequent analysis whereby data packets may transmitted at prescribed time intervals (e.g., a benefit is to reduce cellular charges in that some dwellings 2200 may not have Internet access or cellular service is backup when dwelling Internet service is nonfunctioning).

In accordance with an illustrated embodiment, in addition to the aforementioned the sensors 2004 being utilized relative to dwelling 2200, dwelling computing device 2006 may additionally be coupled to a clock 2204 which may keep track of time for device 2006, thereby allowing a given item of data to be associated with the time at which the data was captured. For example, device 2006 may recurrently capture readings of temperature, wind speed, humidity, appliance operating times, etc., and may timestamp each reading. The time at which the readings are taken may be used to reconstruct events or for other analytic purposes, such as those described below. For example, the timestamps on wind speed readings taken during a hurricane may allow it to be determined, after the hurricane has occurred, how quickly the wind speed rose in the vicinity of the dwelling 2200.

A storage component 2206 may further be provided and utilized to store data readings and/or timestamps in device 2006. For example, storage component 2206 may comprise, or may otherwise make use of, magnetic or optical disks, volatile random—access memory, non-volatile random-access memory, or any other type of storage device. There may be sufficient data storage capacity to store several hours or several days-worth of readings. For example, the severe part of a hurricane might last for half a day, a full day, or several days. Further, in another example, there might be various plumbing issues which may affect the water pressure in a plumbing system to be low. Storage component 2206 might have sufficient storage capacity to allow twelve or more hours of readings to be stored, thereby allowing forensic reconstruction of how the hurricane affected the dwelling 2200 during the full time that the dwelling 2200 was experiencing the hurricane's impact and/or allow, for example, five days of readings to be stored, such that the cause of the low water pressure may be diagnosed.

A communication component 2208 may further be provided and utilized to communicate recorded information from dwelling computing device 2006 to an external location, such as computer server 206, which may be associated with an insurance carrier. Communication component 2208 may be, or may comprise, a network communication card such as an Ethernet card, a Wi-Fi card, or any other communication mechanism. However, communication component 2208 could take any form and is not limited to these examples. Communication component 2208 might encrypt data that it communicates, in order to protect the security and/or privacy of the data. Communication component may communicate data recorded by device 2006 (e.g., data stored in storage component 2206) to an external location, such as server 2012. For example, server 2012 may be operated by an insurance company, and may collect data from dwelling computing device 2006 in order to learn about risks and needs and other analytics relative dwelling 2200 in which device 2006 located. Communication component 2208 may initiate communication sessions with server 2012. Or, as another example, server 2012 may contact device 2006, through communication component 2208, in order to receive data that has been stored by device 2006. Additionally, data from sensors 2004, clock 2204 and/or storage component 2206 may be communicated directly to server 2012, via network 2000, thus obviating or mitigating the need for dwelling computing device 2006.

Figure 13:
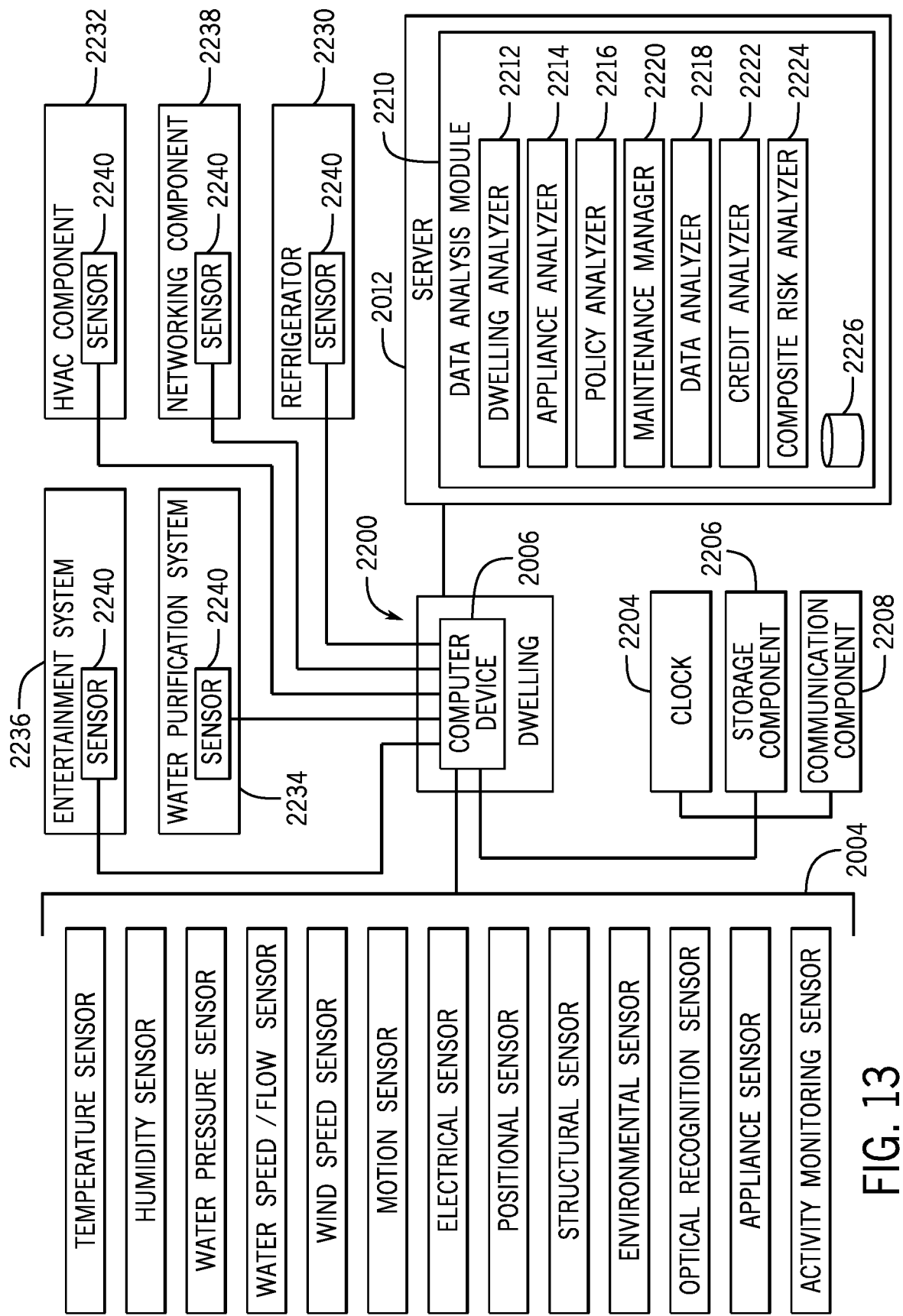
FIG. 13 is a block diagram illustrating dwelling-computing device coupled to various below described sensor types, in accordance with embodiments presented herein.

In the example of FIG. 13, communication component 324, as being part of, or used by, dwelling computing device 2006) communicates data to server 2012. Server 2012 may comprise, or otherwise may cooperate with, a data analysis module 2210, which may analyze data in some manner. Data analysis module 2210 may comprise various types of sub-modules, such as dwelling analyzer 2212, appliance analyzer 2214, policy analyzer 2216, data analyzer 2218, maintenance manager 2220, credit analyzer 2222, and composite risk analyzer 2224. In general, dwelling analyzer 2212 may perform an analysis of collected data regarding various aspects of dwelling 2200, such as data that used to determine age and condition of dwelling 2200; determine maintenance and repair needs for dwelling 2200 and the like. Appliance analyzer 2214 may perform an analysis of collected data regarding various appliances located in or around dwelling 2200, such as their age, operating parameters, maintenance/repair issues, and the like. Dwelling analyzer 2212 and appliance analyzer 2214 may overlap somewhat in terms of the techniques they employ—e.g., both of these sub-modules may analyze facts such as room temperature, humidity, etc., and attempt to draw some conclusions based on whether and/or how these facts have changed over time.

In general, maintenance manager 2220 may perform an analysis of maintenance profile generated by dwelling analyzer 306 and may perform an analysis of an insurance policy associated with the dwelling 2200. Moreover, maintenance manager 2220 may initiate a potential insurance claim related to one or more identified repair and/or maintenance needs. Server 106 may further comprise, or otherwise may cooperate with, a claim system repository 310, which may store various claim related data and information.

FIG. 13 illustrates dwelling 2200 appliances from which sensor data is captured for subsequent analysis in accordance with an illustrated embodiment. Computing device 2006 elements such as clock 2204, storage component 2206 and communication component 2208, as well as sub-modules of data analysis module 2210 have already been described with respect to FIG. 13. In addition to those elements already described, illustratively, a plurality of appliances are depicted in FIG. 13. Examples of appliances include (but are not limited to) all kitchen appliances (e.g., refrigerator 2230, freezer, stove, cooktop, oven, grill, dishwasher, etc.); HVAC components 2232 (air conditioner, heating system, air handlers, humidifiers/de-humidifiers, etc.), water purification system 2234, media entertainment system 2236 (e.g., televisions), networking components 2238 (routers, switches, extenders, etc.), electrical generator system, and the like. In many of the embodiments, appliances 2230-2238 have a computer based architecture or a controller that enables communication of data concerning the electronic appliance. It is to be understood dwelling appliances 2230-2238 may be located in any location inside or outside of dwelling 2200, and their positions are not limited to the example depicted in FIG. 13. In addition, a plurality of appliance sensors 2240 may be attached to and/or operatively connected to controllers of dwelling appliances 2230-2238.

Each of the appliance sensors 2240 may be configured and operational to preferably detect various operating parameters relating to appliances 2230-2238 within or outside the dwelling 2200. An appliance sensor may comprise detection hardware, or may employ one or more remote probes, which may be located inside and/or outside the dwelling 2200, functional to detect certain operating parameters of appliances 2230-2238. Operating parameters detected by an appliance sensor 2240 may include (but are not limited to): the operating efficiency of an appliance (energy usage, output performance); the time an appliance operates, the age of an appliance. Such appliance readings from one or more dwelling appliances 2230-2238 could thus be recorded by device 103 and used by an appliance analyzer 2214 in various ways. It is additionally to be understood and appreciated that appliance sensors 2240 can also be networked into a central computer hub (e.g., device 2006) in a dwelling to aggregate collected sensor data packets. Dwelling computing device 2006 may communicate its data to server 2012.

Figure 14:
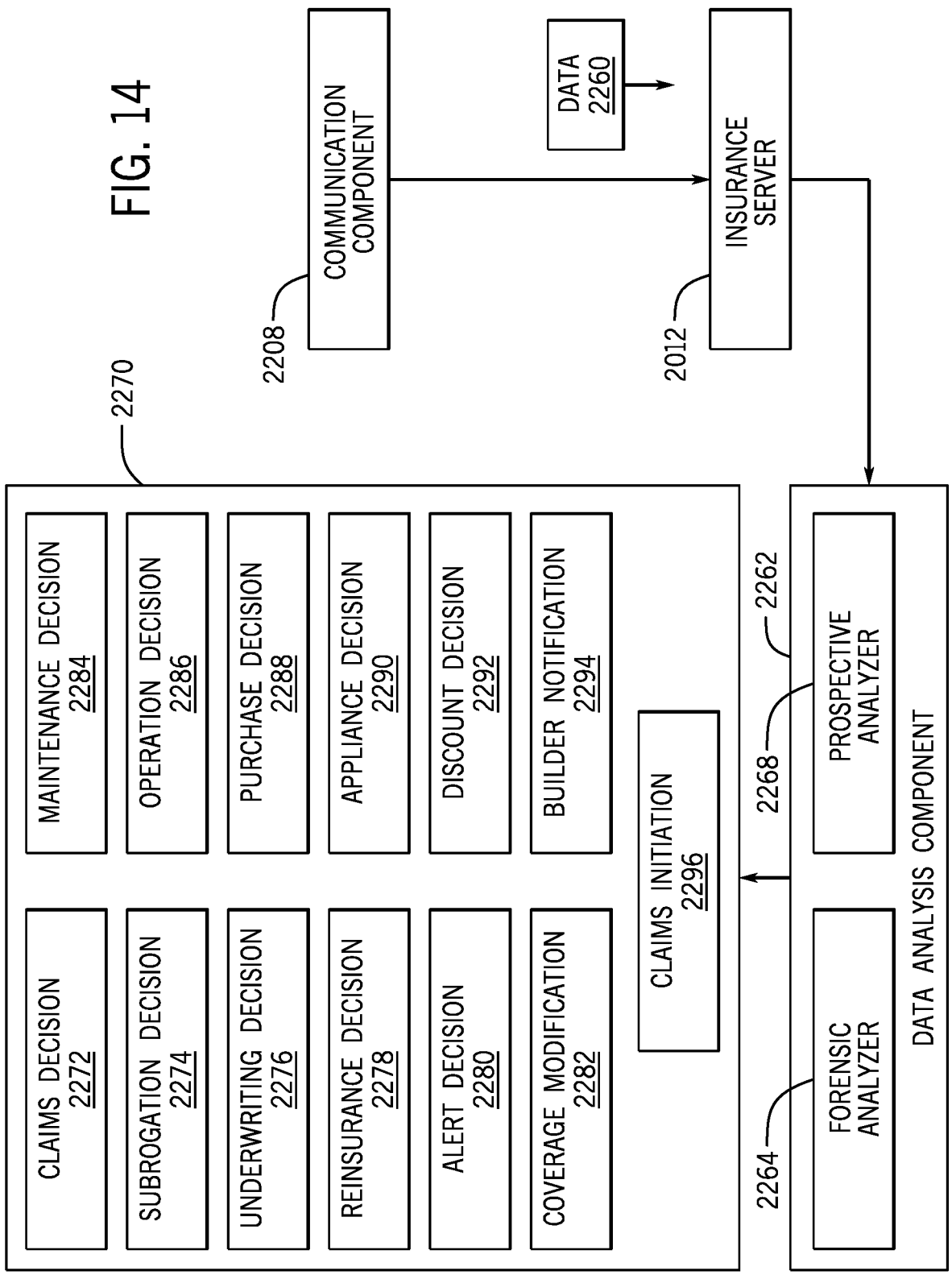
FIG. 14 is a block diagram illustrating server 2012 receiving data, the data being used in various ways, in accordance with embodiments presented herein.
Figure 15:
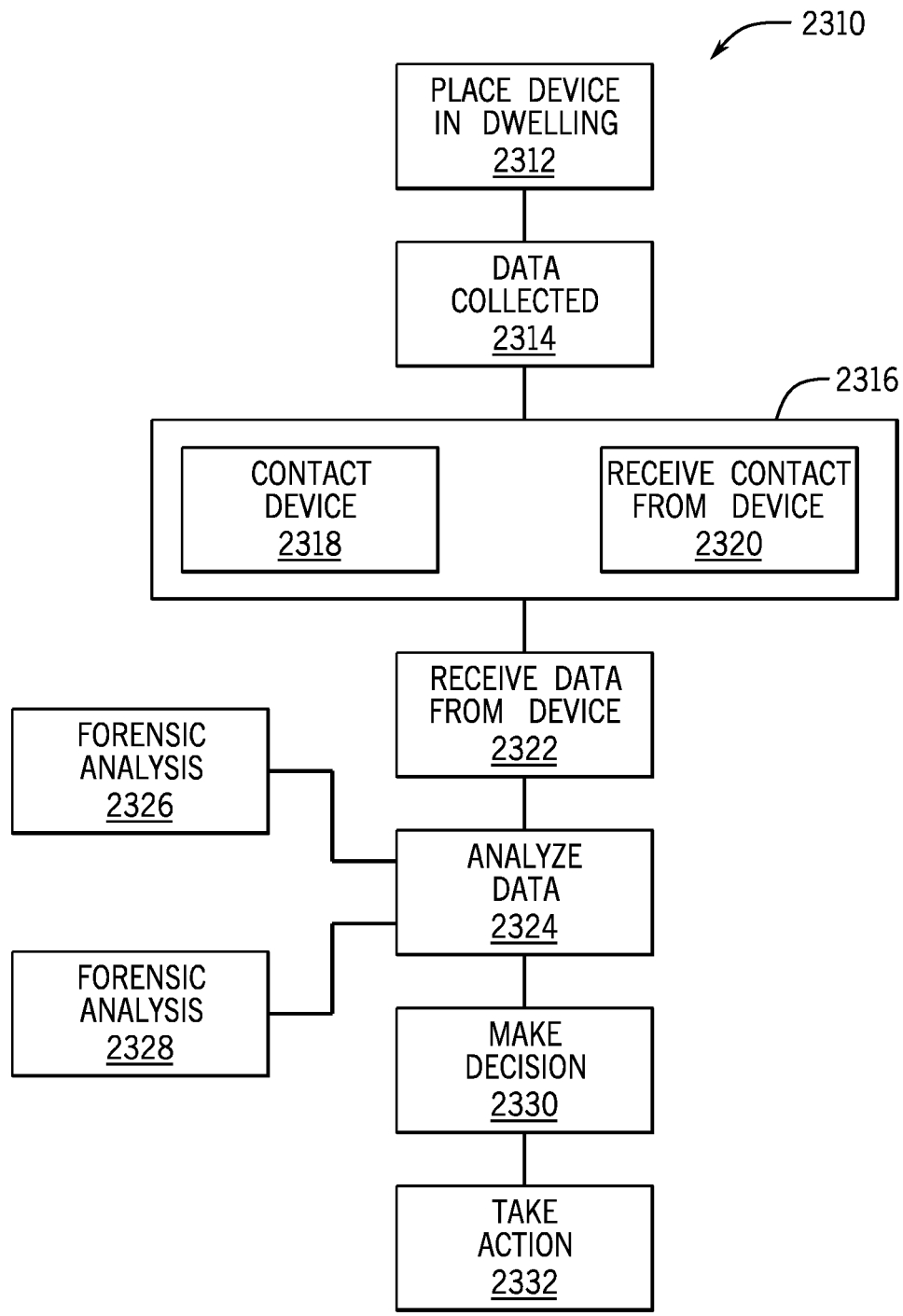
FIG. 15 is a flow chart, illustrating a process in which data may be recorded and used, in accordance with embodiments presented herein.

FIGS. 14 and 15 show, in the form of a flow chart, exemplary operational steps of the dwelling analyzer 2212 and policy analyzer 2216, respectively. Before turning to descriptions of FIGS. 14 and 15, it is noted that the flow diagram shown therein are described, by way of example, with reference to components shown in FIGS. 11-13, although these operational steps may be carried out in any system and are not limited to the scenario shown in the aforementioned figures. Additionally, the flow diagrams in FIGS. 14 and 15 show an example in which operational steps are carried out in a particular order, as indicated by the lines connecting the blocks, but the various steps shown in these diagrams can be performed in any order, or in any combination or sub-combination.

As previously noted, dwelling computing device 2006 may communicate its data to server 2012. FIG. 14 shows an example in which server 2012 receives such data, and in which the data is used in various ways. In the example of FIG. 14, communication component 2208 (which is shown, in FIG. 13, as being part of, or used by, dwelling computing device 2006) communicates data 2260 to server 2012. Server 2012 may comprise, or otherwise may cooperate with, a data analysis component 2262 (preferably utilizing software processes 2040), which may analyze data 2260 in some manner (e.g., predictive analytics). Data analysis component 2262 may comprise various types of sub-components, such as forensic analyzer 2264 and prospective analyzer 2268. In general, forensic analyzer 2264 may perform an analysis. For example, in one embodiment, a post hoc analysis, such as that used to understand the details of how a dwelling 2200 was damaged or destroyed during a hurricane, a fire, etc. Moreover, in general, prospective analyzer 2268 may analyze data to assess the risk of destruction and/or damage that has not yet happened; enhance loss mitigation for an insurance carrier (e.g., push data in real-time from dwelling 2200 for maximizing preventable losses); determine dwelling damage; determine risk situations present; provide alarms/alerts. Additionally and/or alternatively, an analysis may be performed on collected data regarding various aspects of the dwelling 2200, such as to determine maintenance and repair needs for dwelling 2200; determine age and condition of a dwelling; determine habits and trends of dwelling 2200 inhabitants; and determine status of dwelling 2200 repairs and/or remodeling efforts (e.g., determine where and what type of work is being performed in a dwelling); and other value added services such as those described below. Forensic analyzer 2264 and prospective analyzer 2268 may overlap somewhat in terms of the techniques they employ (e.g., both of these sub-components may analyze facts such as room temperature, humidity, wind speed, etc., and attempt to draw some conclusions based on whether and/or how these facts have changed over time).

The analysis performed by data analysis component 2262 may be used to make various types of decisions and/or enable the provision if certain products/services such as those that can be offered by insurance carrier services 2270. FIG. 14 illustrates exemplary decisions/products/services 2272-2296 that may be made based on analysis and predictive analysis, although the specific decisions decisions/products/services 2270 that are shown do not constitute an exhaustive list. Any type of decision may be made.

One type of decision that may be made is a claims decision 2272. For example, if a claim is made against an insurance policy, whether the claim is to be paid (or the amount of the claim to be paid) may depend on how a building was damaged or destroyed. Many homeowner's insurance policies insure against fire and earthquake differently (e.g., some policies cover fire but not earthquake), so if an earthquake strikes and a building is found collapsed and burnt, there are at least two possibilities as to how the building arrived in its current condition: (1) the building collapsed from the earthquake and then its collapsed remains burnt, or (2) the earthquake started a fire that burnt the building, and the burnt building remains collapsed. If fire is a covered risk and earthquake is not, then it may be relevant to determine whether (1) or (2) is what happened, since (2) would be a covered loss event and (1) would not be a covered loss event. Thus, analysis of data from a data recorder may be used to determine how a building was damaged or destroyed, which may be relevant in determining whether and/or how to pay a claim.

Another type of decision that may be made based on data from sensors 2004 is a subrogation decision 2274. For example, as the previously-described earthquake/fire example shows, the cause of a building's damage or destruction may be ambiguous. Whether to pay a claim is one type of decision that may be made based on how destruction and/or damage occurred, but another decision is whether to subrogate the claim. For example, property insurance may cover losses by fire and flood, but flood losses may be covered by a government insurance program and may be subrogatable. If a building collapses in a hurricane, it may be unclear whether the building collapsed from wind or from floodwaters, and yet this distinction may determine whether to subrogate the claim. Data from a data recorder may be used to make such a decision.

Another type of decision that may be made based on data from sensors 2004 is an underwriting decision 2276. For example, an insurance company may collect data about a house, and may use this data to determine whether to continue insuring that house, or to set the premium for insuring the house. Or, data about houses in a geographic area may be collected, and the insurance company may use this data to determine the general level of risk in the area. For example, if analysis of the data from fifty houses in a particular geographic location shows that average wind speed has been increasing over the past few years, then the insurance company may use this information to determine that the likelihood of losses due to wind damage is increasing, and may make coverage and/or premium pricing decision accordingly.

Another type of decision that may be made based on data from sensors 2004 is a reinsurance decision 2278. As previously discussed, the data may be used in making underwriting decisions. Along the same lines, an insurance company may use this data to determine how much reinsurance to purchase. If analysis of the data from the data recorder indicates that the insurance company's expected loss will exceed the company's tolerance for absorbing the losses, then the company may choose to purchase reinsurance. Thus, reinsurance decisions are yet another type of decision that may be made based on data from a data recorder.

Another type of decision that may be made based on data from sensors 2004 is an alert decision 2280. For example, if prospective analysis of collected data indicates that a house is at risk for some type of damage (e.g., fire, theft, CO2, Radon gas, foundation cracking, due to rotting caused by high humidity), an alert may be issued to the building owner in order to encourage the owner to take remedial action.

Another type of decision that may be made based on data from sensors 2004 is insurance coverage modification decision 2282. Based on data collected from sensors 2004 regarding a dwelling 2200, analysis is conducted to determine change recommendations to insurance products/services (that may be either currently existing or non-existing to a policy holder) which may be beneficial to a policy holder in view of current subscribed insurance products and coverage levels. For instance, a homeowner may not have insurance covering a particular type of event/loss, and based upon collected, and analyzed data from sensors 2004 (amongst possible other factors), a recommendation may be provided to a homeowner to subscribe to insurance covering such a particular type of event/loss. Additionally, a recommendation may be provided to increase, decrease, or make other adjustments to personal liability limits based upon detected trends and habits determined at least in part by data collected from certain sensors 2004.

Another type of decision that may be made based on data from sensors 2004 is maintenance and/or repair decision 2284. Based on data collected from sensors 2004 regarding a dwelling 2200, analysis is conducted to determine recommendations to make certain repairs (whether immediately needed or preventive in nature) to the structure of a dwelling 2200 and/or the dwelling appliances. For instance a hole may have been detected in the roof of a dwelling 2200 (via one or more sensors 2004) requiring immediate repair, or based upon certain analysis preventive maintenance is recommended to the roof a dwelling 2200 (e.g., detection of wind, moisture, improper roof slope line, etc.). Additionally, recommendations may be made with regards to appliances in the dwelling 2200. For instance, a recommendation may be made to repair an appliance (e.g., freezer) due to detected performance degradation contingent upon either it's past operating performance efficiency and/or its operating performance falling outside of threshold values prescribed for it by a manufacture. As another example, recommendations may be made to replace an HVAC filter element based upon detection of a dirty filter element or degradation in HVAC equipment performance likely contributable to a dirty filter element.

Another type of decision that may be made based on data from sensors 2004 is dwelling operation decision 2286. Based on data collected from sensors 2004 regarding operation of a dwelling 2200, analysis is conducted to determine recommendations to make certain adjustments/changes regarding operation a dwelling 2200. For instance, sensors 2004 may detect no inhabitants are home during certain hours of a day, thus adjustments to the HVAC system are recommended. As another example, sensors may detect a dryer is frequently used during peak utility hours thus a recommendation is made by data analysis component 2262 to operate the dryer during non-peak hours to gain the benefit of lower electricity rates.

Another type of decision that may be made based on data from sensors 2004 is purchase decision 2288. Based on data collected from sensors 2004 regarding operation of a dwelling 2200, analysis is conducted to determine recommendations to purchase new or replacement appliances for a dwelling 2200. For instance, sensors 2004 may detect frequent high humidity levels in a dwelling 2200 and may thus recommend purchase of a de-humidifier. Additionally, the data analysis component 2262 may determine that based on age and operating efficiency of an air conditioning unit for a dwelling 2200, a new unit would be more beneficial and economical for the owner/operator of a dwelling 2200.

Another type of decision that may be made based on data captured from sensors 2004 is appliance insurance decision 2290. Based on data collected from sensors 2004 regarding operating parameters of appliances in a dwelling 2200, analysis is conducted in component 2262 to determine whether the provision of appliance warranty/replacement insurance would be beneficial to the owner/operator of the dwelling 2200. The premium amount for such an insurance product is preferably determined and contingent upon such factors including operating performance, maintenance history, habits/trends of dwelling inhabitants and appliance age via data captured from various sensors 2004 and other sources.

Another type of decision that may be made based on data captured from sensors 2004 is policy discount decision 2292. Based on the decision of an owner/operator of a dwelling 2200 to share data from sensors 2004 with an insurance carrier (e.g., insurance carrier server 206), discount on the insurance policy for a dwelling 2200 may be provided. Maintaining (or providing adjustments to) the policy discount may be contingent upon the adherence of certain conditions, such as maintenance of the dwelling structure, as determined by data captured from the dwelling sensors 2004. As another example, data analysis component 2262 may compile a home maintenance score (dependent upon sensor data) which is utilized to determine if it satisfies a threshold score value prescribed by the insurance carrier to maintain policy discounts contingent upon prescribed maintenance obligations.

Another type of service that the insurance carrier services 2270 may provide based on data captured from sensors 2004 is builder notification 2294. Based on the data collected from the various sensors 2004 of a dwelling 2200, this data may be complied and/or aggregated into a certain format so as to be shared with dwelling builders/contractors/designers to improve future build quality/design of a similar dwelling and/or for soliciting dwelling improvement recommendations from such builders/contractors/designers.

Still another type of service that the insurance carrier services 270 may provide based on data captured from sensors 2004 is automatic initiation of a claims submission/ adjustment process on behalf of a policy holder for a dwelling 2200. For instance, when data analysis component 2262 detects a claims submission/adjustment has occurred relative to a dwelling 2200 (e.g., flooded basement) based upon data from one or more sensors 2004, the claims submission process is automatically initiated to expedite the process on behalf of the policy holder for a dwelling 2200, preferably in the absence of any submission by the policy holder for a dwelling 2200.

With certain services that may be provided by the insurance carrier services 2270 described above in conjunction with FIG. 14, it is to be appreciated that all applicable alerts I alarm signals I and other notifications regarding such services/processes 2272-2296 are to be provided in all applicable communications formats (e.g., email, telephony, txt, smart phone apps, social media, social media (Twitter, Facebook), etc.). It is to be also understood and appreciated that insurance carrier services 2270 (preferably via computer server 206) is configured and operational to integrate with user communicative computing devices (e.g., smart phones (via an app), computers, tablets, smart TV's, vehicle communication systems, etc.) for sending such alerts I alarm signals I and other notifications regarding such services/processes 2272-2296.

FIG. 15 shows, in the form of a flow chart, an example process 2310 in which data may be recorded and used. Before turning to a description of FIG. 15, it is noted that the flow diagram shown therein is described, by way of example, with reference to components shown in FIGS. 11-14, although this process may be carried out in any system and is not limited to the scenario shown in FIGS. 11-14. Additionally, the flow diagrams in FIG. 15 shows an example in which stages of a process are carried out in a particular order, as indicated by the lines connecting the blocks, but the various stages shown in this diagram can be performed in any order, or in any combination or sub-combination.

At 2312, a dwelling computing device 2006 may be placed in a dwelling. For example, dwelling computing device 2006 may be placed in dwelling 2200, as shown in FIG. 13 (although any type or number of dwelling computing devices 2006 could be placed in any type of dwelling). At 2314, the dwelling computing device 2006 collects data from sensors 2004. Mechanism by which the dwelling computing device 2006 may collect sensor data have been previously described in connection with FIG. 13.

At 2316, contact is made between the dwelling computing device 2006 and a mechanism that collects data from the dwelling computing device 2006. An example of such a mechanism is insurance carrier server 2012 (via network 2000) (shown in FIG. 13), although the subject matter herein is not limited to this example. As previously described, contact between the dwelling computing device 2006 and a server 2012 may be initiated when the server 2012 contacts the dwelling computing device 2006 (at 2318), or when the mechanism receives a contact request from the dwelling computing device 2006 (at 2320).

At 2322, following the initial contact between the dwelling computing device 2006 and the server 206, server 2012 may receive data from the dwelling computing device 2006. At 2324, the data may be analyzed preferably in data analysis component 2262. As noted previously in connection with FIG. 14, the analysis may include a forensic analysis (at 2326) and/or a prospective analysis (at 2328). At 2330, a decision may be made based on the analysis that has been performed. Examples of such decisions, and examples of techniques that may be used in making such decisions, have been described previously in connection with FIG. 14. At 2332, a tangible action may be taken based on the decision that is made. For example, if prospective analysis indicates that a building may be heading toward damage, an alert could be issued and communicated to the building's owner, and the owner could take remedial action such as affecting a physical condition present at the building (e.g., reducing the temperature and/or humidity level, installing new equipment in the building, repairing an existing physical condition in the building, etc.).

Figure 16:
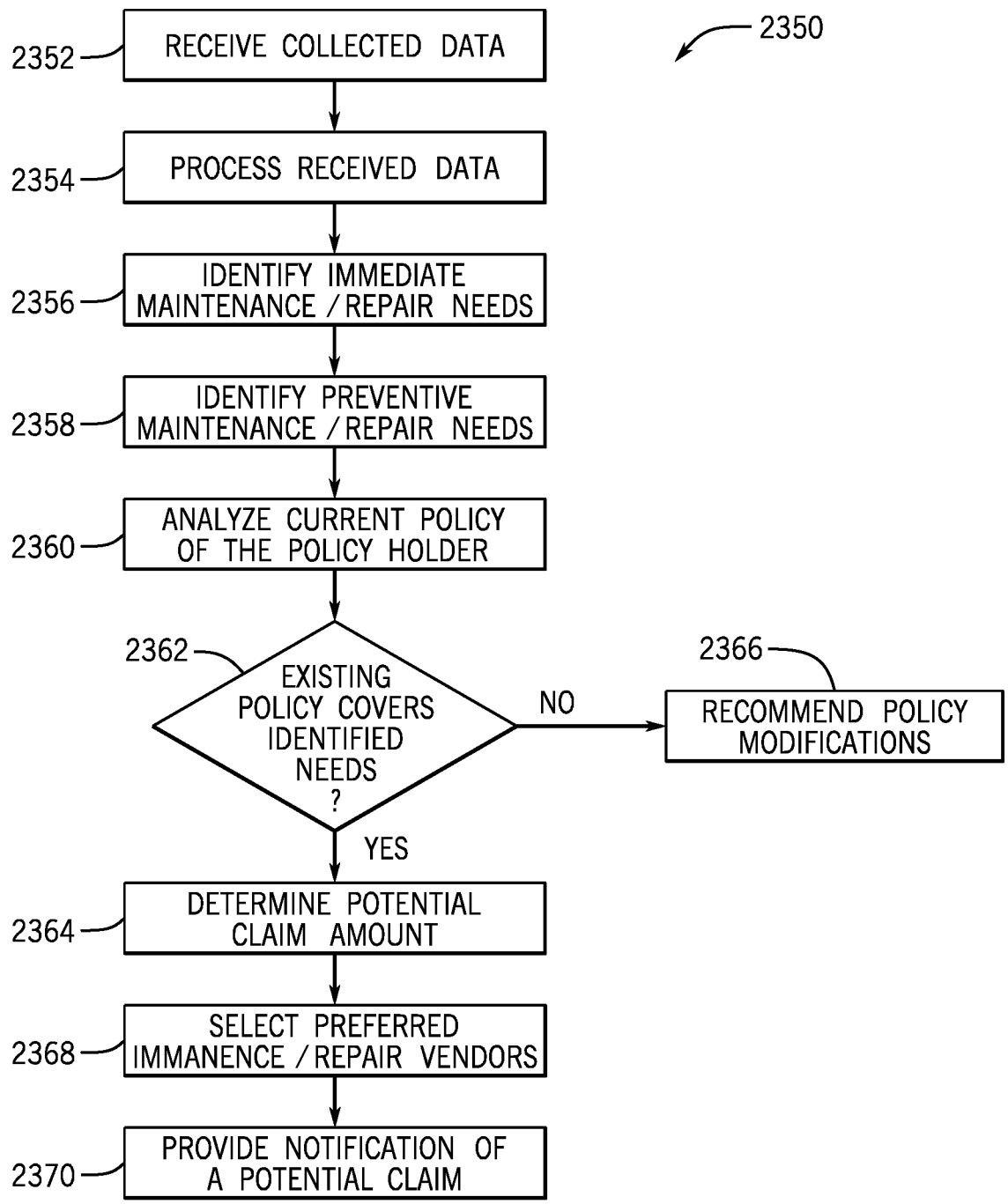
FIG. 16 is a flow chart, illustrating a process where dwelling analyzer collects data from sensors, in accordance with embodiments presented herein.

With reference to process 2350 of FIG. 16, at 2352, dwelling analyzer 2212 preferably collects data from sensors 2004. In an embodiment of the present disclosure, this step may involve computing device 2006 periodically contacting (via network 100), at prescribed time intervals, data analyzer component 2218 running on server 2012 to send accumulated data. In an alternative embodiment, contact between the dwelling computing device 2006 and dwelling analyzer 2212 may be initiated when the dwelling analyzer 2212 contacts the dwelling computing device 2006. Following the initial contact, dwelling analyzer 2212 may receive data from the dwelling computing device 2006. It is to be understood data packets collected from sensors 2004 can be aggregated in dwelling computing device 2006 and send as an aggregated packet to dwelling analyzer 2212 for subsequent analysis.

At 2354, dwelling analyzer 2212 preferably processes the received data. For example, dwelling analyzer 2212 may include a parser configured to parse the aggregated packet and classify the received data based on, for example, type of sensor employed to collect a particular subset of the received data. Dwelling analyzer 2212 may create a data structure for each classification. This step may further involve identifying a policy holder associated with dwelling 2200 from which the received data is collected. At 2356, based on data collected from sensors 2004 regarding a dwelling 2200, dwelling analyzer 2212 conducts an analysis to determine recommendations to make certain immediately needed repairs to the structure of a dwelling 2200. For instance a hole may have been detected in the roof of dwelling 2200 (via one or more sensors 2004), requiring immediate repair. As another example, an environmental sensor may have detected a gas leak or any contaminant adverse to human health. As another example, dwelling temperature analysis may have indicated a malfunctioning cooling/heating system. In general, any dwelling condition that affects the residents' health or safety may be considered by dwelling analyzer 2212 as requiring an immediate repair. Similarly, at 2358, dwelling analyzer 2212 conducts an analysis to identify certain preventive repairs to the structure of a dwelling 2200. For example, based upon certain analysis, dwelling analyzer 2212 may recommend preventive maintenance to the roof a dwelling 2200 (e.g., detection of wind, moisture, improper roof slope line, etc.). As another example, based upon analysis of a plumbing system, dwelling analyzer 2212 may have detected long-term stress on pipes. In order to prevent water leaks, dwelling analyzer 2212 may recommend reducing water pressure (e.g., by installing a water softener) to prevent future plumbing leaks. As another example, based upon, for example, an air flow analysis, dwelling analyzer 2212 may have detected that damaged frames and/or dividers allow air leaks into dwelling 2200. Thus, dwelling analyzer 2212 may make recommendations with regards to window replacement/repair needs. At 2360, dwelling analyzer 2212 preferably analyzes current policy of a policy holder residing at dwelling 2200 with respect to either immediate and/or preventive needs identified at steps 2356 and 2358. For example, dwelling analyzer 2212 may determine whether policy holder's current policy covers any of the identified maintenance/repair needs. In response to determining that the current policy does not cover identified immediate/preventive repair and/or maintenance issues (step 2362, no branch), dwelling analyzer 2212, at 2366, preferably recommends one or more current policy modifications based on the analysis performed at step 2360. For example, if dwelling analyzer 2212 determines that the current policy of the dwelling resident does not cover any of the preventive repairs, a recommendation may be made to add such coverage to the pre-existing policy.

In response to determining that current policy covers some or all of the identified immediate/preventive repair and/or maintenance needs (step 2362, yes branch), dwelling analyzer 2212, at 2364, preferably determines potential claim amount. For example, dwelling analyzer 2212 may determine the total amount of benefits potentially payable on claims associated with identified needs, if the policyholder chooses to make one or more claims against the insurance policy. In this step, dwelling analyzer 2212 may derive the total amount of benefits based upon, for example, the total repair estimate amount. The total repair estimate amount may include both a labor estimate and a parts estimate.

At 2368, dwelling analyzer 2212 preferably selects one or more preferred maintenance/repair vendors. Maintenance/repair vendors are separate entities, each with the capability to perform a particular type of repair. For example, one vendor may specialize in insurance restoration work on roofing, siding, gutters and windows. Another vendor may have the capability to repair and fix the gas leak. Thus, dwelling analyzer 2212 may select one or more preferred vendors based, at least in part, on data collected from sensors 2004. In an embodiment of the present disclosure, the preferred vendors can have exclusive capabilities, meaning that the capability to handle any one particular repair by one vendor is not shared by the remaining vendors. In an alternative embodiment, the preferred vendors can have nonexclusive capabilities, meaning that the capability to handle any one repair service by any one vendor is shared by one or more remaining vendors. Moreover, the capabilities of various vendors to handle the same type of repair may involve different technologies and charges (i.e., costs). The preferred vendor list may be stored, for example, in insurance server 2012 database.

At 2370, dwelling analyzer 2212 preferably provides a notification of a potential claim against the policyholder's insurance policy. It is to be appreciated that dwelling analyzer 2212 may be configured to deliver all notifications regarding the potential claim corresponding to the determined repair/maintenance services electronically. The notification can be anything that advises a policy holder, device, or computer system of the maintenance/repair issue, including but not limited to, a display of text on a local display screen, a message in an email sent to a local or remote computer, a text message, a communication to a remote computer system. The electronic delivery may include integration of notification functionalities. It is to be also understood and appreciated that dwelling analyzer 2212 may be configured and operational to integrate with policy holder's communicative computing devices (e.g., smart phones (via an app), computers, tablets, smart TV's, vehicle communication systems, etc.) for sending such notifications regarding such potential insurance claims. In an embodiment of the present disclosure, each notification may include, but not limited to, one or more immediate repair and/or preventive repair (maintenance) needs, the total amount of benefits potentially payable on corresponding claim(s), preferred repair/maintenance vendors and any additional information related to the potential insurance claim.

Figure 17:
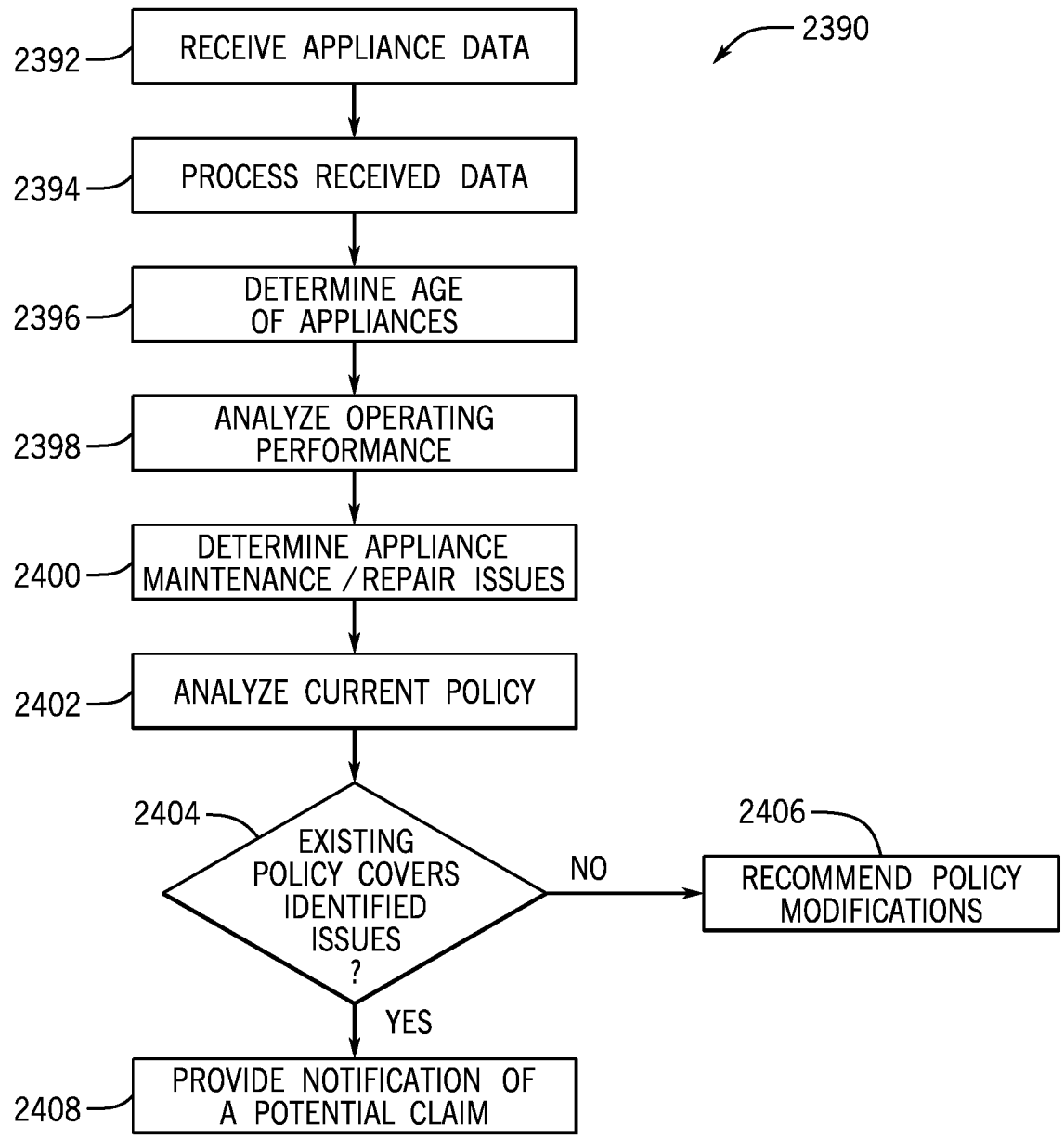
FIG. 17 is a flow diagram of a process of operational steps of the appliance analyzer module of FIG. 13, in accordance with embodiments presented herein.

Additionally, recommendations may be made with regards to appliances 2230-2238 in the dwelling 2200. FIG. 17 is a flow diagram of a process 2390 of operational steps of the appliance analyzer module of FIG. 13 in accordance with an illustrated embodiment. With reference to FIG. 17, at 2392, appliance analyzer 2214 preferably collects data from a plurality of appliance sensors 2240 (shown in FIG.

13). As already has been discussed with respect to dwelling analyzer 2212, in the context of FIG. 16, contact between the dwelling computing device 2006 and appliance analyzer 2214 may be initiated by either the appliance analyzer 2214 or dwelling computing device 2006. Following the initial contact, appliance analyzer 2214 may receive data from the dwelling computing device 2006. It is to be understood data packets collected from appliance sensors 2240 can be aggregated in dwelling computing device 2006 and sent as an aggregated packet to appliance analyzer 2214 for subsequent analysis.

At 2394, appliance analyzer 2214 preferably processes the received data. For example, just like the dwelling analyzer 2212 discussed above, appliance analyzer 2214 may include a parser configured to parse the aggregated packet and classify the received data based on, for example, type of appliance corresponding to a particular subset of the received data. Appliance analyzer 2214 may create a data structure for each classification. This step may further involve identifying a policy holder associated with dwelling 2200 in which the analyzed appliances are located.

At 2396, appliance analyzer 2214 preferably determines the age of the appliances 2230-2238 or parts thereof and/or length of service of the appliances 2230-2238 based on data captured from sensors 2240. At 2398, appliance analyzer 2214 preferably analyzes operating parameters with respect to appliances 2230-2238. This step may further involve analyzing environmental conditions in which appliances 2230-2238 operate. For example, appliance analyzer 2214 may use environmental data measured with a plurality of sensors 2004 situated at or near the analyzed appliances 2230-2238. The environmental data may be indicative of temperature, humidity, pressure, averages of the foregoing measurements over a time period, etc. More specifically, appliance analyzer 2214 may be configured to identify maintenance/repair issues based upon environmental conditions in conjunction with operating parameters.

At 2400, appliance analyzer 2214 preferably identifies one or more maintenance/repair issues with respect to appliances 2230-2238. As non-limiting examples, the maintenance/repair issue can be any one or more of the following: a need for replacement of the appliance 2230-2238 or a component thereof, a need for repair of the appliance 2230-2238 or a component thereof, a need for battery recharging, lifespan expired, lifespan below a predefined threshold, power inadequacy, appliance inoperability for intended purpose, inoperability of one or more functions (electrical and/or mechanical), network connectivity failure, and the like. For instance, appliance analyzer 2214 may detect performance degradation of an appliance (e.g., refrigerator 2230) upon either it's past operating performance efficiency and/or its operating performance falling outside of threshold values prescribed for it by a manufacturer. As another non-limiting example, appliance analyzer 2214 may detect a dirty filter in another appliance (e.g., HVAC component 2232) and/or may detect degradation in HVAC component 2232 performance likely contributable to a dirty filter element.

At 2402, appliance analyzer 2214 preferably analyzes current appliance insurance policy of a policy holder residing at dwelling 2200 with respect to maintenance/repair issues identified at step 2400. For example, appliance analyzer 2214 may determine whether current policy of the policy holder covers any of the identified maintenance/repair needs. In response to determining that the current policy does not cover at least one of the identified appliance maintenance/repair issues (step 2404, no branch), appliance analyzer 2214, at 2406, preferably recommends one or more insurance policy modifications based on the analysis performed at step 2360. For example, if appliance analyzer 2214 determines that the current appliance insurance policy does not cover performance degradation for any of the appliances 2230-2238 situated within the dwelling 2200, a recommendation may be made to add such coverage to the pre-existing policy.

In response to determining that the current policy covers some or all of the identified appliance repair/maintenance issue (step 2404, yes branch), appliance analyzer 2214, at 2408, preferably provides a notification of a potential claim against the policyholder's appliance insurance policy. As previously noted, the notification can be anything that advises a policy holder, device, or computer system of the appliance maintenance/repair issue, including but not limited to, a display of text on a local display screen, a message in an email sent to a local or remote computer, a text message, a communication to a remote computer system. Appliance analyzer 2214, may further include programming instructions to engage in a communication session over the Internet with a remote computer system associated with an appliance manufacturer, an appliance vendor, a repair service entity, a replacement service entity, or an appliance information provider, and during the communication session, obtain information related to service, replacement, maintenance, etc., in connection with one or more of the appliances 2230-2238. According an embodiment of the present disclosure, each notification provided at 2408 may list one or more repair/maintenance needs, the total amount of benefits potentially payable if the policy holder chooses to initiate the potential insurance claims, preferred repair/maintenance vendors and any additional information related to the potential insurance claim.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features.

The foregoing description should therefore be considered as merely illustrative of the principles, teachings and exemplary embodiments of this disclosure, and not in limitation thereof.

Figure 18:
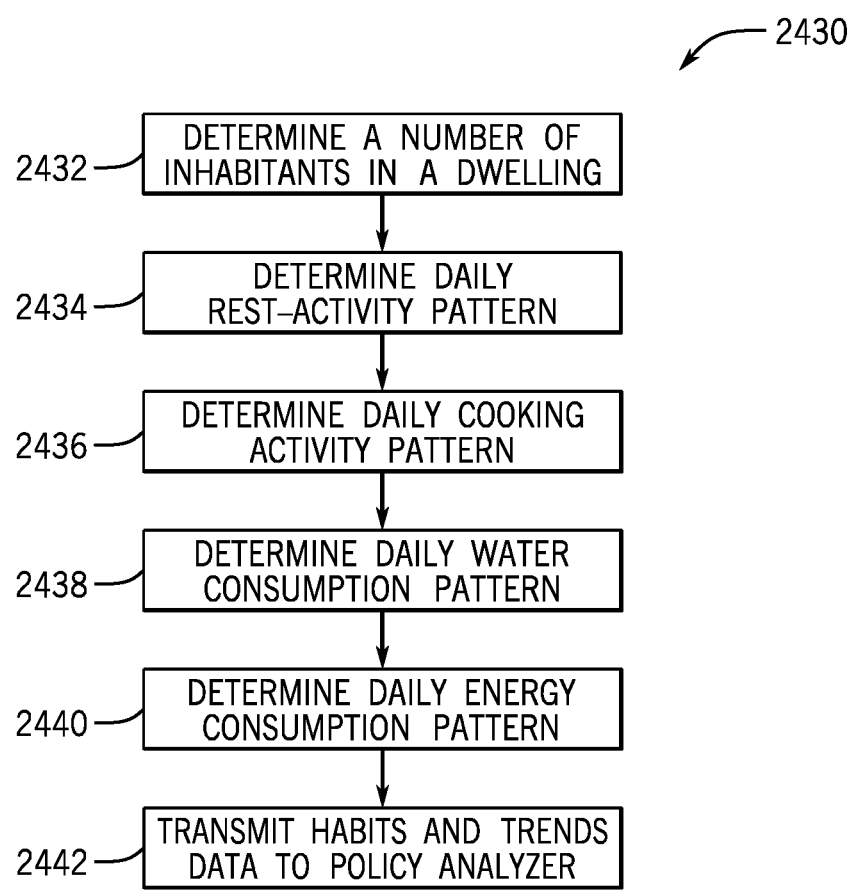
FIG. 18 is a flowchart, illustrating a process where dwelling analyzer preferably collects data from sensors to determine a number of people occupying the dwelling at various points in time for insurance purposes, in accordance with embodiments presented herein.

With reference to the process 2430 of FIG. 18, at 2432, dwelling analyzer 2212 preferably collects data from sensors 2004 to determine a number of people occupying the dwelling 2200 at various points in time for insurance purposes. In an embodiment of the present disclosure, this step may involve computing device 2006 periodically contacting (via network 100), at prescribed time intervals, data analyzer component 2218 running on server 2012 to send data collected by a plurality of motion sensors 2004. It is noted, a variety of motion sensors 2004 are preferably installed at various points around the dwelling 2200 such as in the living room, bedroom, kitchen, and bathroom. The sensors are arranged to communicate with the computing device 2006, which, for example, may be located in a hallway near a main entrance of the dwelling 2200. The one or more motion sensors 2004 may be configured and operational to monitor movement of dwelling inhabitants in different areas of the dwelling 2200. In an embodiment of the present disclosure, motion sensors 2004 may comprise passive infrared detectors. Dwelling analyzer 2212 may determine, for example, whether the dwelling 2200 was occupied by more than one inhabitant by detecting substantially simultaneous motion patterns at various points around the dwelling 2200.

At 2434, dwelling analyzer 2212 preferably processes the informatics data collected by a plurality of motion sensors 2004 to determine daily rest-activity pattern. For example, dwelling analyzer 2212 may estimate rest-activity parameters such as bed time, rise time, sleep latency, and nap time for one or more inhabitants of the dwelling 2200 by combining data from multiple sensors 2004 located around the dwelling 2200. As another example, dwelling analyzer 2212 may be configured to determine whether the dwelling remains unoccupied for an extended period of time. This information may be used by policy analyzer 2216, for instance, to determine proper insurance coverage levels for personal property contained within the dwelling 2200.

At 2436, based on data collected from sensors 2004 regarding a dwelling 2200, dwelling analyzer 2212 preferably conducts an analysis to determine daily cooking activity pattern of one or more dwelling 2200 inhabitants. In an embodiment of the present disclosure, one or more appliance sensors 2004 may be employed to measure the use of cooking appliances such as a kettle, a fridge, a washing machine, a microwave oven or an electric cooker. For example, dwelling analyzer 2212 may detect the cooking time trends by detecting that a rice cooker or microwave oven is turned on/off, detecting that a gas range or an IH (Induction-Heating) cooking heater is turned on/off or detecting other cooking home electric appliances are turned on/off. As another example, dwelling analyzer 2212 may combine data collected from various types of sensors, such as motion and appliance sensors 2004, to determine, for instance, whether any of the cooking appliances remain unattended for an extended period of time, thus increasing the risk of fire. The daily cooking activity tracking may be adaptive. In other words, dwelling analyzer 2212 preferably gradually adjusts to the dwelling inhabitant's new activities and/or habits if they change over time. In general, dwelling analyzer 2212 may assess the risk of fires and explosions arising from various activities of dwelling inhabitants and/or observed events and use this information to provide targeted specific advice and guidance at dwelling 2200 to reduce the chance of fires and explosions arising from the activity.

At 2438, dwelling analyzer 2212 conducts an analysis to determine daily water consumption pattern. For example, based upon analysis of a plumbing system, dwelling analyzer 2212 may have detected long-term stress on pipes and may estimate future plumbing leaks. In order to prevent water leaks, dwelling analyzer 2212 may recommend reducing water pressure (e.g., by installing a water softener). As another example, dwelling analyzer 2212 may have detected that dwelling 2200 inhabitants tend to leave shower faucets running while answering the phone, thus increasing the risk of flooding in a bathroom. Dwelling inhabitants' behavior patterns during a storm can also increase the risk of flooding. For example, a combination of washing clothes, taking a shower, and running the dishwasher could add water to a system that may already be overloaded. The water may have nowhere to go but into the basement of the dwelling 2200. Thus, dwelling analyzer 2212 may flag certain water consumption patterns of dwelling inhabitants as hazardous and use this information to provide targeted specific advice and guidance to reduce the water leaks at dwelling 2200.

Similarly, at 2440, dwelling analyzer 2212 preferably performs an analysis to determine daily energy consumption pattern. For example, based upon analysis of the dwelling's 2200 electrical system, dwelling analyzer 2212 may have detected the load pattern and energy amount are different in weekdays and weekends. For instance, during the weekday the minimum load may occur between 2:00 and 6:00 in the morning when most of dwelling occupants are sleeping and morning peak may be between approximately 7:00 AM and 10:00 AM, while the night peak may occur between approximately 7:00 PM and midnight when the dwelling 2200 inhabitants are at home, making dinner and using the entertainment appliances. On weekends there might be a mid-day peak load between approximately 10:00 AM and 03:00 PM, while night peak may occur between approximately 07:00 PM and 10:00 PM. In addition, in this step, dwelling analyzer 2212 may flag certain energy consumption patterns of dwelling inhabitants as hazardous.

Thus, in steps 2432-2440, dwelling analyzer 2212 collects various characteristics indicative of habits and trends of dwelling 2200 inhabitants. At 2442, dwelling analyzer 2212 preferably transmits these characteristics to policy analyzer module 2214. In an embodiment of the present disclosure dwelling 2200 inhabitants' habits and trends characteristics may include, but not limited to, daily water consumption and energy consumption patterns, daily cooking activity pattern, number of inhabitants, hazardous activities pattern, and the like. In an alternative embodiment, dwelling analyzer 2212 may store these habits and trends characteristics in insurance server 2012 database. The readings of the amount of energy/water used at dwelling 2200 can be used to analyze and forecast an expected energy/water bill. This can also be used for budgeting and finance management because a history of energy/water usage at the dwelling 2200 or certain appliances can be measured and displayed to the homeowner or insurance company. These readings and usage can be provided to the homeowner so that he can budget X amount of money each month for the energy/water bill. Also, the homeowner or insurer can track energy/water use and determine based upon the rate of energy consumption that the homeowner is on a pace to use more or less energy/water use than is budgeted. If the homeowner is on pace to use more energy/water than is budgeted the insurance company can provide advice and guidance on how the homeowner can reduce energy use. If the homeowner is on pace to use less energy/water than is budgeted the insurance company can help the homeowner in moving the unspent portion of the budget amount to a savings device like a CD or money market.

Figure 19:
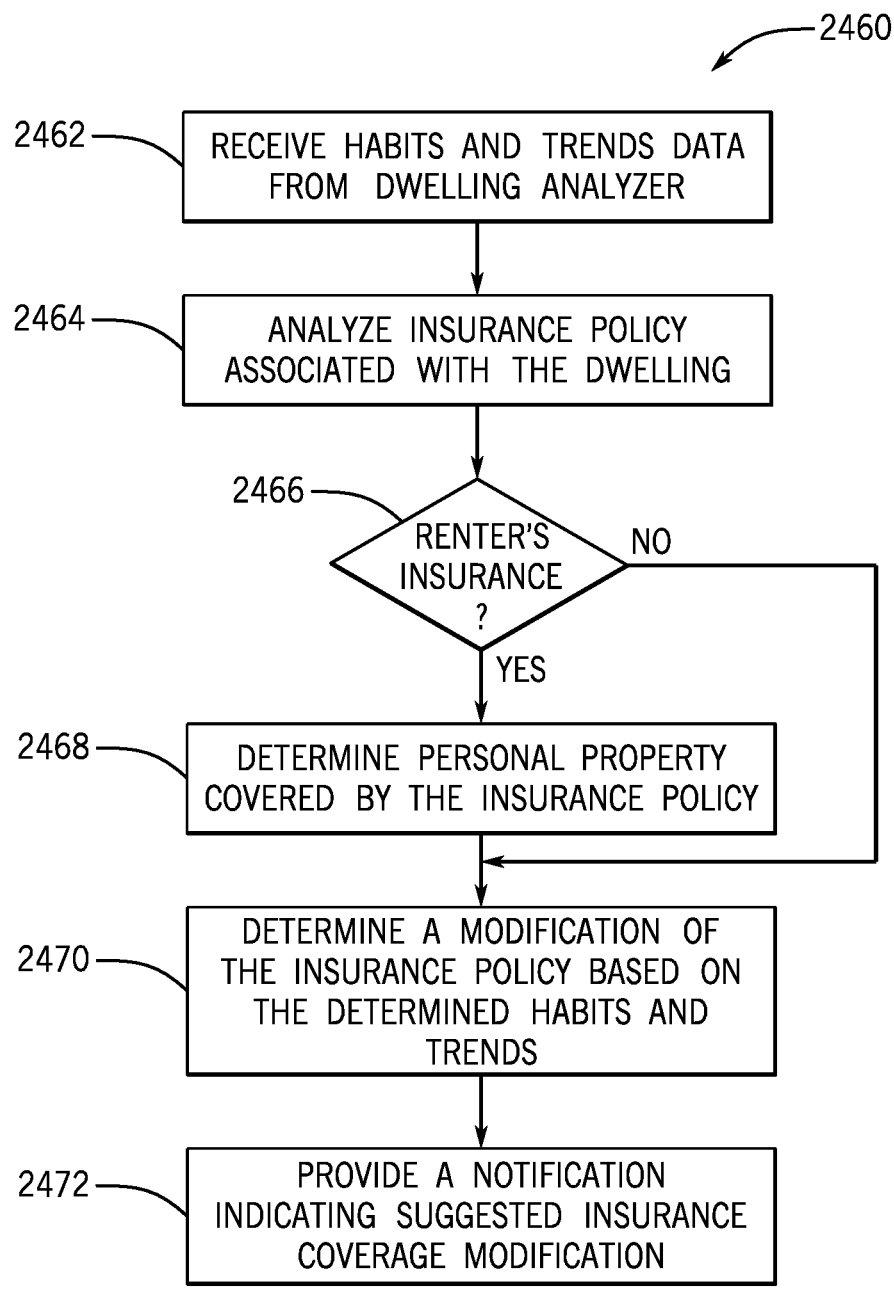
FIG. 19 is a flow diagram of a process of operational steps of the policy analyzer module of FIG. 13, in accordance with embodiments presented herein.

FIG. 19 is a flow diagram of a process 2460 of operational steps of the policy analyzer module of FIG. 13 in accordance with an illustrated embodiment. At 2462, policy analyzer 2216 preferably receives dwelling 2200 habits and trends information from the dwelling analyzer 2212. In an alternative embodiment of the present disclosure, this step may involve the policy analyzer 2216 retrieving habits and trends information from the insurance server's 2012-storage component. Next, policy analyzer 2216 preferably maps the received/retrieved data to a particular insurance policy associated with the dwelling 2200.

At 2464, policy analyzer 2216 preferably analyzes the insurance policy associated with the dwelling 2200. For example, policy analyzer 2216 may identify the type of the insurance policy. In other words, policy analyzer 2216 may determine whether the corresponding policy comprises homeowner's insurance, renter's insurance, umbrella liability insurance, and the like. In addition, policy analyzer 2216 preferably determines whether the insurance policy covers damage to or destruction of the dwelling 2200, whether it covers damage to or destruction of detached structures and whether it covers a plurality of appliances in the dwelling 2200 amongst other coverages.

According to an embodiment of the present disclosure, at 2466, policy analyzer 2216 checks whether the identified insurance policy type is renter's insurance. Such insurance typically covers personal property within a dwelling and policy holders typically do not own the structure they occupy. This type of policy can also cover liabilities arising from accidents and intentional injuries for guests of a covered dwelling. In response to determining that dwelling 2200 is covered by the renter's insurance policy (step 2466, yes branch), at 2468, policy analyzer 2216 may determine additional coverage details associated with this type of policy. For instance, policy analyzer 2216 may identify personal property within the dwelling 2200 that is covered by the insurance policy. Such property may include, but not limited to, jewelry, furniture, musical instruments, electrical and/or kitchen appliances, guns, furs, various items of fine art and antiques, collectible items, valuable papers, business property, and the like. This step may also involve policy analyzer 2216 determining property coverage limits as well as estimating the cost to replace the policyholder's personal belongings. While steps 2466 and 2468 are discussed with reference to renter's insurance policy, it is understood that this discussion is provided for illustrative purposes only. A person skilled in the relevant art will recognize that policy analyzer 2214 may determine other types of information relevant to the specific type of the insurance policy without departing from the scope and spirit of the presently disclosed embodiments.

In response to determining that dwelling 2200 is covered by other type of insurance policy (step 2466, no branch), policy analyzer 2216, at 2470, preferably determines change recommendations to insurance products/services (that may be either currently existing or non-existing) which may be beneficial to a policy holder in view of current subscribed insurance products and coverage levels (i.e., current policy coverage levels). Policy analyzer 2216 preferably makes such determination based on data collected by the dwelling analyzer 2212 and based on analysis conducted at 2464. For instance, if policy analyzer 2216 determined that a policy holder (i.e., homeowner or renter) may not have insurance covering a particular type of event/loss, and based upon collected and analyzed data from sensors 2004 (amongst possible other factors), dwelling analyzer 2214 may provide a recommendation to a policyholder to subscribe to insurance covering such a particular type of event/loss. Additionally, policy analyzer 2216 may provide a recommendation to increase, decrease, or make other adjustments to personal liability limits based upon detected trends and habits determined by the dwelling analyzer 2212 at least in part by data collected from certain sensors 2004. In an embodiment of the present disclosure, such recommendation may relate to any damage associated with the dwelling 2200. As another example, one or more suggested modifications may relate to a loss of one or more of the personal property items associated with the dwelling 2200.

At 2472, policy analyzer 2216 preferably provides a notification indicating suggested insurance coverage modifications. It is to be appreciated that policy analyzer 2216 may be configured to electronically deliver all notifications regarding suggested insurance products modifications based on detected habits and trends of the dwelling 2200 inhabitants. The notification can be anything that securely advises a policy holder, device, or computer system of the suggested changes, including but not limited to, a display of text on a local display screen, a message in an email sent to a local or remote computer, a text message, a communication to a remote computer system. It is to be also understood and appreciated that policy analyzer 2216 may be configured and operational to integrate with policy holder's communicative computing devices (e.g., smart phones (via an app), computers, tablets, smart TV's, vehicle communication systems, etc.) for sending such notifications regarding such suggested insurance modifications. In an embodiment of the present disclosure, each notification may include, but not limited to, detected habits and trends as well as suggested recommendations with respect to insurance products/services associated with the dwelling 2200.

Figure 20:
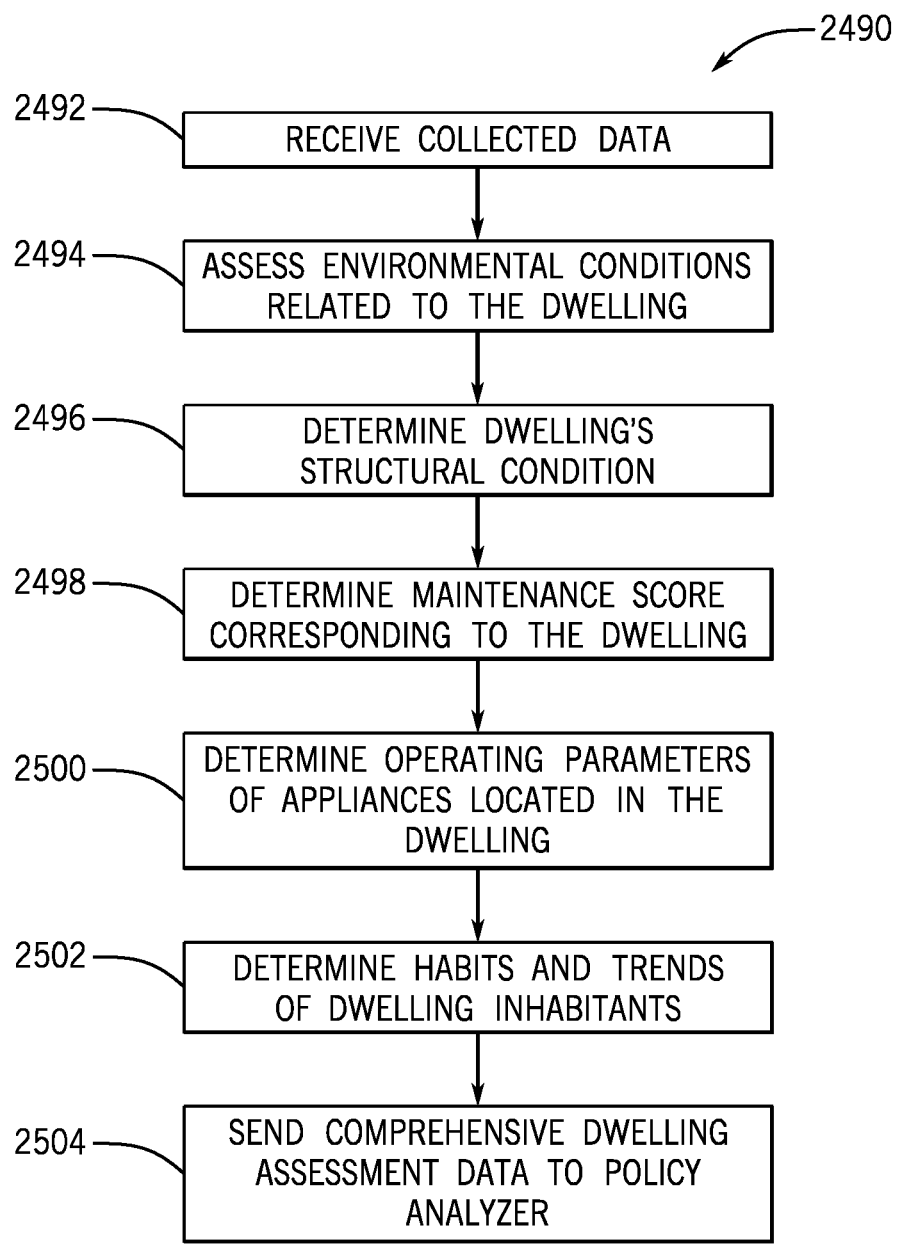
FIG. 20 is a flowchart illustrating a process where dwelling analyzer preferably collects data from sensors, in accordance with embodiments presented herein.

With reference to the process 2490 of FIG. 20, at 2492, dwelling analyzer 2212 preferably collects data from sensors 2004. In an embodiment of the present disclosure, this step may involve computing device 2006 periodically contacting (via network 2000), at prescribed time intervals, data analyzer component 2218 running on server 2012 to send accumulated data. In an alternative embodiment, contact between the dwelling computing device 2006 and dwelling analyzer 2212 may be initiated when the dwelling analyzer 2212 contacts the dwelling computing device 2006. Following the initial contact, dwelling analyzer 2212 may receive data from the dwelling computing device 2006. It is to be understood data packets collected from sensors 2004 can be aggregated in dwelling computing device 2006 and send as an aggregated packet to dwelling analyzer 2212 for subsequent analysis.

At 2494, dwelling analyzer 2212 preferably processes the informatics data collected by a plurality of sensors 2004 to assess environmental conditions related to the dwelling 2200. Environmental conditions may include, but are not limited to: temperature conditions, wind conditions, air quality present in the dwelling 2200, humidity present in the dwelling 2200, and so forth. In various embodiments of the present disclosure, the plurality of sensors 2004 measuring and/or collecting environmental informatics data may include one or more of temperature sensors, humidity sensors, sound sensors, wind speed sensors, environmental sensors, and so on. In an embodiment of the present disclosure, dwelling analyzer 2212 may collect data from more than one dwelling in a geographic area to determine the general level of risk in the area. For example, dwelling analyzer 2212 may analyze the data from approximately ten houses in a particular geographic location to determine that average wind speed has been increasing over the past few years. As another example, dwelling analyzer 2212 may determine whether a particular geographic area in which the dwelling 2200 is located is prone to earthquakes based on recent seismic activity measured by various environmental sensors 2004. This information may be used by policy analyzer 2216, for instance, to determine proper insurance coverage alterations.

At 2496, based on data collected from sensors 2004 regarding dwelling 2200, dwelling analyzer 2212 preferably conducts an analysis to determine a structural condition of the dwelling 2200. For example, dwelling analyzer 2212 may determine whether harsh environmental conditions, such as hurricane, storm surge, earthquake, volcano, landslide, and the like, have affected structural integrity of the dwelling 2200. In addition to the above, some geographic regions commonly experience problems that cannot only be a nuisance to those living in the residence, but which can also destroy the structural integrity of the dwelling structure itself. For example, termites are just one type of insect that are known to infest and damage homes. Thus, dwelling analyzer 2212 may conduct an analysis to detect dangerous insect infestations within the dwelling 2200 structure. As yet another non-limiting example, in this step dwelling analyzer 2212 may detect a hole in the roof of the dwelling 2200 requiring immediate repair. In general, at 2496, dwelling analyzer 2212 may analyze the collected data to determine whether dwelling 2200 and/or any of its components satisfy structural soundness requirements.

At 2498, dwelling analyzer 2212 conducts an analysis to determine a maintenance score value corresponding to the dwelling 2200. For example, dwelling analyzer 2212 may generate the maintenance score value based upon the dwelling age, dwelling type and any repair and/or maintenance needs identified at 2494 and 2496. It is noted that repair/maintenance needs may include, but not limited to, immediate repair needs and preventive maintenance needs. In general, any dwelling condition that affects the residents' health or safety may be considered by dwelling analyzer 2212 as requiring an immediate repair. For instance a hole may have been detected in the roof of dwelling 2200 (via one or more sensors 2004), requiring immediate repair. As another example, an environmental sensor may have detected a gas leak or any contaminant adverse to human health. As an example of preventive maintenance needs, based upon an air flow analysis, dwelling analyzer 2212 may have detected that damaged frames and/or dividers allow air leaks into dwelling 2200. Thus, dwelling analyzer 2212 may consider window replacement as a preventive maintenance factor in calculation of the maintenance score value. The generated maintenance score may be represented in the form of a numerical value, such as a value ranging from 0 to 5 for each of the factors, as well as a combined (average or weighted average) aggregate score.

In other illustrative embodiments, dwelling analyzer 2212 is configured and operational to update the insurance policy if an alteration to the dwelling 2200 has been detected (e.g., structural and/or appliance related). Additionally, dwelling analyzer 2212 is configured and operational to trigger an inspection requirement upon the aforesaid detection of an alteration to the dwelling 2200.

As previously noted, dwelling 2200 may contain a plurality of appliances located therein or in its vicinity. Accordingly, at 2500, dwelling analyzer 2212 preferably performs an analysis of data collected from such appliances, such as their age, operating parameters, maintenance/repair issues, and the like. This step may further involve analyzing environmental conditions in which appliances operate. For example, dwelling analyzer 2212 may use environmental data measured with a plurality of sensors 2004 situated at or near the analyzed appliances. The environmental data may be indicative of temperature, humidity, pressure, averages of the foregoing measurements over a time period, etc. More specifically, dwelling analyzer 2212 may be configured to identify maintenance/repair issues based upon environmental conditions in conjunction with operating parameters. In addition, dwelling analyzer 2212 may detect performance degradation of an appliance (e.g., refrigerator) upon either it's past operating performance efficiency and/or its operating performance falling outside of threshold values prescribed for it by a manufacturer. As another non-limiting example, dwelling analyzer 2212 may detect a dirty filter in another appliance (e.g., HVAC component) and/or may detect degradation in HVAC component performance likely contributable to a dirty filter element.

Next, at 2252, dwelling analyzer 2212 preferably determines habits and trends of dwelling 2200 inhabitants based on collected informatics sensor data. In an embodiment of the present disclosure, one or more appliance sensors I 02 may be employed to measure the use of cooking appliances such as a kettle, a fridge, a washing machine, a microwave oven or an electric cooker. For example, dwelling analyzer 2212 may detect the cooking time trends by detecting that a rice cooker or microwave oven is turned on/off, detecting that a gas range or an IH (Induction-Heating) cooking heater is turned on/off or detecting other cooking home electric appliances are turned on/off. As another example, dwelling analyzer 2212 may combine data collected from various types of sensors, such as motion and appliance sensors 2004, to determine, for instance, whether any of the cooking appliances remain unattended for an extended period of time, thus increasing the risk of fire. The daily cooking activity tracking may be adaptive. In other words, dwelling analyzer 2212 preferably gradually adjusts to the dwelling inhabitant's new activities and/or habits if they change over time. As another non-limiting example, dwelling analyzer 2212 may flag certain determined water consumption and/or energy consumption patterns of dwelling inhabitants as hazardous. In general, dwelling analyzer 2212 may assess the risk of fires, flooding, explosions and theft of personal property, amongst other risks, arising from various activities of dwelling inhabitants and/or events observed at the dwelling 2200.

Thus, in steps 2492-2252, dwelling analyzer 2212 analyzes various conditions that are present at the dwelling 2200, in advance of any actual damage event. At 22524, dwelling analyzer 2212 preferably transmits this comprehensive dwelling 2200 assessment to policy analyzer module 2214. In an embodiment of the present disclosure, the comprehensive assessment data may include, but not limited to, dwelling's structural condition, maintenance score value, risky habits and trends of dwelling inhabitants, environmental conditions related to the dwelling 2200, and the like. In an alternative embodiment, dwelling analyzer 2212 may store this information in insurance server 106 database.

Figure 21:
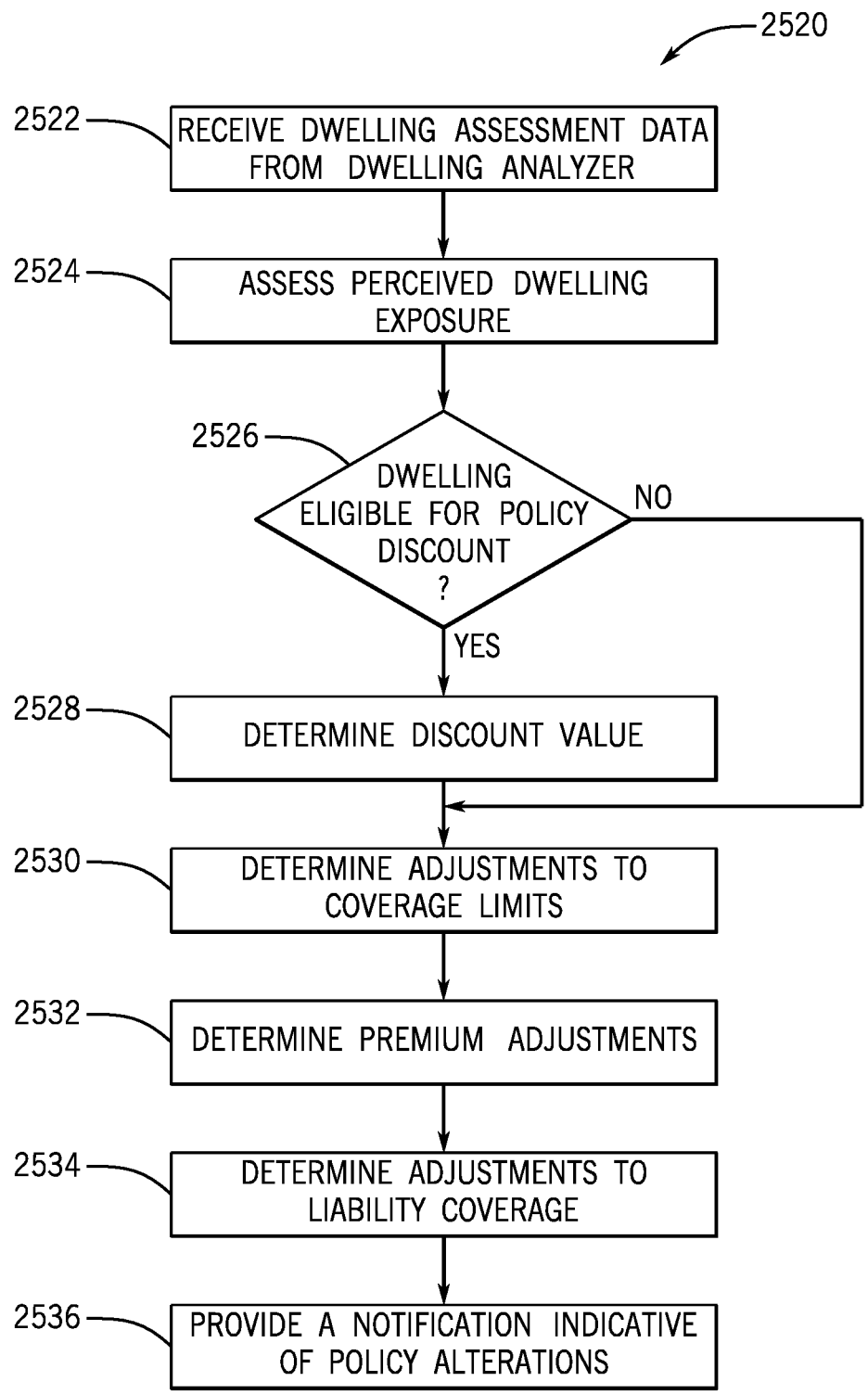
FIG. 21 is a flow diagram of a process of operational steps of the policy analyzer module of FIG. 13, in accordance with embodiments presented herein.

FIG. 21 is a flow diagram of a process 2520 of operational steps of the policy analyzer module of FIG. 13 in accordance with an illustrated embodiment. At 2522, policy analyzer 2216 preferably receives dwelling 2200 assessment information from the dwelling analyzer 2212. In an alternative embodiment of the present disclosure, this step may involve the policy analyzer 2216 retrieving such information from the insurance server's 2012 storage component. Next, policy analyzer 2216 preferably maps the received/retrieved data to a particular insurance policy associated with the dwelling 2200.

At 2524, policy analyzer 2216 preferably analyzes the insurance policy associated with the dwelling 2200 to further assess perceived dwelling exposure. For example, policy analyzer 2216 may identify the type of the insurance policy and may identify one or more perils covered by the policy. As used herein, the term "peril" refers to a cause of loss. By way of example, such perils (or perilous events) may include a natural disaster (e.g., a tornado, a hurricane, an earthquake, a flood, etc.), a manmade disaster (e.g. a release of hazardous material, gas pipe explosion, arson, etc.), and the like. Coverage can be provided on an "all perils" basis, or a "named perils" basis. Named perils policies typically list exactly what is covered by the policy, while open perils (or all perils) policies may list what is excluded from coverage. In an embodiment of the present disclosure, once policy analyzer 2216 identifies all perils covered by the insurance policy, it preferably evaluates levels of exposure for each peril based on observed and/or historical data provided by the dwelling analyzer 2212. As an illustrative example, policy analyzer 2216 may determine estimated likelihood that a specified peril (e.g., a tornado)

may occur in a specified geographical zone to cause a specified degree of damage (e.g., 10 million), based on environmental conditions analyzed by the dwelling analyzer 2212. In an embodiment of the present disclosure, policy analyzer 2216 may perform evaluation of the probable maximum loss ("PML") corresponding to the dwelling 2200. Determining the PML for a property is conventionally treated as an evaluation of the costs likely to be incurred in response to a particular loss event. For example, this valuation is typically determined simply as the replacement cost of restoring a dwelling in the event of a flood or rebuilding a structure following a fire. It is noted that other types of decisions related to various policy alterations may be made by the dwelling analyzer 2212 at 2524.

According to an embodiment of the present disclosure, at 2526, policy analyzer 2216 checks whether the dwelling 2200 is eligible for a policy discount. For example, discount on the insurance policy for the dwelling 2200 may be provided based on the decision of an owner/operator of the dwelling to share data from sensors 2004 with an insurance carrier (e.g., insurance carrier server 2012). Maintaining (or providing adjustments to) the policy discount may be contingent upon the adherence of certain conditions, such as maintenance of the dwelling structure, as determined by the dwelling analyzer 2212 based on data captured from the dwelling sensors 2004. In an embodiment of the present disclosure, policy analyzer 2216 may utilize the maintenance score to determine if it satisfies a threshold score value prescribed by the insurance carrier to maintain policy discounts contingent upon prescribed maintenance obligations.

In response to determining that the dwelling 2200 is eligible for a policy discount (step 2526, yes branch), policy analyzer 2216, at 2528, may determine a policy discount value. Various factors that may be considered by the policy analyzer 2216 for determining the discount value may include, the age of the dwelling 2200, maintenance score value, maintenance of protective devices (smoke alarms, deadbolts, fire extinguishers, fire alarms, burglar alarms, sprinklers, etc.). As previously indicated, in an embodiment of the present disclosure, dwelling owner's adherence to an agreement of sharing data from sensors 2004 with an insurance carrier may be an important determinant of the policy discount value. If policy analyzer 2216 determines that the dwelling 2200 is not eligible for the policy discount (step 2526, no branch), it may proceed with determining other potential alterations related to the insurance policy. For example, at 2530, policy analyzer 2216 may determine adjustments to coverage limits based on the data provided by the dwelling analyzer 2212. Insurance policies are typically replacement-driven. Accordingly, policy analyzer 2216 may determine insurance policy coverage limits for dwelling 2200 based on the estimated cost to replace the dwelling 2200 covered by the policy in the event of a loss. In various embodiments of the present disclosure, policy analyzer 2216, may consider dwelling assessment attributes provided by the dwelling analyzer 2212, such as the age of the dwelling, maintenance score value, risky habits and trends of dwelling inhabitants, environmental conditions related to the dwelling, the presence of sprinkler systems, and the like, to reduce or increase coverage limits.

Next, at 2532, policy analyzer 2216 optionally determines potential adjustments to insurance policy premiums. Just like coverage limits, insurance policy premium adjustments may be based on the estimated replacement cost of the dwelling 2200 and/or estimated replacement cost of personal property located therein. If policy analyzer 2216 determined (at 2526) that the dwelling is eligible for policy discount, in this step, policy analyzer 2216 may reduce premium value based on the determined discount value. Advantageously, the analysis performed by the policy analyzer 2216 may account for dwelling inhabitants' habits and trends. For example, fires are most often caused by owners' and residents' bad habits, common mistakes, or negligence. Therefore, if dwelling analyzer 2212 determines that the cooking appliances remain unattended in the dwelling 2200 for an extended period of time frequently, thus increasing the risk of fire, policy analyzer 2216 may increase policy premiums accordingly. Conversely, if dwelling analyzer 2212 determines that dwelling inhabitants have no habits that may increase the risk of peril, policy analyzer 2216 may decrease policy premiums as a result.

If at 2524 policy analyzer 2216 determined that the insurance policy associated with the dwelling 2200 includes liability coverage, at 2534, policy analyzer 2216 may make adjustments to such liability coverage based on data provided by the dwelling analyzer 2212. Liability section of the insurance policy typically provides coverage in the event a dwelling inhabitant/operator is legally responsible for injury to others. The analysis performed by the policy analyzer 2216 in this step may also account for dwelling inhabitants' habits and trends, as described above.

At 2536, policy analyzer 2216 preferably provides a notification indicating suggested insurance policy alterations. It is to be appreciated that policy analyzer 2216 may be configured to electronically deliver all notifications regarding suggested insurance policy modifications. The notification can be anything that advises a policy holder, device, or computer system of the suggested changes, including but not limited to, a display of text on a local display screen, a message in an email sent to a local or remote computer, a text message, a communication to a remote computer system. The electronic delivery may include integration of notification functionalities into social networking services (e.g., via Facebook, Twitter, and the like). It is to be also understood and appreciated that policy analyzer 2216 may be configured and operational to integrate with policy holder's communicative computing devices (e.g., smart phones (via an app), computers, tablets, smart TV's, vehicle communication systems, kitchen communication systems, etc.) for sending such notifications regarding such suggested insurance policy alterations. In an embodiment of the present disclosure, each notification may include, but not limited to, adjusted coverage limits and premiums, liability coverage adjustments, and the like.

Figure 22:
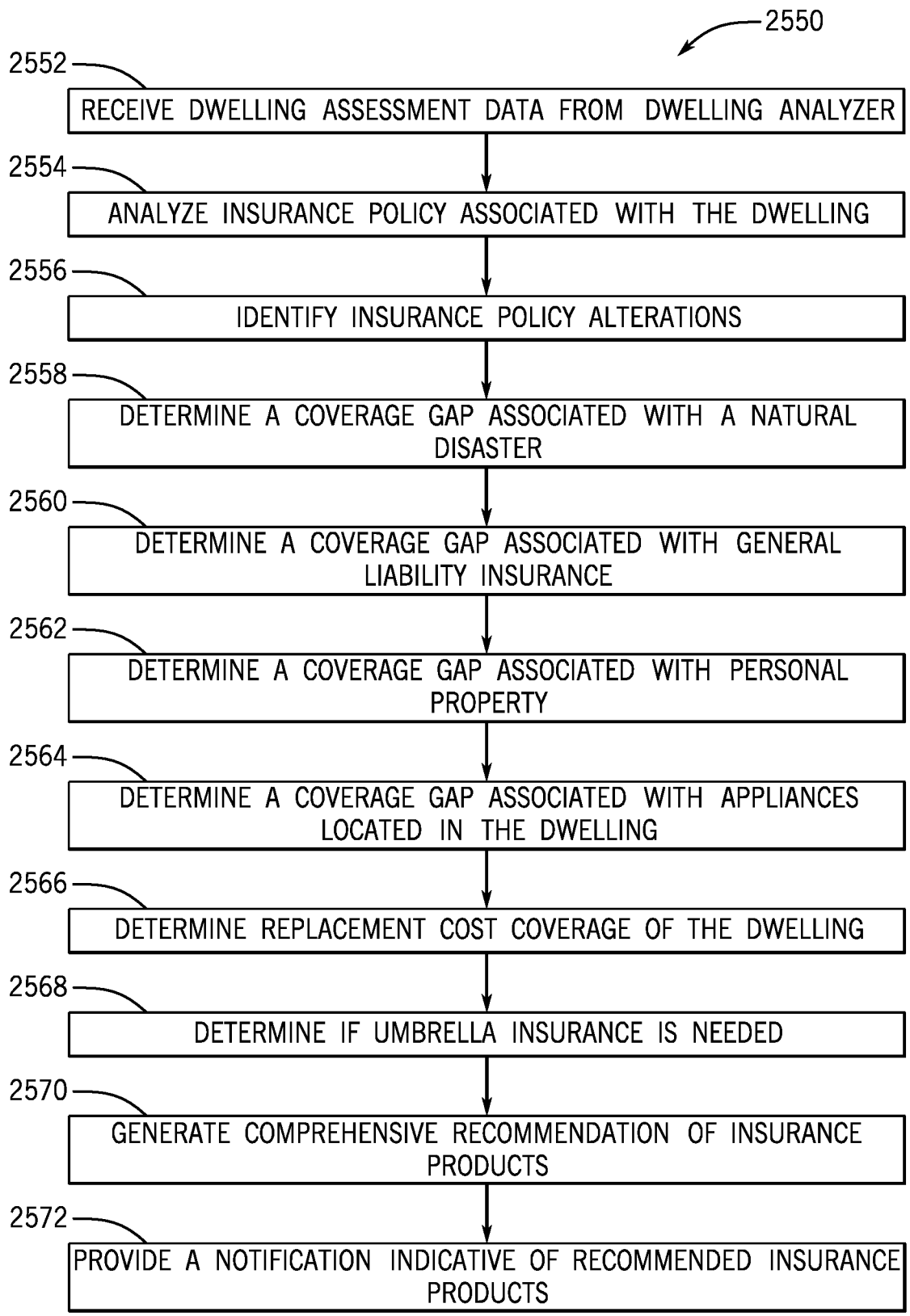
FIG. 22 is a flow diagram of operational steps of the policy analyzer module of FIG. 13 in accordance with embodiments presented herein.

FIG. 22 is a flow diagram of operational steps 2550 of the policy analyzer module of FIG. 13 in accordance with an illustrated embodiment. At 2552, policy analyzer 2216 preferably receives dwelling 2200 assessment information from the dwelling analyzer 2212. In an alternative embodiment of the present disclosure, this step may involve the policy analyzer 2216 retrieving such information from the insurance server's 2012 storage component. Next, policy analyzer 2216 preferably maps the received/retrieved data to a particular insurance policy associated with the dwelling 2200.

At 2554, policy analyzer 2216 preferably analyzes the insurance policy associated with the dwelling 2200 to further assess perceived dwelling exposure. For example, policy analyzer 2216 may identify the type of the insurance policy and may identify one or more perils covered by the policy. As used herein, the term "peril" refers to a cause of loss. By way of example, such perils (or perilous events) may include a natural disaster (e.g., a tornado, a hurricane, an earthquake, a flood, etc.), a manmade disaster (e.g. a release of hazardous material, gas pipe explosion, arson, etc.), and the like. Coverage can be provided on an "all perils" basis, or a "named perils" basis. Named perils policies typically list exactly what is covered by the policy, while open perils (or all perils) policies may list what is excluded from coverage. Thus, in an embodiment of the present disclosure, policy analyzer 2216 may identify perils and/or other risks excluded from coverage.

At 2556, policy analyzer 2216 preferably identifies one or more policy alterations based on the analysis conducted at 2554 and based on dwelling assessment information received from the dwelling analyzer 2212. Such policy alterations may include, but are not limited to, policy discount modifications, adjustments to coverage limits, premium adjustments, and the like. For example, discount on the insurance policy for the dwelling 2200 may be provided based on the decision of an owner/operator of the dwelling to share data from sensors 2004 with an insurance carrier (e.g., insurance carrier server 2012). Maintaining (or providing adjustments to) the policy discount may be contingent upon the adherence of certain conditions, such as maintenance of the dwelling structure, as determined by the dwelling analyzer 2212 based on data captured from the dwelling sensors 2004. Advantageously, the analysis performed by the policy analyzer 2216 may account for dwelling inhabitants' habits and trends. For example, fires are most often caused by owners' and residents' bad habits, common mistakes, or negligence. Therefore, if dwelling analyzer 2212 determines that the cooking appliances remain unattended in the dwelling 2200 for an extended period of time frequently, thus increasing the risk of fire, policy analyzer 2216 may increase policy premiums accordingly.

At 2558, policy analyzer 2216 preferably determines a coverage gap associated with a natural disaster, such as, for example, but not limited to, an earthquake, hurricane, tornado, typhoon, flood, fire, and the like. In an embodiment of the present disclosure, once policy analyzer 2216 identifies all perils covered by the insurance policy, it preferably evaluates levels of exposure for each peril based on observed and/or historical data provided by the dwelling analyzer 2212. As an illustrative example, policy analyzer 2216 may determine estimated likelihood that a specified peril (e.g., a tornado) may occur in a geographical zone corresponding to dwelling's 2200 location, based on environmental conditions (i.e., wind speed measurements) analyzed by the dwelling analyzer 2212. In an embodiment of the present disclosure, policy analyzer 2216 may perform evaluation of the probable maximum loss ("PML") corresponding to the dwelling 2200. Determining the PML for a property is conventionally treated as an evaluation of the costs likely to be incurred in response to a particular loss event. In addition, policy analyzer 2216 may determine whether any additional coverage (not covered by the current policy) may be provided. For example, homeowner's policies generally exclude most or all damage to the property from flood (including hurricane storm surge), earth movement (due to settling, shrinking, expansion, earthquake, volcano and landslide), pollution, war, and nuclear accidents. As another example, if policy analyzer 2216 determines that estimated likelihood of earthquake occurrence is sufficiently high, in response, policy analyzer 2216 may recommend earthquake coverage, for example, as a separate insurance policy. It is noted that policy analyzer 2216 may provide similar recommendations with respect to other natural disasters based on the analysis performed by the dwelling analyzer 2212. In various embodiments of the present disclosure, policy analyzer 2216, may consider dwelling assessment attributes provided by the dwelling analyzer 2212, such as the age of the dwelling, maintenance score value, risky habits and trends of dwelling inhabitants, environmental conditions related to the dwelling, the presence of sprinkler systems, and the like, to reduce or increase coverage limits.

At 2560, policy analyzer 2216 preferably determines a coverage gap associated with general liability insurance. Liability section of the insurance policy typically provides coverage in the event a dwelling inhabitant/operator is legally responsible for injury to others. It is noted that homeowner's policies typically have a variety of liability exclusions. For example, the homeowner's policy may exclude coverage for injuries to any tenants when more than two of them reside in the covered dwelling. So, if dwelling analyzer 2212 determines that three upstairs bedrooms in the dwelling 2200 are rented, policy analyzer 2216 may recommend, for instance, a commercial policy for rooming houses. As another non-limiting example, if dwelling analyzer 2212 determines that a pet (i.e., a dog) resides with one of the tenants in the dwelling 2200, the current insurance policy may not cover the landlord of the dwelling 2200 for tenant's dog biting someone on the dwelling premises. As a result, the landlord may be held responsible for the injuries. Thus, policy analyzer 2216 may recommend to increase general liability coverage to provide additional protection for the policy holder (i.e., landlord).

Next, at 2562, policy analyzer 2216 optionally determines a coverage gap associated with personal property. Personal property coverage typically pays for a loss of policy holder's personal possessions, such as clothing, furniture, TV, stereo and other unattached personal items. In an embodiment of the present disclosure, policy analyzer 2216 may evaluate current policy to determine if additional coverage for higher valued items may be needed. For instance, a homeowner's insurance policy normally provides limited coverage for collectibles, jewelry, furs, and the like. Thus, policy analyzer 2216 may recommend an additional insurance product, such as, for example, a personal property floater. A personal property floater may itemize each item, describe the item insured, and list excluded perils. A personal property floater normally provides coverage that is broader than the coverage in standard homeowners insurance policy. Thus, in this step, policy analyzer 2216 may evaluate policy holder's risk in this area, based on the dwelling assessment attributes provided by dwelling analyzer 2212, and may recommend a diversity of insurance products that may address such risk.

As previously noted, dwelling 2200 may contain a plurality of appliances located therein or in its vicinity. Some of the risks involving appliances may be covered under a homeowner's policy associated with the dwelling 2200, while other risks may not be covered. For instance, normal wear and tear to appliances typically is not covered under a homeowner's insurance policy. At 2564, policy analyzer 2216 may analyze maintenance/repair issues identified by dwelling analyzer 2212, in order to recommend an insurance product that may provide adequate protection for the homeowner. For example, policy analyzer 2216 may recommend an appliance breakdown coverage or home warranty insurance plans. These plans typically cover the gap left by homeowner's insurance. A list of appliances that may be covered by the appliance breakdown coverage plan includes, but is not limited to, washers and dryers, computers, dishwashers, refrigerators and freezers, ovens and microwaves, garbage disposals, heat pumps, heating and air conditioning systems, electrical service panels, home security systems, water heaters, well water pumps, sump pumps, surround sound systems, swimming pool equipment, televisions, and the like. As a non-limiting example, if dwelling analyzer 2212 detects a surge in electric power that may damage one or more appliances in the dwelling 2200, in response, policy analyzer 2216 may recommend an insurance product that would provide breakdown coverage for such appliances.

At 2566, policy analyzer 2216 preferably determines replacement cost for the dwelling 2200 and/or personal property located therein. In an embodiment of the present disclosure, this step may involve policy analyzer 2216 determining the PML in relation to a particular loss event. For example, this valuation may be determined as the replacement cost of restoring the dwelling 2200 in the event of a flood or rebuilding a structure following a fire. Accordingly, policy analyzer 2216 may recommend an adjustment to the current policy. For example, replacement cost estimates may be influenced by supply of labor, demand for labor, and the cost of construction materials. Thus, policy analyzer 2216 may recommend to change the coverage amount to maintain coverage at least equal to 100 percent of the estimated replacement cost coverage for the dwelling 2200.

At 2568, policy analyzer 2216 optionally determines a need for an umbrella insurance policy. Umbrella insurance refers to an insurance policy that protects the assets and future income of the policyholder above and beyond the standard limits set on their primary (i.e., underlying) insurance policies. Typically, an umbrella policy is pure liability coverage over and above the coverage afforded by the underlying policy. The term "umbrella" is used because it covers liability claims from all policies underneath it. For example, if a policyholder has a homeowner's policy with a limit of $300,000 and an earthquake policy with a limit of $500,000, then with a million dollar umbrella insurance policy, policyholder's combined limits become in effect, i.e. $1,300,000 on a homeowner's liability claim and $1,500,000 on an earthquake claim.

Umbrella insurance may also provide coverage for claims that may be excluded by the primary policies. Thus, instead of recommending to increase general liability coverage, as discussed above in connection with step 2560, at 2568 policy analyzer 2216 may recommend an umbrella insurance policy. If at 2554 policy analyzer determines that the dwelling 2200 is already covered by an umbrella insurance policy, at 2568 policy analyzer 2216 may automatically determine whether an adjustment is needed to the dwelling's current umbrella policy, for example, in view of the suggested changes to the underlying homeowner's insurance policy. For instance, if the policy analyzer 2216 recommends (e.g., at 2564) to add one or more appliances to the underlying insurance policy or policies, then additional umbrella coverage may be needed based on that additional appliance added to the policy. In addition, policy analyzer 2216 may determine that an adjustment is needed to the current umbrella policy in view of the hazardous habits of dwelling occupants, which may have been detected by the dwelling analyzer 2212. At 2570, policy analyzer 2216 preferably automatically generates a comprehensive set of insurance products recommendations based on the analysis performed at steps 2554-2568. In an embodiment of the present disclosure, policy analyzer 2216 may be configured to generate a predetermined number of insurance product recommendations based, for example, on correlation degrees of various insurance products associated with the dwelling 2200. In addition, policy analyzer 2216 may determine a multiple policy discount value, which can apply to combinations of multiple insurance policies.

At 2572, policy analyzer 2216 preferably provides a notification indicating suggested insurance product recommendations. It is to be appreciated that policy analyzer 2216 may be configured to electronically deliver all notifications regarding recommended insurance products or services. The notification can be anything that advises a policy holder, device, or computer system of the suggested changes, including but not limited to, a display of text on a local display screen, a message in an email sent to a local or remote computer, a text message, a communication to a remote computer system. The electronic delivery may include integration of notification functionalities into social networking services (e.g., via Facebook, Twitter, and the like). It is to be also understood and appreciated that policy analyzer 2216 may be configured and operational to integrate with policy holder's communicative computing devices (e.g., smart phones (via an app), computers, tablets, smart TV's, vehicle communication systems, kitchen communication systems, etc.) for sending such notifications regarding insurance product recommendations. In an embodiment of the present disclosure, each notification may include, but not limited to, adjusted coverage limits and premiums, coverage adjustments, additional insurance products and services, and the like. Additionally, policy analyzer 2216 may save the aforementioned recommendations in the insurance server's 2012 storage component. These recommendations may then be automatically communicated to the policy holder and/or reflected in the policy holder's next insurance billing statement.

Figure 23:
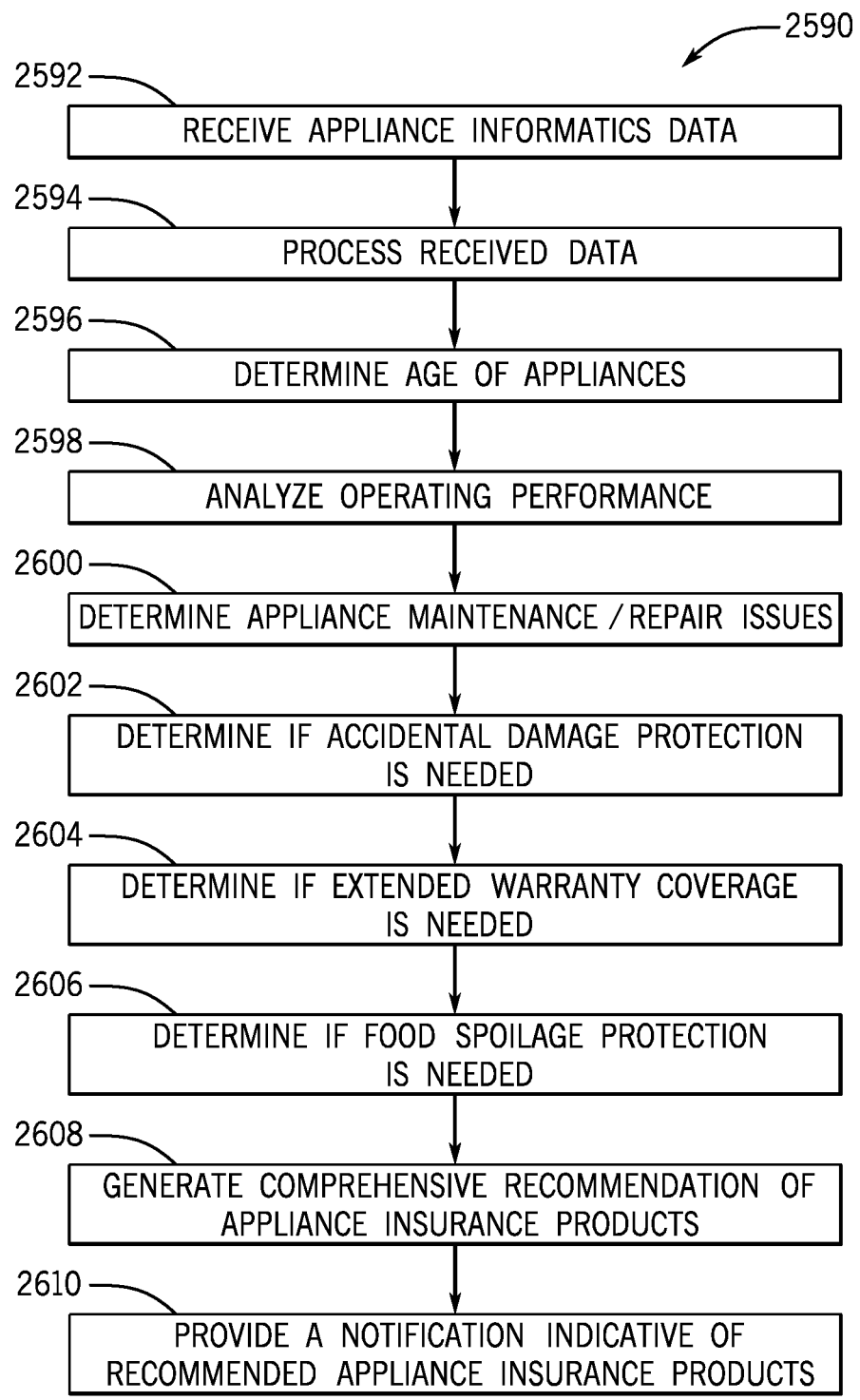
FIG. 23 is a flow chart, illustrating operational steps of an appliance analyzer, in accordance with embodiments presented herein.

FIG. 23 shows, in the form of a flow chart, exemplary operational steps 2590 of the appliance analyzer 2214. Before turning to description of FIG. 23, it is noted that the flow diagram shown therein is described, by way of example, with reference to components shown in FIGS. 11-13, although these operational steps may be carried out in any system and are not limited to the scenario shown in the aforementioned figures. Additionally, the flow diagram in FIG. 23 shows an example in which operational steps are carried out in a particular order, as indicated by the lines connecting the blocks, but the various steps shown in this diagram can be performed in any order, or in any combination or sub-combination.

At 2592, appliance analyzer 2214 preferably collects data from a plurality of appliance sensors 2240 (shown in FIG. 13). Contact between the dwelling computing device 2006 and appliance analyzer 2214 may be initiated by either the appliance analyzer 2214 or dwelling computing device 2006. Following the initial contact, appliance analyzer 2214 may receive data from the dwelling computing device 2006. It is to be understood data packets collected from appliance sensors 2240 can be aggregated in dwelling computing device 2006 and sent as an aggregated packet to appliance analyzer 2214 for subsequent analysis.

At 2594, appliance analyzer 2214 preferably processes the received data. For example, appliance analyzer 2214 may include a parser configured to parse the aggregated packet and classify the received data based on, for example, type of appliance corresponding to a particular subset of the received data. Appliance analyzer 2214 may create a data structure for each classification. This step may further involve identifying a policy holder associated with dwelling 2200 in which the analyzed appliances are located.

At 2596, appliance analyzer 2214 preferably determines the age of the appliances 2230-2238 or parts thereof and/or length of service of the appliances 2230-2238 based on data captured from sensors 2240. At 2598, appliance analyzer 2214 preferably analyzes operating parameters with respect to appliances 2230-2238. This step may further involve analyzing environmental conditions in which appliances 2230-2238 operate. For example, appliance analyzer 2214 may use environmental data measured with a plurality of sensors situated at or near the analyzed appliances 2230-2238. The environmental data may be indicative of temperature, humidity, pressure, averages of the foregoing measurements over a time period, etc. More specifically, appliance analyzer 2214 may be configured to identify maintenance/repair issues based upon environmental conditions in conjunction with operating parameters.

At 2600, appliance analyzer 2214 preferably identifies one or more maintenance/repair issues with respect to appliances 2230-2238. As non-limiting examples, the maintenance/repair issue can be any one or more of the following: a need for replacement of the appliance 2230-2238 or a component thereof, a need for repair of the appliance 2230-2238 or a component thereof, a need for battery recharging, lifespan expired, lifespan below a predefined threshold, power inadequacy, appliance inoperability for intended purpose, inoperability of one or more functions (electrical and/or mechanical), network connectivity failure, and the like. For instance, appliance analyzer 2214 may detect performance degradation of an appliance (e.g., refrigerator 2230) upon either it's past operating performance efficiency and/or its operating performance falling outside of threshold values prescribed for it by a manufacturer. As another non-limiting example, appliance analyzer 2214 may detect a dirty filter in another appliance (e.g., HVAC component 2232) and/or may detect degradation in HVAC component 2232 performance likely contributable to a dirty filter element.

At 2602, appliance analyzer 2214 preferably determines whether accidental damage protection is needed with respect to appliances 2230-2238. For example, if appliance analyzer 2214 determines that one or more of the appliances 2230-2238 is in need of replacement or repair due to accidental damage, appliance analyzer 2214 may recommend a corresponding accidental damage protection insurance product. In a particular embodiment of the disclosure, the accidental damage coverage may cover accidental damage to the appliance 2230-2238 (such as damage caused by accidentally dropping appliance 2230-2238), and/or other loss of the appliance 2230-2238 (e.g., loss of the appliance 2230-2238 through theft, fire, storm, burglary, natural disasters, or other peril). As another example, accidental damage protection may cover accidental discharge, leakage or overflow of water or steam from within a plumbing, heating or HVAC system 2232, sudden and accidental tearing apart, cracking, burning or bulging of a steam or hot water heating system or of appliances for heating water, sudden and accidental damage from artificially generated currents to electrical appliances, devices, fixtures and wiring. Accordingly, if analysis of the appliance informatics data detects, for example, leakage or overflow of water, appliance analyzer 2214 may recommend accidental damage protection for one or more of the appliances 2230-2238 that may be damaged by such leakage or overflow.

At 2604, appliance analyzer 2214 preferably determines whether extended warranty coverage is needed with respect to appliances 2230-2238. In an embodiment of the present disclosure, an extended warranty may be an insurance product that can be purchased to cover the repair costs of product support or repair services beyond the warranty provider's original warranty period. An extended warranty may allow the policyholder to receive support and product repair services above and beyond what is provided by a base warranty associated with appliances 2230-2238. An extended warranty may take the form of a flexible duration extended warranty or a fixed duration extended warranty.

When offering flexible or fixed duration extended warranty coverage, appliance analyzer 2214 may seek to charge a premium that both entices policyholders and results in profit. For example, the appliance analyzer 2214 may offer a flexible extended warranty with a premium that is attractive to the policyholder because it can reduce expected support costs over the life of one or more appliances 2230-2238 covered by the warranty. In an embodiment of the present disclosure, appliance analyzer 2214 may place restrictions on an extended warranty product. For example, a flexible duration extended warranty can come with a restriction such that if a policyholder purchases coverage, the coverage should be started before the product reaches a pre-specified age. A flexible duration extended warranty can also come with a restriction such that the flexible extended warranty cannot be resumed once it is discontinued. In some instances, appliance analyzer 2214 may require that extended coverage begins at the end of a warranty originally provided with the appliances 2230-2238 (e.g., a base warranty).

Thus, at 2604, appliance analyzer 2214 may determine expected base warranty expiration dates for the plurality of appliances 2230-2238, for example, based on the age of the appliances 2230-2238, as determined in step 2596 mentioned above. In response to determining that the current date is later than the expected warranty expiration date for a particular appliance 2230-2238, appliance analyzer 2214 may recommend corresponding extended warranty coverage for that appliance 2230-2238.

At 2606, appliance analyzer 2214 preferably analyzes operating parameters of refrigerator 2230 to determine whether a policyholder might be interested in purchasing food spoilage protection insurance plan. For instance, appliance analyzer 2214 may detect performance degradation of refrigerator 2230 upon either it's past operating performance efficiency and/or its operating performance falling outside of threshold values prescribed for it by a manufacturer. In response, appliance analyzer 2214 may recommend a food spoilage protection plan in addition to recommended repairs. A food spoilage protection product may take the form of a flexible duration. For instance, such plan may reimburse up to $300 per claim on three-year plan and/or up to $500 per claim on five-year plans for incurred spoilage losses. In an alternative embodiment, appliance analyzer 2214 may recommend food spoilage protection plan in response to detecting frequently occurring power outages.

At 2608, policy analyzer 2216 preferably automatically generates a comprehensive set of appliance insurance product recommendations based on the analysis performed at steps 2594-2606. In an embodiment of the present disclosure, policy analyzer 2216 may be configured to determine a multiple product discount value, which can apply to combinations of multiple insurance products and/or combinations of multiple appliances.

At 2610, policy analyzer 2216 preferably provides a notification indicating suggested appliance insurance product recommendations. It is to be appreciated that policy analyzer 2216 may be configured to electronically deliver all notifications regarding recommended insurance products or services. The notification can be anything that advises a policy holder, device, or computer system of the suggested changes, including but not limited to, a display of text on a local display screen, a message in an email sent to a local or remote computer, a text message, a communication to a remote computer system. The electronic delivery may include integration of notification functionalities into social networking services (e.g., via Facebook, Twitter, and the like). It is to be also understood and appreciated that policy analyzer 2216 may be configured and operational to integrate with policy holder's communicative computing devices (e.g., smart phones (via an app), computers, tablets, smart TV's, vehicle communication systems, kitchen communication systems, etc.) for sending such notifications regarding insurance product recommendations. In an embodiment of the present disclosure, each notification may include, but not limited to, a recommendation to perform insurance related repairs based on the determined repair needs, a recommendation of one or more vendors to perform insurance related repairs based on the determined repair needs, additional insurance products and services, and the like. Additionally, policy analyzer 2216 may save the aforementioned recommendations in the insurance server's 2012 storage component. These recommendations may then be automatically communicated to the policy holder and/or reflected in the policy holder's next insurance billing statement.

Figure 24:
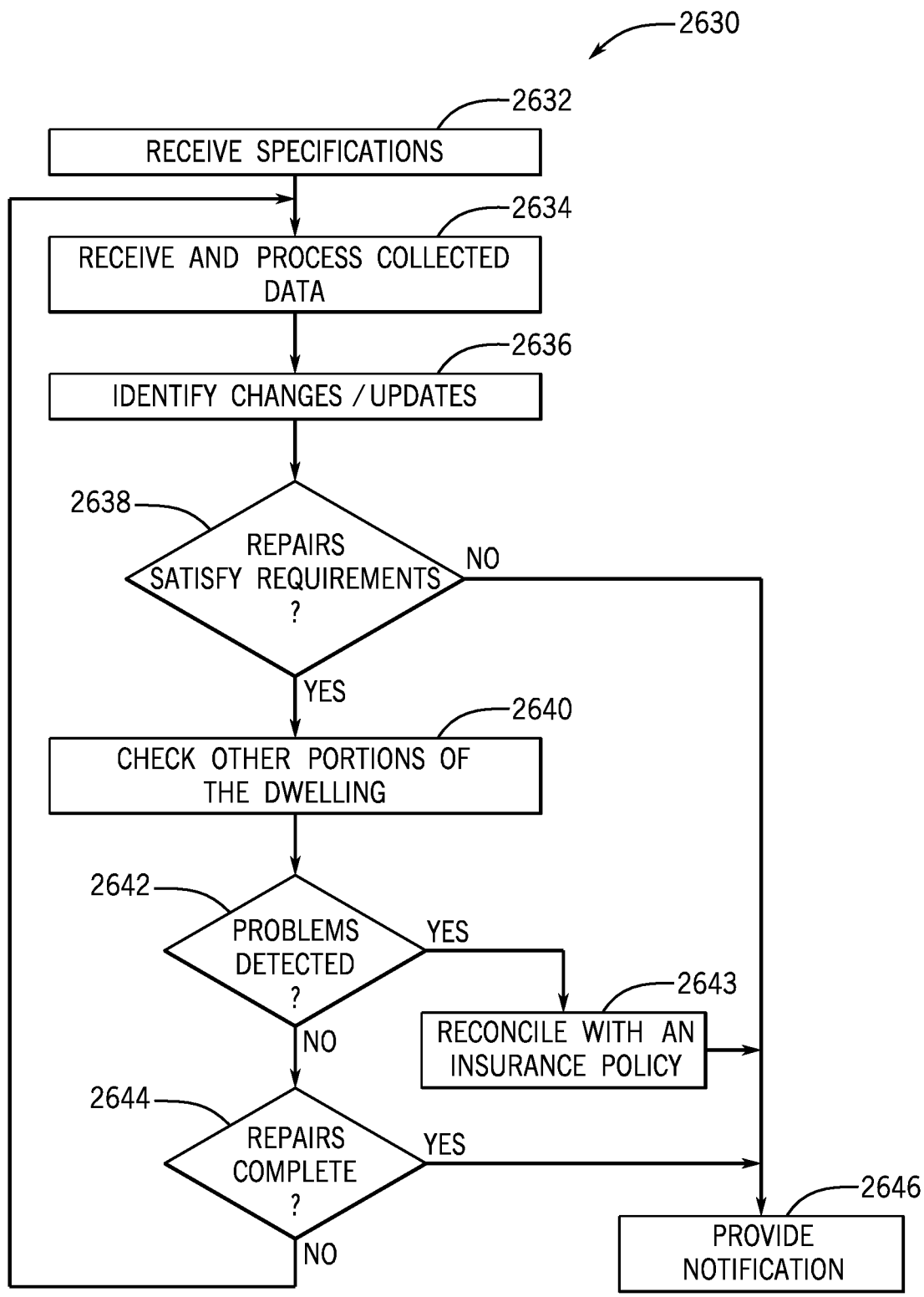
FIGS. 24 and 25 are flow charts, illustrating operational steps of a dwelling analyzer, in accordance with embodiments presented herein.

FIG. 24 shows, in the form of a flow chart, exemplary operational steps of the dwelling analyzer 2212. Before turning to description of FIG. 24, it is noted that the flow diagram shown therein is described, by way of example, with reference to components shown in FIGS. 11-13, although these operational steps may be carried out in any system and are not limited to the scenario shown in the aforementioned figures. Additionally, the flow diagram in FIG. 24 shows an example in which operational steps are carried out in a particular order, as indicated by the lines connecting the blocks, but the various steps shown in these diagrams can be performed in any order, or in any combination or sub-combination.

In an embodiment of the present disclosure, exemplary operational steps described below may be carried out by the dwelling analyzer 2212 in order to monitor the progress of a dwelling improvement project based on captured informatics sensor data. It is noted that the dwelling improvement project may comprise dwelling repairs relating to damage associated with a portion of the dwelling, such as a roof, windows, chimney, and the like. In addition, the dwelling improvement project may comprise a remodeling project (i.e., replacing exterior siding, replacing an entry door, extending the heating and air conditioning, improving wiring and lighting, and the like) associated with the dwelling 2200.

With reference to FIG. 24, at 2632, dwelling analyzer 2212 preferably receives specifications related to the dwelling improvement project, for example, from computing device 2006. In an embodiment of the present disclosure, the specifications document may include one or more requirements related to the dwelling improvement project. These requirements may identify, for instance, dwelling modification needs, dwelling maintenance needs, dwelling repair needs, and the like. Dwelling modifications needs may include minor or major modifications to any portion of the dwelling 2200 to improve safety, accessibility and/or the quality of life. Dwelling modifications may include, but are not limited to, replacing door handles or faucets, installing carpeting, modifying sinks or cabinets, and the like. Another example of this could be that a combustible material is too close to a heating source and has a risk of starting a fire. Dwelling maintenance may include, but is not limited to, changing furnace and/or air conditioner filters and replacing appliances, such as air conditioners, garbage disposals, washers and dryers. Dwelling repair needs can include, but are not limited to, repairing stairs, roofs, railings, and the like. The aforementioned specifications may further include information indicative of a degree of damage associated with the dwelling 2200, repair operating procedures, the cost of the required services, such as material and installation expenses.

In an embodiment of the present disclosure, the specifications may include information related to an insurance policy associated with the dwelling 2200. If a specific insurance policy is identified, dwelling analyzer 2212 may retrieve more detailed information from one or more data storage devices (not shown in FIG. 3), which may be communicatively coupled to server 2012 operated by an insurance company. Dwelling analyzer 2212 may utilize the retrieved data to determine which of the repair/modification needs listed in the specifications document will be covered by the corresponding insurance policy. The insurance company may also include information related to an insurance policy associated with the dwelling 2200 to determine if it wants to make the dwelling modification needs, dwelling maintenance needs, dwelling repair needs, and the like conditions for whether it wants to provide insurance to the insured, whether it wants to continue to provide insurance to the insured, or whether it wants to make the modification/maintenance/repair needs a condition for renewal or new issue of the policy at the dwelling 2200.

At 2634, dwelling analyzer 2212 preferably collects data from sensors 2004. In an embodiment of the present disclosure, this step may involve computing device 2006 periodically contacting (via network 2000), at prescribed time intervals, data analyzer component 2218 running on server 2012 to send accumulated data. In an alternative embodiment, contact between the dwelling computing device 2006 and dwelling analyzer 2212 may be initiated when the dwelling analyzer 2212 contacts the dwelling computing device 2006. Following the initial contact, dwelling analyzer 2212 may receive data from the dwelling computing device 2006. It is to be understood data packets collected from sensors 2004 can be aggregated in dwelling computing device 2006 and send as an aggregated packet to dwelling analyzer 2212 for subsequent analysis.

In addition, at 2634, dwelling analyzer 2212 preferably processes the informatics data collected by a plurality of sensors 2004 to assess various conditions indicative of a status of the dwelling improvement project. In various embodiments of the present disclosure, the plurality of sensors 2004 measuring and/or collecting informatics data may include one or more of image sensors, structural sensors, temperature sensors, humidity sensors, environmental sensors, and so on. As previously indicated, upon the dwelling improvement project commencement, dwelling analyzer 2212 may conduct a daily analysis to monitor progress and/or to verify compliance with the project specifications, as described below.

In another non-limiting embodiment, sensors can determine if recoverable depreciation in a claim for a covered loss can be provided to the insured. An example of how this could occur is a sensor 2004 can send notification to dwelling analyzer 2212 the insured has replaced, repaired or maintained an item in question with like kind and quality or item(s) of similar quality and usefulness. When this happens, the insurance company is notified and can provide the insured recoverable depreciation.

At 2636, dwelling analyzer 2212 preferably identifies the most recent repairs/modifications based on the latest informatics data. In an embodiment of the present disclosure, dwelling analyzer 2212 may periodically take images (snapshots) of one or more portions of the dwelling 2200 requiring repairs, modifications, and the like. For example, dwelling analyzer 2212 may determine whether an entry door has been replaced by comparing the latest snapshot capturing an entry door with respective older snapshots. As another non-limiting example, this step may further involve monitoring structural condition of the dwelling 2200. For instance, dwelling analyzer 2212 may identify one or more structural changes by analyzing the condition of the wall structure, floor structure, ceiling structure and roof structure of the dwelling 2200. In one implementation, dwelling analyzer 2212 may perform this identification by comparing latest measurements of the slope of a floor/wall/ceiling with previously taken measurements. Again, this information can be used to assist in claims settlement after a claim in regards to recoverable depreciation in a claim for a covered loss.

The insurance company can use the information from dwelling analyzer 2212 for whether the insured is or has made changes or updates to the dwelling 2200 and use this information for things like underwriting acceptability, pricing, and as a condition for renewal of the policy at 2638, dwelling analyzer 2212 may determine whether the one or more identified changes related to the one or more conditions associated with the dwelling improvement project satisfy one or more predefined requirements. In other words, in this step dwelling analyzer 2212 may determine whether the performed repairs/modifications meet the requirements included in the specification document (received at 2632). For example, dwelling analyzer 2212 may determine whether appropriate materials were used to perform repairs. In another example, if one of the requirements listed in the specifications necessitated a repair of a broken window, dwelling analyzer 2212 may determine whether the broken window has been replaced. As described above, this could assist to determine if recoverable depreciation in a claim for a covered loss can be provided to the insured.

In response to determining that the performed repairs/modifications comply with the requirements (step 2638, yes branch), at 2640, dwelling analyzer 2212 preferably checks other portions of the dwelling 2200 (including utility systems) within the dwelling 2200 that may have been affected by the performed repairs/modifications. The utility systems, may include, but are not limited to, electrical wiring, plumbing, heating, ventilation, and the like. For instance, if dwelling analyzer 2212 determines that one of the plumbing appliances was recently replaced, dwelling analyzer 2212 may measure and/or record the amount of water pressure present in the dwelling's 2200 water supply system and/or any changes in that pressure. In some dwellings 2200 plumbing systems may be designed to withstand a certain amount of pressure, and if the pressure rises above that amount, the plumbing system may be at risk for leaking, bursting, or other failure. Thus, at 2640, dwelling analyzer 2212 may verify that performed repairs will not cause future damage to the dwelling 2200. Similarly, if any of the kitchen appliances have been replaced during the dwelling improvement project, dwelling analyzer 2212 may assess the condition of the dwelling's electrical system. Electrical system readings could be used to determine if the voltage is persistently too high, or too low, or if the voltage frequently drops and/or spikes. Such conditions may suggest that the dwelling 2200 is at risk for fire.

The insurance company can use the information from dwelling analyzer 2212 for whether the insured is or has made changes or updates to the dwelling 2200 and use this information for things like underwriting acceptability, pricing, and as a condition for renewal of the policy. If the assessment performed at 2640 detects any additional problems (step 2642, yes branch), dwelling analyzer 2212 may determine next (at 2643) whether the detected issues are covered by the insurance policy associated with the dwelling 2200. This step may further involve determining whether the detected issues require immediate repairs and/or temporary repairs to mitigate or prevent further damage to the dwelling 2200. If so, dwelling analyzer 2212 may provide a corresponding notification, at 2646, as described below. According to an embodiment of the present disclosure, dwelling analyzer 2212 preferably amends the specification document related to the dwelling improvement project to include newly identified repair requirements if the repairs are covered by the corresponding insurance policy.

In response to detecting no additional problems/issues (step 2642, no branch), at 2644, dwelling analyzer 2212 may determine next whether the dwelling improvement project has been completed. In an embodiment of the present disclosure, dwelling analyzer 2212 may verify that all requirements included in the specification have been satisfied. If the dwelling improvement project has not been completed (step 2644, no branch), dwelling analyzer 2212 may return back to step 2634 in order to receive and process next set of collected informatics data after a set period of time. In response to determining that the dwelling improvement project has been completed (step 2644, yes branch), dwelling analyzer 2212 may provide a corresponding status notification.

As mentioned above, at 2646, dwelling analyzer 2212 preferably provides a notification indicating a status of the dwelling improvement project based on captured informatics sensor data. It is to be appreciated that dwelling analyzer 2212 may be configured to electronically deliver all notifications. The notification can be anything that advises a policy holder, device, or computer system of the current status of the dwelling improvement project, including but not limited to, a display of text on a local display screen, a message in an email sent to a local or remote computer, a text message, a communication to a remote computer system. It is to be also understood and appreciated that dwelling analyzer 2212 may be configured and operational to integrate with policy holder's communicative computing devices (e.g., smart phones (via an app), computers, tablets, smart TV's, vehicle communication systems, kitchen communication systems, etc.) for sending such notifications regarding dwelling repairs/modifications. In an embodiment of the present disclosure, if dwelling analyzer 2212 determines that performed repairs do not comply with the requirements (step 2638, no branch), the generated notification may indicate that one or more requirements has not been satisfied by the repairs. If dwelling analyzer 2212 detects any issues/damage that may have been caused by the performed repairs/modifications (step 2642, no branch), the generated notification may identify the detected problems and may further indicate whether suggested repairs are covered by the insurance policy associated with the dwelling 2200. If at step 2644 (yes branch) dwelling analyzer 2212 determines that the improvement project has been completed, the notification generated at 2646 may include a status indicative of the successful completion of the project. In various embodiments, the notification generated by dwelling analyzer 2212 may include one or more images of one or more portions of the dwelling 2200. As described above, the information collected by the dwelling analyzer 2212 can determine whether the repairs to the dwelling 2200 were made and can determine if recoverable depreciation in a claim for a covered loss can be provided to the insured.

Figure 25:
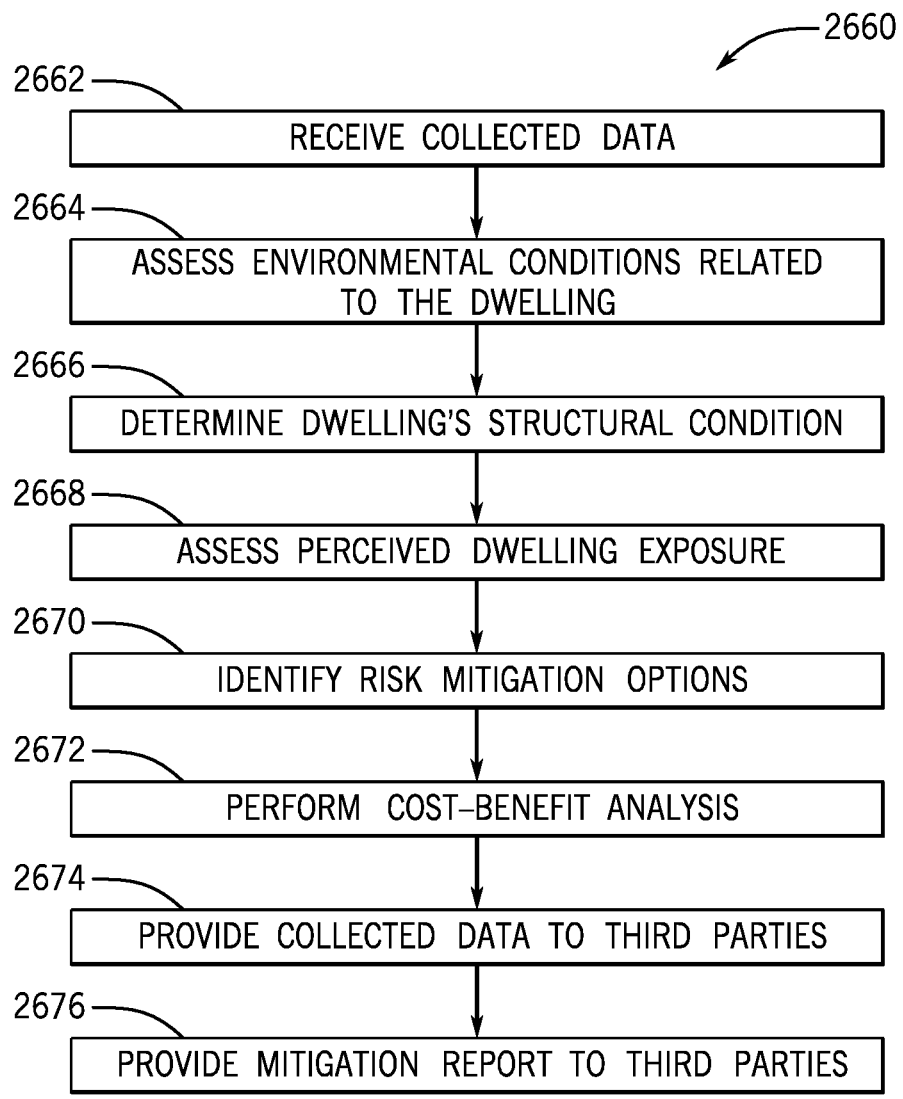

FIG. 25 shows, in the form of a flow chart, exemplary operational steps 2660 of the dwelling analyzer 2212. Before turning to description of FIG. 25, it is noted that the flow diagram shown therein is described, by way of example, with reference to components shown in FIGS. 11-13, although these operational steps may be carried out in any system and are not limited to the scenario shown in the aforementioned figures. Additionally, the flow diagram in FIG. 25 shows an example in which operational steps are carried out in a particular order, as indicated by the lines connecting the blocks, but the various steps shown in these diagrams can be performed in any order, or in any combination or sub-combination.

With reference to FIG. 25, at 2662, dwelling analyzer 2212 preferably collects data from sensors 2004. In an embodiment of the present disclosure, this step may involve computing device 2006 periodically contacting (via network 2000), at prescribed time intervals, data analyzer component 2218 running on server 2012 to send accumulated data. In an alternative embodiment, contact between the dwelling computing device 2006 and dwelling analyzer 2212 may be initiated when the dwelling analyzer 2212 contacts the dwelling computing device 2006. Following the initial contact, dwelling analyzer 2212 may receive data from the dwelling computing device 2006. It is to be understood data packets collected from sensors 2004 can be aggregated in dwelling computing device 2006 and send as an aggregated packet to dwelling analyzer 2212 for subsequent analysis.

At 2664, dwelling analyzer 2212 preferably processes the informatics data collected by a plurality of sensors 2004 to assess environmental conditions related to the dwelling 2200. Environmental conditions may include, but are not limited to: temperature conditions, wind conditions, air quality present in the dwelling 2200, humidity present in the dwelling 2200, and so forth. In various embodiments of the present disclosure, the plurality of sensors 2004 measuring and/or collecting environmental informatics data may include one or more of temperature sensors, humidity sensors, sound sensors, wind speed sensors, environmental sensors, and so on.

As previously indicated, dwelling analyzer 2212 may perform a post hoc analysis. For example, if a hurricane strikes the area in which the dwelling 2200 is located, dwelling analyzer 2212 may analyze the wind speed, temperature, and movement at various points in time. If the dwelling 2200 is damaged, it may be possible to determine, based on the analysis of collected informatics data, the actual mechanism by which the dwelling 2200 was damaged, and/or how long the dwelling 2200 withstood the hurricane-force winds. Various types of informatics data may be analyzed by dwelling analyzer 2212 to learn, in some detail, about the event that damaged the dwelling 2200. This analysis may be used by dwelling analyzer 2212 to estimate future risks.

In addition to performing a post hoc analysis, dwelling analyzer 2212 may be configured to analyze information about environmental conditions that are present at the dwelling 2200 in advance of any actual damage. For example, dwelling analyzer 2212 may analyze the wind speed at the dwelling 2200, in order to get a picture of the average wind speed over a period of few months. If dwelling analyzer 2212 detects a trend toward a higher wind speed, this fact may suggest an increased likelihood of damage (e.g., trees may be more likely to fall in the presence of higher magnitude winds). As another example, dwelling analyzer 2212 could analyze humidity readings, where a trend toward higher humidity may indicate an increased likelihood of mold damage.

In an embodiment of the present disclosure, dwelling analyzer 2212 may collect data from more than one dwelling in a geographic area to determine the general level of risk in the area. For example, dwelling analyzer 2212 may analyze the data from approximately ten houses in a particular geographic location to determine that average wind speed has been increasing over the past few years. As another example, dwelling analyzer 2212 may determine whether a particular geographic area in which the dwelling 2200 is located is prone to earthquakes based on recent seismic activity measured by various environmental sensors I 02. An insurance company could use this information to mitigate future loses, as described below.

At 2666, based on data collected from sensors I 02 regarding dwelling 2200, dwelling analyzer 2212 preferably conducts an analysis to determine a structural condition of the dwelling 2200. For example, dwelling analyzer 2212 may determine whether harsh environmental conditions, such as hurricane, storm surge, earthquake, volcano, landslide, and the like, have affected structural integrity of the dwelling 2200. In addition to the above, some geographic regions commonly experience problems that cannot only be a nuisance to those living in the residence, but which can also destroy the structural integrity of the dwelling structure itself. For example, termites are just one type of insect that are known to infest and damage homes. Thus, dwelling analyzer 2212 may conduct an analysis to detect dangerous insect infestations within the dwelling 2200 structure. As yet another non-limiting example, in this step dwelling analyzer 2212 may detect a hole in the roof of the dwelling 2200 requiring immediate repair. In general, at 2666, dwelling analyzer 2212 may analyze the collected data to determine whether dwelling 2200 and/or any of its components satisfy structural soundness requirements.

At 2668, dwelling analyzer 2212 preferably assesses exposure of the dwelling 2200, for example, by identifying risks associated with one or more perils. As used herein, the term "peril" refers to a cause of loss. By way of example, such perils (or perilous events) may include a natural disaster (e.g., a tornado, a hurricane, an earthquake, a flood, etc.), a manmade disaster (e.g. a release of hazardous material, gas pipe explosion, arson, etc.), and the like. In an embodiment of the present disclosure, dwelling analyzer 2212 preferably evaluates levels of exposure for each peril based on observed and/or historical informatics data. As an illustrative example, dwelling analyzer 2212 may determine estimated likelihood that a specified peril (e.g., a tornado) may occur in a specified geographical zone to cause a specified degree of damage (e.g., $10 million), based on environmental conditions analyzed by the dwelling analyzer 2212 at 2664.

Next, at 2670, dwelling analyzer 2212 preferably generates a mitigation report, which may include various risk mitigation options associated with the one or more perils identified at 2668. The mitigation report may further include a current risk assessment, a future risk assessment, and repair recommendations if, for example, dwelling analyzer 2212 has determined (at 2666) that structural integrity of the dwelling 2200 had been compromised or might be compromised in the future. For instance, if dwelling analyzer 2212 has detected a hole in the roof of the dwelling 2200, dwelling analyzer 2212 may recommend an immediate repair. As another risk mitigation option, based on the analysis performed at 2664-2668, dwelling analyzer 2212 may recommend constructing a reinforced section of the dwelling 2200 capable of withstanding one or more environmental conditions associated with the perceived exposure of the dwelling. For instance, if dwelling analyzer 2212 has determined that a likelihood of tornado in the general vicinity of dwelling 2200 has increased then dwelling analyzer 2212 may recommend building a "safe room" within the dwelling 2200. A safe room may comprise a hardened structure specifically designed to provide protection to the dwelling 2200 occupants in extreme weather events, including tornadoes and hurricanes. Moreover, based on the analysis of the informatics data (i.e., wind analysis) dwelling analyzer 2212 may provide guidance to various third parties, such as but not limited to, architects, engineers, building officials, local officials, emergency managers, independent contractors, and prospective safe room owners, related to safe room construction options. Advantageously, the occupants of a safe room built in accordance with dwelling analyzer's 2212 guidance may have a very high probability of being protected from injury or death. Thus, dwelling analyzer 2212 may provide proactive and real-time management of insurance loss minimization.

Optionally, at 2672, dwelling analyzer 2212 may conduct a cost-benefit analysis related to various risk mitigation options. In an embodiment of the present disclosure, dwelling analyzer 2212 may perform evaluation of the probable maximum loss ("PML") corresponding to the dwelling 2200. Determining the PML for a property is conventionally treated as an evaluation of the costs likely to be incurred in response to a particular loss event. For example, this valuation is typically determined simply as the replacement cost of restoring a dwelling in the event of a flood or rebuilding a structure following a fire. It is noted that other types of analysis related to exposure of the dwelling 2200 may be made by the dwelling analyzer 2212 at 2668. In addition, dwelling analyzer 2212 may automatically facilitate and/or determine the most cost efficient repair options, if immediate repairs are needed. For instance, dwelling analyzer 2212 may identify one or more vendors capable of performing the repairs related to the one or more risk mitigation options in the most-cost effective manner.

At 2674, dwelling analyzer 2212 may provide captured informatics data to third parties to mitigate future insurance claims. Captured informatics data my include, but not limited to, historic and/or real time temperature measurements, wind measurements, air quality measurements, humidity measurements, and the like. Third parties that may be involved in mitigating risks associated with future insurance claims may include, but not limited to, one or more vendors selected to perform the repairs related to the one or more risk mitigation options, other insurance companies (if, for example, reinsurance is identified as a risk mitigating option), various governmental entities that might provide funding/rebates for the performed repairs. For instance, occupants of the dwelling 2200 may be interested in applying for a safe room rebate program. In this case, dwelling analyzer 2212 may provide collected and/or analyzed data to Federal Emergency Management Agency (FEMA), for example, if FEMA is the government entity providing such rebates. In an embodiment of the present disclosure, dwelling analyzer 2212 may be integrated with one or more third party information systems, such as National Emergency Management Information System, for exchanging information.

At 2676, dwelling analyzer 2212 may optionally provide the generated mitigation report to the aforementioned third parties. As previously indicated the mitigation report may include various risk mitigation options (such as repair recommendations) associated with the one or more perils identified at 2668, a current risk assessment, a future risk assessment, as well as cost benefit analysis and the damage history associated with the dwelling 2200. The mitigation report may further include additional guidance related to, for example, recommended repairs based on the determined dwelling's 2200 structural condition. It is to be also understood and appreciated that the insurance server I 06 may be configured and operational to integrate with various third party information systems for sending such mitigation report and other information regarding mitigation of future insurance claims.

Figure 26:
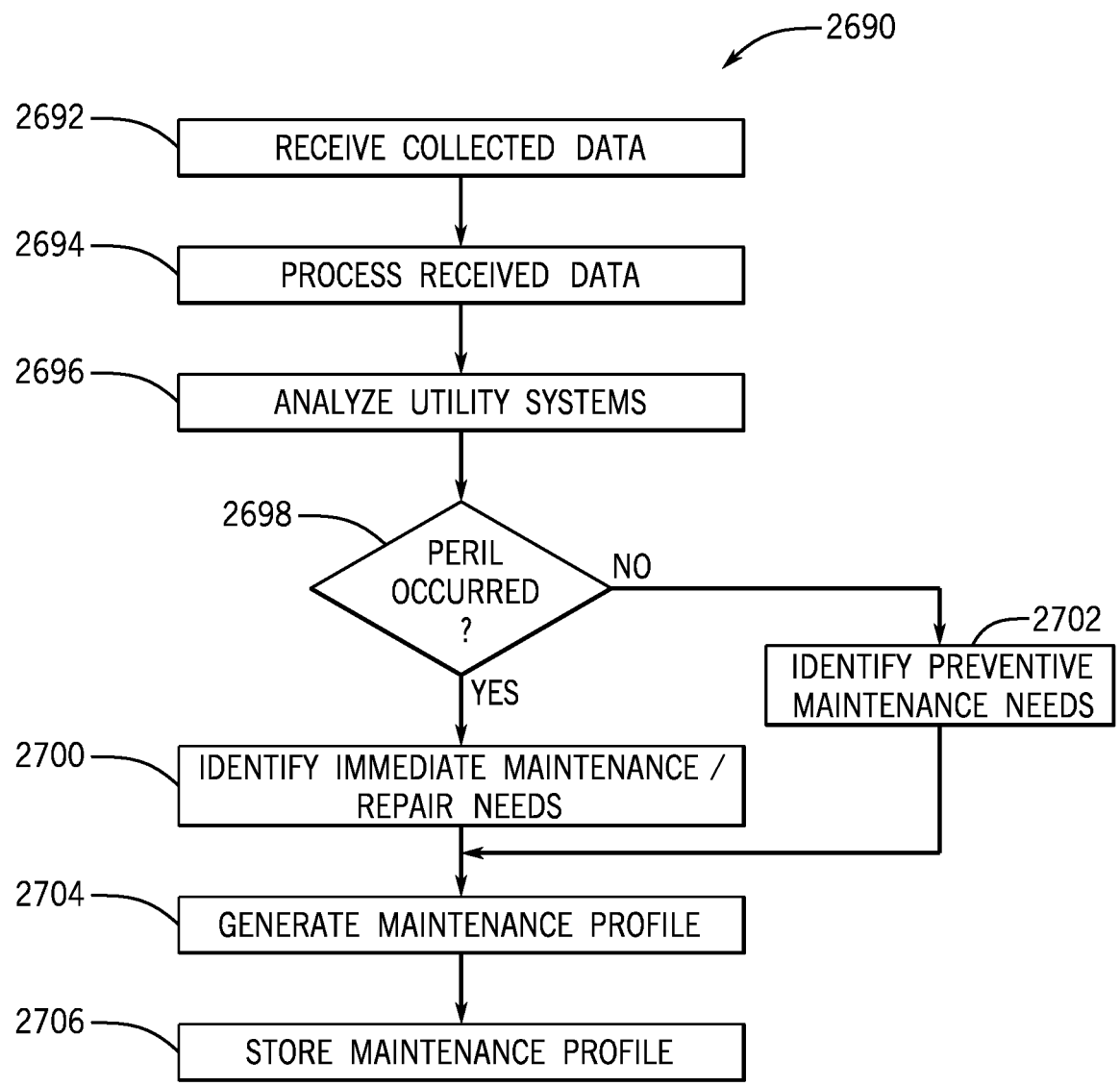
FIG. 26 is a process, illustrating dwelling analyzer collecting data from sensors, in accordance with embodiments presented herein.

With reference to the process 2690 of FIG. 26, at 2692, dwelling analyzer 2212 preferably collects data from sensors 2004. In an embodiment of the present disclosure, this step may involve computing device 2006 periodically contacting (via network 2000), at prescribed time intervals, data analyzer component 2218 running on server 2012 to send accumulated data. In an alternative embodiment, contact between the dwelling computing device 2006 and dwelling analyzer 2212 may be initiated when the dwelling analyzer 2212 contacts the dwelling computing device 2006. Following the initial contact, dwelling analyzer 2212 may receive data from the dwelling computing device 2006. It is to be understood data packets collected from sensors 2004 can be aggregated in dwelling computing device 2006 and sent as an aggregated packet to dwelling analyzer 2212 for subsequent analysis.

At 2694, dwelling analyzer 2212 preferably processes the received data. For example, dwelling analyzer 2212 may include a parser configured to parse the aggregated packet and classify the received data based on, for example, type of sensor employed to collect a particular subset of the received data. Dwelling analyzer 2212 may create a data structure for each classification. This step may further involve identifying a policy associated with dwelling 2200 from which the received data is collected.

At 2696, dwelling analyzer 2212 preferably periodically monitors one or more utility systems associated with the dwelling based on the received informatics data. The monitored utility systems may include but are not limited to electrical wiring system, plumbing system, central heating system, and the like. The monitored utility systems may be incorporated into the structure of dwelling 2200. For example, electrical system sensors may be connected to various points in the dwelling's 2200 electrical system to measure voltage. Dwelling analyzer 2212 may use readings from the electrical system sensors to determine if the voltage is persistently too high, or too low, or if the voltage frequently drops and/or spikes. Such conditions may suggest that the dwelling 2200 is at risk for fire. As another non-limiting example, this step may further involve periodically checking informatics data related to the components of the dwelling's 2200 plumbing system to detect any water leaks. Generally, water leaks could cause damage to some parts of the dwelling's 2200 structure. Damages to the dwelling structural elements could cause the dwelling 2200 to deteriorate faster, collapse, and cause injuries to its occupants.

At 2698, dwelling analyzer 2212 preferably processes the informatics data collected by a plurality of sensors 2004 to assess environmental conditions related to the dwelling 2200. Environmental conditions may include, but are not limited to: temperature conditions, wind conditions, air quality present in the dwelling 2200, humidity present in the dwelling 2200, and so forth. In various embodiments of the present disclosure, the plurality of sensors 2004 measuring and/or collecting environmental informatics data may include one or more of temperature sensors, humidity sensors, sound sensors, wind speed sensors, environmental sensors, and so on. In an embodiment of the present disclosure, dwelling analyzer 2212 may analyze the collected data to detect an occurrence of a natural peril event based on the received informatics data. As used herein, the term "peril" refers to a cause of loss. By way of example, such perils (or peril events) may include, but are not limited to a tornado, a hurricane, an earthquake, a flood, and the like.

At 2700, in response to detecting an occurrence of one or more natural peril events (step 2698, yes branch), dwelling analyzer 2212 preferably conducts an analysis to identify certain immediately needed repairs to the structure of a dwelling 2200. For example, this step may involve monitoring structural condition of the dwelling 2200. As a result, dwelling analyzer 2212 may detect, for example, a hole in the roof of dwelling 2200 (via one or more sensors 2004), requiring immediate repair. As another example, an environmental sensor may have detected a gas leak or any contaminant adverse to human health. As yet another example, dwelling temperature analysis may have indicated a malfunctioning cooling/heating system. In general, any dwelling condition caused by the natural peril event that affects the residents' health or safety may be considered by dwelling analyzer 2212 as requiring an immediate repair.

If dwelling analyzer 2212 does not detect an occurrence of any natural peril events (step 2698, no branch), at 2702, dwelling analyzer 2212 preferably conducts an analysis to identify certain preventive repairs to the structure of a dwelling 2200. For example, based upon certain analysis, dwelling analyzer 2212 may recommend preventive maintenance to the roof a dwelling 2200 (e.g., detection of wind, moisture, improper roof slope line, etc.). For instance, dwelling analyzer 2212 may identify one or more structural changes by analyzing the condition of the wall structure, floor structure, ceiling structure and roof structure of the dwelling 2200. In one implementation, dwelling analyzer 2212 may perform this identification by comparing latest measurements of the slope of a floor/wall/ceiling with previously taken measurements. As another example, based upon analysis of a plumbing system, dwelling analyzer 2212 may have detected long-term stress on pipes. In order to prevent water leaks, dwelling analyzer 2212 may recommend reducing water pressure (e.g., by installing a water softener) to prevent future plumbing leaks. As another example, based upon, for example, an air flow analysis, dwelling analyzer 2212 may have detected that damaged frames and/or dividers allow air leaks into dwelling 2200. Thus, dwelling analyzer 2212 may make recommendations with regards to window replacement/repair needs.

According to an embodiment of the present disclosure, at 2704, dwelling analyzer 2212 may generate a maintenance profile corresponding to the dwelling 2200 based on the received informatics data and based on the analysis performed at 2696-2702. The maintenance profile may include both urgent and essential repair needs. For example, the generated maintenance profile may indicate that electrical wiring system is so old that it needs an immediate upgrade. As another example, the maintenance profile may point out that gas heating boiler has not received its annual service. In addition, the maintenance profile may include forward maintenance plans, for instance, for the next five to seven years, establishing, for example, the date of the next re-painting job, the date of the next windows replacement job, and the like. Furthermore, the generated maintenance profile may include detailed information about all necessary and planned repairs.

In an embodiment of the present disclosure, upon generation of the maintenance profile, at 2706, dwelling analyzer 2212 may store the generated maintenance profile in the claim system repository 2226 (which is shown, in FIG. 13, as being part of, or used by, insurance server 2012). The claim system repository 2226 may comprise a database or any other suitable storage component. For example, the suitable storage component may comprise, or may otherwise make use of, magnetic or optical disks, volatile random-access memory, non-volatile random-access memory or any other type of storage device.

Figure 27:
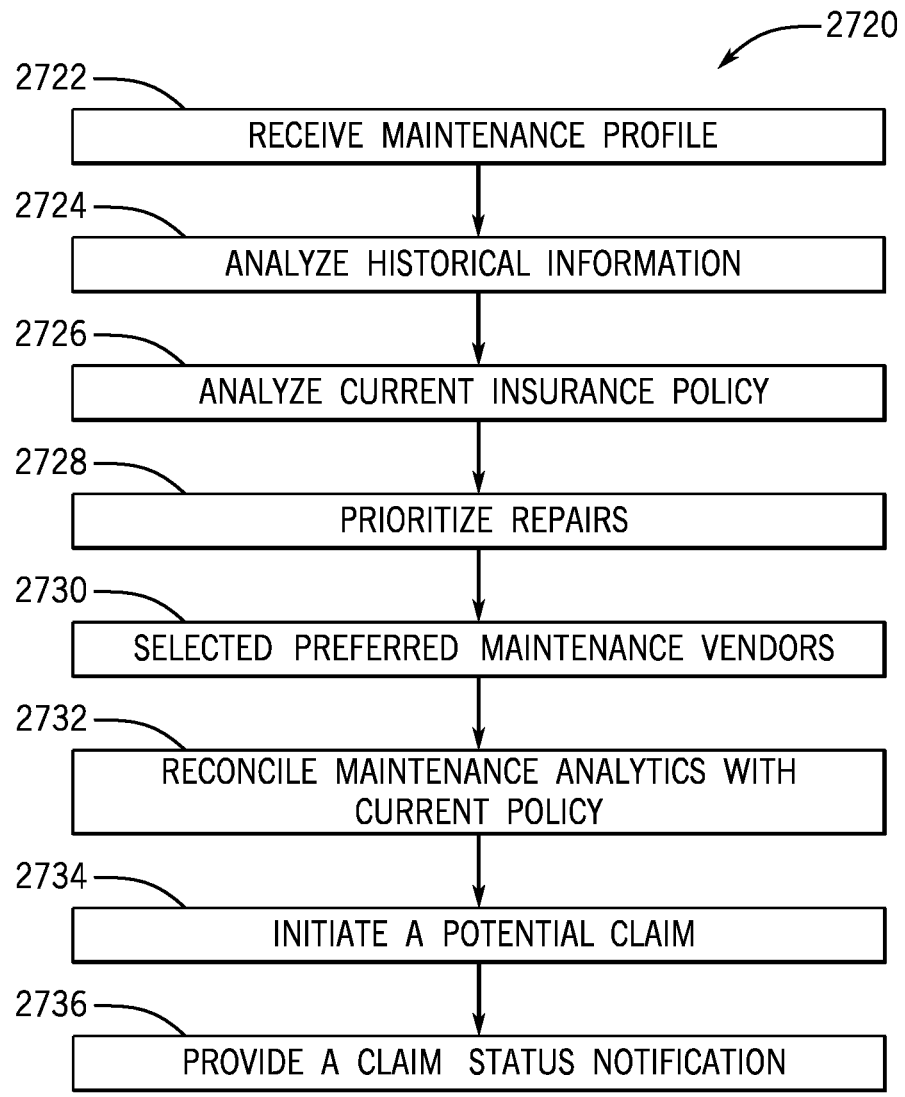
FIG. 27 is a flowchart, illustrating operational steps of the maintenance manager module of FIG. 13, in accordance with embodiments presented herein.

FIG. 27 is a flow diagram of operational steps of the maintenance manager module of FIG. 13 in accordance with an illustrated embodiment. At 2722, maintenance manager 2220 preferably retrieves the maintenance profile corresponding to the dwelling 2200 generated by the dwelling analyzer 2212 from the insurance server's 2012 claim system repository 2226. In an alternative embodiment of the present disclosure, this step may involve the maintenance manager 2220 receiving the maintenance profile directly from the dwelling analyzer 2212. Next, maintenance manager 2220 preferably maps the received/retrieved data to a particular insurance policy associated with the dwelling 2200.

Next, at 2724, maintenance manager 2220 preferably analyzes historical information related to maintenance of the dwelling 2200. For example, maintenance manager 2220 may determine a total number of completed repairs over a predetermined period of time (e.g., one year). As another example, maintenance manager 2220 may analyze historical data to determine average annual cost of repairs associated with the dwelling 2200. The analyzed historical data may also help maintenance manager 2220 to determine the effectiveness of previously performed maintenance related repairs. The foregoing examples of historical data are illustrative only and are not intended to be in any way limiting. It is noted that historical information described herein may be collected by data analysis module 2210 and may be stored at the insurance server's 2012 claim system repository 2226.

At 2726, maintenance manager 2220 analyzes the insurance policy associated with the dwelling 2200 to further assess dwelling coverage. Typically, a standard home insurance policy does not cover issues related to a lack of maintenance. For example, if a plumbing leak that was left unfixed caused mold to grow in the interior walls of dwelling 2200 mold removal and remediation would not be covered by a standard insurance policy. Generally, standard home insurance policy only protects a policyholder from damage caused by covered natural perils such as wind, hail, lightening, fire and the like. Keeping a dwelling well maintained and safe for others is policyholder's responsibility and a home insurance company may decline coverage for maintenance related claims. However, additional coverage may be purchased by a policy holder. For example, an insurance policy associated with the dwelling 2200 may include roof replacement cost coverage.

Optionally, at 2728, maintenance manager 2220 may evaluate the list of all urgent and essential repairs that may be contained in the maintenance profile to prioritize such repairs based on, for example, the insurance policy associated with the dwelling 2200. For instance, maintenance manager 2220 may establish, for example, the date of the next re-painting job, the date of the next windows replacement job, and the like. According to an embodiment of the present disclosure, maintenance manager 2220 may set optimum times for major improvements in the dwelling 2200, such as renovating the bathroom or kitchen or replacing the plumbing. Advantageously, maintenance manager 2220 may estimate optimum times for performing repairs/renovations by correlating captured informatics sensor data related to the dwelling 2200 with the corresponding insurance policy.

At 2730, maintenance manager 2220 preferably selects one or more preferred maintenance/repair vendors. Maintenance/repair vendors are separate entities, each with the capability to perform a particular type of repair. For example, one vendor may specialize in insurance restoration work on roofing, siding, gutters and windows. Another vendor may have the capability to repair and fix the gas leak. Thus, maintenance manager 2220 may select one or more preferred vendors based, at least in part, on data collected from sensors 2004. In an embodiment of the present disclosure, the preferred vendors can have exclusive capabilities, meaning that the capability to handle any one particular repair by one vendor is not shared by the remaining vendors. In an alternative embodiment, the preferred vendors can have nonexclusive capabilities, meaning that the capability to handle any one-repair service by any one vendor is shared by one or more remaining vendors. Moreover, the capabilities of various vendors to handle the same type of repair may involve different technologies and charges (i.e., costs). The preferred vendor list may be stored, for example, in claim system repository 2226.

At 2732, maintenance manager 2220 may reconcile maintenance analytics performed at steps 2724 with the insurance policy associated with the dwelling 2200. For example, maintenance manager 2220 may recommend additional coverage for some of the planned repairs included in the maintenance profile (i.e., roof replacement coverage, interior plumbing and drainage coverage, and the like). As another example, maintenance manager 2220 may select a different vendor to perform specific repairs by reconciling vendors' estimated charges, fee structures, with coverage provided by the insurance policy.

At 2734, maintenance manager 2220 may send a request to initiate a claim to an insurance company claim system (which is not shown in FIG. 13, but may be a part of, or used by, insurance server 2012). Such a request may be received on a device associated with the claim system, such as insurance server 160, or any other device capable of receiving a request for the initiation of an insurance claim. The request sent by maintenance manager 2220 to the claim system may include information relevant to maintenance/repair and/or insurance policy associated with the dwelling 2200. For example, maintenance manager 2220 may be configured to provide insurance policy identification, maintenance profile, preferred vendor's identification and/or any other information that may be of use in initiating an insurance claim. All such information is contemplated as within the scope of the present disclosure.

At 2736, maintenance manager 2220 preferably provides a claim status notification based on the request sent to the insurance company claim system (at 2734). It is to be appreciated that policy analyzer 2216 may also be configured to electronically deliver all notifications regarding planned and/or recommended repairs. The notification can be anything that advises a policy holder, device, or computer system of the dwelling maintenance and claim initiation related activities, including but not limited to, a display of text on a local display screen, a message in an email sent to a local or remote computer, a text message, a communication to a remote computer system. It is to be also understood and appreciated that maintenance manager 2220 may be configured and operational to integrate with policyholder's communicative computing devices (e.g., smart phones (via an app), computers, tablets, smart TV's, vehicle communication systems, kitchen communication systems, etc.) for sending such notifications. In an embodiment of the present disclosure, each notification may include, but not limited to, information related to immediate repair needs, recommended time period for performing major dwelling improvements, information related to one or more preferred maintenance/repair vendors (for example, selected at 2730), information related to a claim status, and the like. Additionally, maintenance manager 2220 may save the aforementioned claim status and/or repair recommendations in the insurance server's 2012 claim system repository 2226.

Figure 28:
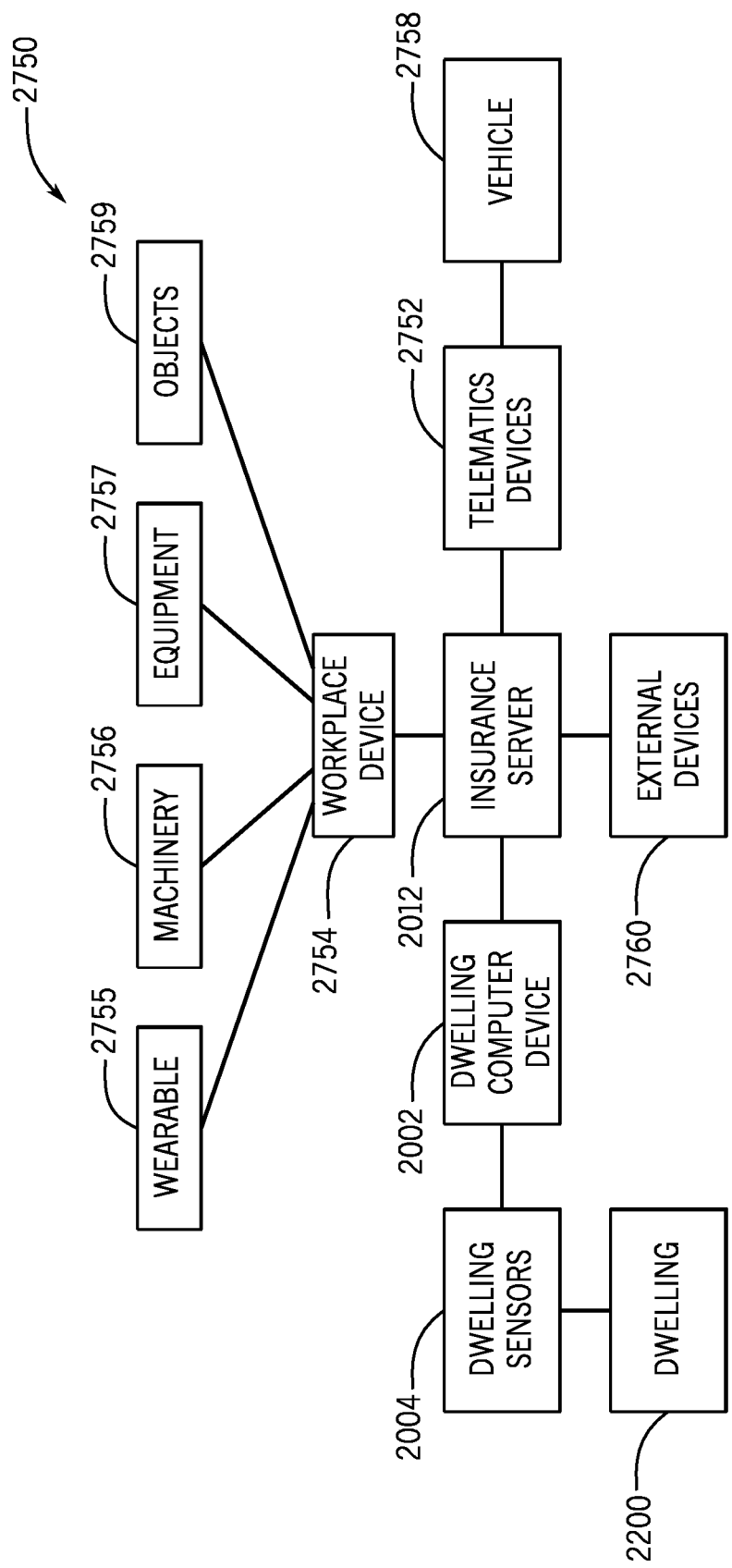
FIG. 28 is block diagram, illustrating an insurance server coupled to a computing device for receiving data from sensors, in accordance with embodiments presented herein.

With reference now to FIG. 28, shown is insurance server 2012 coupled to computing device 2006 for receiving data from sensors 2004 preferably relating to a dwelling 2200 in accordance with the above description. In addition to being coupled to dwelling computing device 2006, insurance server 2012 is also shown coupled to vehicle telematics device 2752, external computing devices/servers 2760 and a workplace device(s) 2754. Network 2000, and links 109 thereof (FIG. 11), preferably couple server 2012 to each of the aforementioned components (e.g., computing device 2006, workplace devices 2754, telematics device 2752 and external computing devices 2760).

With respect to telematics device 2752, it is preferably coupled to one or more user vehicles 2758 for receiving telematics and related data/information from each coupled vehicle 2758. The configuration, functionality and operability of telematics device 2752 is described in commonly assigned U.S. Patent Application Ser. No. 61/881,335 which is incorporated by reference in its entirety herein. It is to be understood and appreciated, telematics device 2752 provides user vehicle related information to be aggregated by insurance server 2012 as discussed further below.

With regards to external computing devices 2760, each is preferably associated with a service provider relating to a user's dwelling, vehicle 2758 and/or health condition. For instance, they may include (but are not limited to) emergency responders (e.g., police, fire, medical, alarm monitoring services, etc.), utility companies (e.g., power, cable (phone, internet, television), water), service providers (e.g., home appliance and automotive service providers), information/news providers (e.g., weather and traffic reports and other news items) and other like service/information/data providers.

In one aspect of the present disclosure, insurance server 2012 may be coupled to one or more workplace devices 2754 for evaluating policyholder's safety in the workplace. Safety in the workplace may include perils beyond driving, including (but not limited to) environmental conditions, physical stress and strain, and dangerous equipment. Sensors located in the policyholder's workplace may, for example, identify dangerous scenarios, including environmental conditions, worker behaviors, worker schedule, use or lack of use of proper safety equipment, and interactions with dangerous machines, substances or areas. Workplace devices may include (but not limited to) wearable devices 2755 which may be worn by the policyholder, devices located on machinery 2756, equipment 2757, objects 2759, and distributed around workplace environment. Workplace devices 2754 are preferably configured to take a variety of measurements. For example, motion detectors worn by a policyholder may measure body motion as the policyholder moves around and carries out various tasks at work. Multiple motion sensors may be worn on different body parts to obtain detailed body movement information. Motion sensors may monitor speed, acceleration, position, rotation, and other characteristics of body and appendage motion. There are sensors available in the marketplace for determining the body posture of employees, particularly while lifting heavy objects. Chronic and acute back injuries are often the result of lifting objects using an improper lifting behavior, and can lead to high valued insurance claims. Pressure sensors embedded in the footwear of a policyholder or located on the floor of workplace also could provide information on the ergonomics, such as weight and weight distribution over different parts of policyholder's body. Workplace devices 2754 may include many other types of sensors which may be used to gain information about the work habits of the policyholder.

Figure 29:
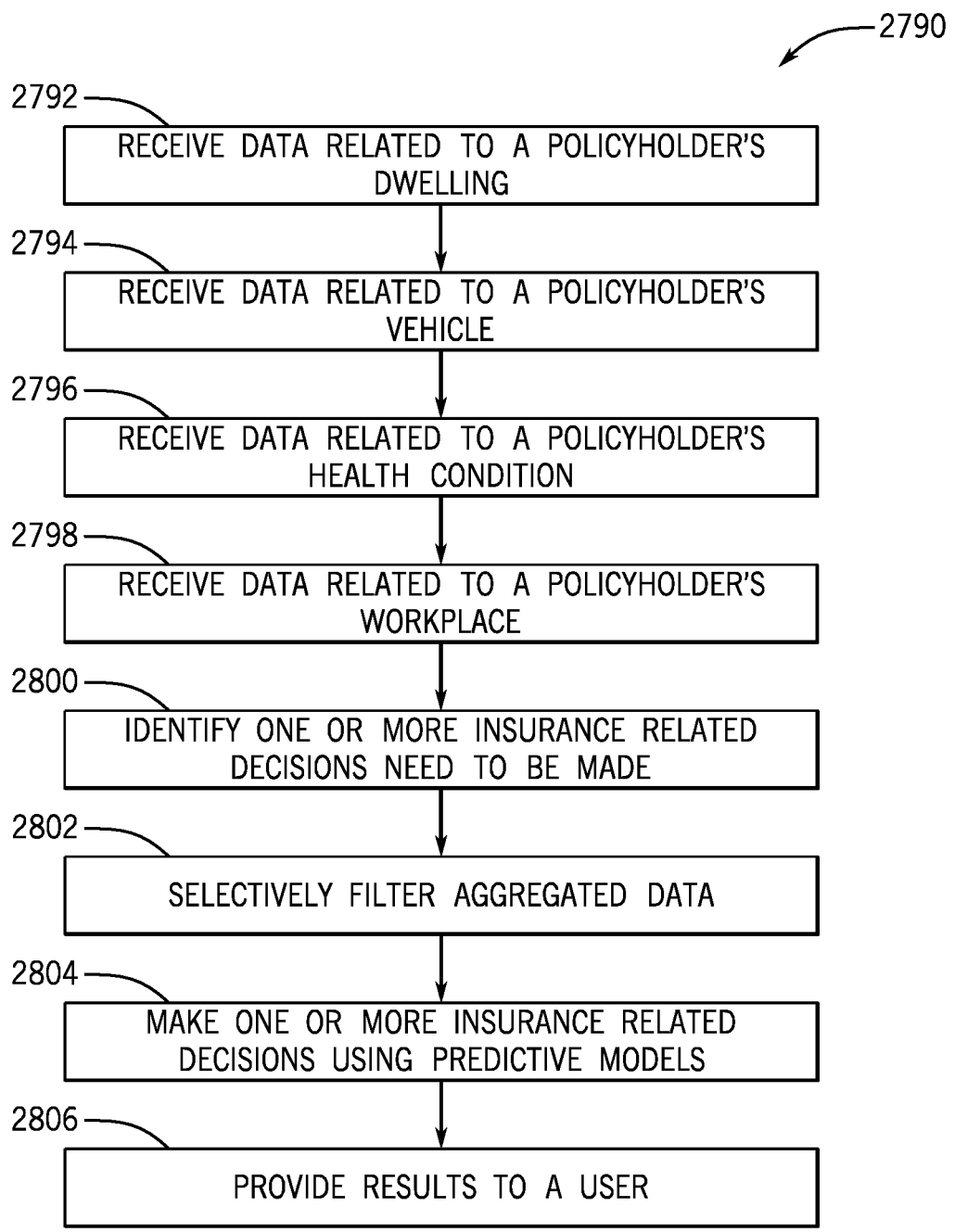
FIG. 29 is a flowchart, illustrating operational steps of the data analyzer, in accordance with embodiments presented herein.

FIG. 29 shows, in the form of a flow chart, exemplary operational steps of the data analyzer 2218. Before turning to descriptions of FIG. 29, it is noted that the flow diagram shown therein is described, by way of example, with reference to components shown in FIGS. 11-13 and 28, although these operational steps may be carried out in any system and are not limited to the scenario shown in the aforementioned figures. Additionally, the flow diagram in FIG. 29 shows examples in which operational steps are carried out in a particular order, as indicated by the lines connecting the blocks, but the various steps shown in these diagrams can be performed in any order, or in any combination or subcombination.

With reference to FIG. 29, at 2792, data analyzer 2218 preferably collects data related to a policyholder's dwelling 2200 from sensors 2004 placed at various locations in and around the dwelling 2200. In an embodiment of the present disclosure, this step may involve computing device 2006 periodically contacting (via network 2000), at prescribed time intervals, data analyzer component 2218 running on server 2012 to send accumulated data. In an alternative embodiment, contact between the dwelling computing device 2006 and data analyzer 2218 may be initiated when the data analyzer 2218 contacts the dwelling computing device 2006. Following the initial contact, data analyzer 2218 may receive data from the dwelling computing device 2006. It is to be understood data packets collected from sensors 2004 can be aggregated in dwelling computing device 2006 and sent as an aggregated packet to data analyzer 2218 for subsequent analysis.

At 2794, data analyzer 2218 preferably collects telematics data from the telematics device(s) 2752 (shown in FIG. 28) that are preferably coupled to one or more policyholder vehicles 2758. As previously indicated, the telematics device 2752 may be used to monitor a number of aspects of the use of the motor vehicles 2758. For example, the telematics device 2752 monitors the speed at which the vehicle is travelling. The telematics device 2752 may also able to send data related to braking habits of the policyholder (or another driver operating the vehicles 2758) either using the GPS functionality or by using an accelerometer or having one or more sensors connected to a deceleration detection device, for example. The telematics device 2752 may also be configured and operable to detect the distance travelled and if the vehicle was driven for a long time period without a break. In addition, the times of the day that the vehicle 2758 is being driven can be captured as night time driving is statistically more dangerous than day time driving, especially weekend late night driving. According to an embodiment of the present disclosure, based on the data provided by telematics devices 2752, the data analyzer 2218 may be able to determine when the vehicle 2758 turns without indicating, for example. In any event, the data from the telematics devices 2752 may be transmitted to an insurance server 2012 over a communication network 2000.

At 2796, data analyzer 2218 preferably collects data related to a policyholder's health and wellness condition from, for example, aforementioned activity monitoring sensors 2004 placed at various locations in and around the dwelling 2200. This data may include information related to policyholder's exercise, diet, habits, health history and conditions, as well as other wellness factors. The data analyzer 2218 may use this data to calculate the policyholder's current wellness state, which can be used to classify a pool of policyholders according to degree of wellness. Furthermore, data analyzer 2218 can use this classification level data to calculate premiums based on wellness. As a result, policyholders who maintain a higher state of wellness relative to other same age and gender policyholders can receive lower premiums. Policyholders with a lower wellness status can receive a reward (such as a reduced premium) for improving their state of wellness. According to embodiments of the present disclosure, data analyzer 2218 may be configured and operable to process a large amount of health and wellness data received at 2796.

At 2798, data analyzer 2218 preferably collects data from workplace devices 2754 which may be used to gain information about the work habits of the policyholder. This data may include a variety of measurements described above. In an embodiment of the present disclosure, data analyzer 2218 may utilize data gathered at 2798, for example, to identify patterns and trends that could be used to reduce, through prevention, the occupational risks of injury and death associated with policyholder's workplace.

With continuing reference to the gathering of data in step 2798, in an illustrated embodiment, an insurance company's Customer Relationship Management (CRM) tool/module may be operative to enable the insurance company to understand a policyholder better. For instance, the CRM tool is operative to determine the policyholder has a homeowner's policy, a checking account, a life insurance policy and an investment device. Since this policyholder has multiple lines of business with the company, it is determined the loss performance may be lower than another policyholder with a homeowners policy only. Additionally, the CRM may be operative to determine the payment history for the policyholder. This information may be used to determine the policyholder's payment history as a data layer for making rating, acceptability, and/or coverage decisions.

With continuing reference to FIG. 29, data analyzer 2218 preferably collects data related to a policyholder's surrounding risk characteristics. These risk characteristics can be data layers about the insured's risk in the area the insured lives. Examples of the risks that can be known about the insured are, but are not limited to, the hurricane risk, earthquake risk, flood risk, crime risk, wildfire risk, lightning risk, hail risk, and sinkhole risk. These risk factors can add to the information known about the insured and can be useful to the company for determining (and not to be understood to be limited to) pricing, acceptability, underwriting, and policy renewal.

Additionally, data analyzer 2218 preferably collects data related to unstructured data. Unstructured data refers to information that either does not have a pre-defined data model or is not organized in a predefined manner. Unstructured data is typically text heavy, but may contain data like dates, numbers and facts. An example of the way an insurance company could collect unstructured data is from social media like Facebook and Twitter. For instance, a community in a high wildfire area organizes wildfire prevention and mitigation efforts social media coordination efforts. The insurance company can monitor the social media sites and may know that this community is organizing and utilizing wildfire loss mitigation techniques. This data layer could be used along with the other information about the policyholder for the insurance policy. Also, the insurance company may determine that this wildfire community is not giving out the latest wildfire science information to the community members. The insurance company provides the community with the latest in wildfire science mitigation techniques.

Various method steps have been shown at 2792-2798. It should be appreciated that in some embodiments one or more of the steps 2792-2798 may be combined into a single step. In some embodiments, one or more of the steps 2792-2798 may be changed in terms of order. In some embodiments, one or more steps may be omitted. In some embodiments, one or more additional steps may be included. Also, the above embodiments are not intended to be all inclusive. Moreover, data analyzer 2218 may include a parser configured to parse, aggregate and classify the received data (at 2792-2798) based on, for example, type of sensor employed to collect a particular subset of the received data. Data analyzer 2218 may create a data structure for each classification. Additionally, data analyzer 2218 may store the captured informatics and telematics data in the data repository 310 (which is shown, in FIG. 13, as being part of, or used by, insurance server 2012). The data repository 310 may comprise a database or any other suitable storage component. For example, the suitable storage component may comprise, or may otherwise make use of, magnetic or optical disks, volatile random-access memory, non-volatile random—access memory or any other type of storage device.

It should be appreciated that in some embodiments data analyzer 2218 may be integrated with other sub-modules within the data analysis module 2210, as well as other modules (not shown in FIG. 13), such as a user interface module, that may comprise or may otherwise make use of the insurance server 2012. The analysis performed by data analyzer 2218 may be used to make various types of decisions and/or enable the provision of certain products/services such as those that can be offered by an insurance carrier. In an embodiment of the present disclosure, at 2800, data analyzer 2218 may identify one or more insurance related decisions based on, for example, its interaction with the user interface module.

One type of decision that may be made is a claims decision. For example, if a claim is made against a homeowner's insurance policy associated with dwelling 2200, whether the claim is to be paid (or the amount of the claim to be paid) may depend on how dwelling 2200 was damaged or destroyed. Many homeowner's insurance policies insure against various natural perils differently (e.g., some policies cover fire but not earthquake), so if an earthquake strikes and dwelling 2200 is found collapsed and burnt, there are at least two possibilities as to how the dwelling 2200 arrived in its current condition: (1) the dwelling 2200 collapsed from the earthquake and then its collapsed remains burnt, or (2) the earthquake started a fire that burnt the dwelling 2200, and the burnt dwelling 2200 remains collapsed. If fire is a covered risk and earthquake is not, then it may be relevant to determine whether (1) or (2) is what happened, since (2) would be a covered loss event while (1) would not be a covered loss event. Thus, analysis of data associated with the dwelling 2200 received at 2792 may be used to determine how the dwelling 2200 was damaged or destroyed, which may be relevant in determining whether and/or how to pay a claim.

Another type of decision that may be made based on, for example, telematics data received from telematics devices 2752 (at 2794) is an underwriting decision. For example, an insurance company may collect data about a vehicle and one or more drivers associated with the vehicle to determine whether to continue insuring that vehicle, or to set the premium for insuring the vehicle. In various embodiments, data analyzer 2218 may update previously received or stored data to determine whether a risk (e.g., an underwriting risk) associated with providing an automobile insurance policy has changed. Based on the analysis of driver's use of the vehicle (including braking and accelerating among other examples) data analyzer 2218 may recalculate a coverage amount or a premium of the insurance policy. Data analyzer 2218 may amend the automobile insurance policy based on the telematics data analysis.

Another type of decision that may be made based on captured informatics sensor data is an alert decision. For example, if assessment of policyholder's health and wellness factors indicates a risk of some type of disease, which may be a concern for the policyholder's health, data analyzer 2218 may issue an alert to the policyholder in order to encourage some kind of remedial action, such as seeing a doctor.

Still another type of decision may involve providing recommendations to make certain adjustments related to policyholder's work habits, for example. For instance, based upon certain analysis of policyholder's work habits, data analyzer 2218 may identify a certain pattern that may increase occupational risk of injury. In response, data analyzer 2218 may make recommendations with respect to, for instance, improper lifting behavior that may reduce the identified risks related to policyholder's work habits.

It should be appreciated that the specific decisions that are discussed above by no means constitute an exhaustive list. Any type of decision related to one or more insurance related products, such as health insurance products, property insurance products, vehicle insurance products, long term disability insurance products, and the like may be made by data analyzer 2218.

According to an embodiment of the present disclosure, at 2802, data analyzer 2218 optionally selectively filters aggregated data based on the type of decisions need to be made. The main idea behind this aspect of the present disclosure is that data analyzer 2218 may selectively filter out any non-relevant data before sending the data to the one or more predictive models described below, based on the context of the particular decision. In an embodiment of the present disclosure, data filtering feature may be implemented based on filtering rules predefined by the insurance company.

At 2804, data analyzer 2218 preferably utilizes one or more predictive models to rapidly make the one or more decisions identified at 2800. Predictive modeling generally refers to techniques for extracting information from data to build a model that can predict an output from a given input. Predicting an output can include predicting policyholder's future behavior patterns and/or health-related risks, performing analysis to predict an occurrence of a certain peril, such as earthquake or hurricane, to name a few examples. Various types of predictive models can be used to analyze data and generate predictive outputs. Examples of predictive models include, but not limited to, Naive Bayes classifiers, linear and logistic regression techniques, support vector machines, neural networks, memory-based reasoning techniques, and the like. Typically, a predictive model is trained with training data that includes input data and output data that mirror the form of input data that will be entered into the predictive model and the desired predictive output, respectively. The amount of training data that may be required to train a predictive model can be large. It is noted that different types of predictive models may be used by data analyzer 2212 depending on the type of decision and/or type of captured informatics sensor data. Additionally, a particular type of predictive model can be made to behave differently by data analyzer 2218, for example, by adjusting the hyper-parameters or via feature induction or selection. In an embodiment of the present disclosure, one or more of the predictive models may be a predictive model markup language (PMML) model that defines the application of a model to selectively filtered-out data.

It should be appreciated that some comprehensive insurance related decisions may be made by aggregating results provided by the one or more predictive models. For instance, to recalculate a coverage amount or a premium of the life-insurance policy, data analyzer 2218 may aggregate results provided by various models that predict risks associated with policyholder's health condition, workplace-related risks, dwelling-related risks, CRM tool used by the insurance company, hurricane risk, earthquake risk, flood risk, crime risk, wildfire risk, lightning risk, hail risk, sinkhole risk, unstructured data available, and the like.

At 2806, data analyzer 2218 preferably provides results to users via, for example, the aforementioned user interface module. Alternatively, data analyzer 2218 may store the generated results in the data repository 310.

Advantageously, data analyzer 2218 provides a powerful insurance related decision making engine that is contingent upon dynamically captured informatics sensor data. In another aspect, data analyzer 2218 may also provide for "one click" process to facilitate a rapid insurance-related action. This "one click" process can quickly provide the insured a quote on, for example and not limited to, a homeowner or auto insurance policy. An embodiment of this idea would be the insurance company collects the information about the insured using the ways illustrated above, and the insured either only has to provide very little or no additional information about their home or car. This can quicken the quote process. For example, the insurance company can solicit a homeowners policy to the insured, the insured can see a picture of their home on a mobile phone with all the home characteristics already provided. The insured would only need to select "buy" and they have purchased their home insurance.

Figure 30:
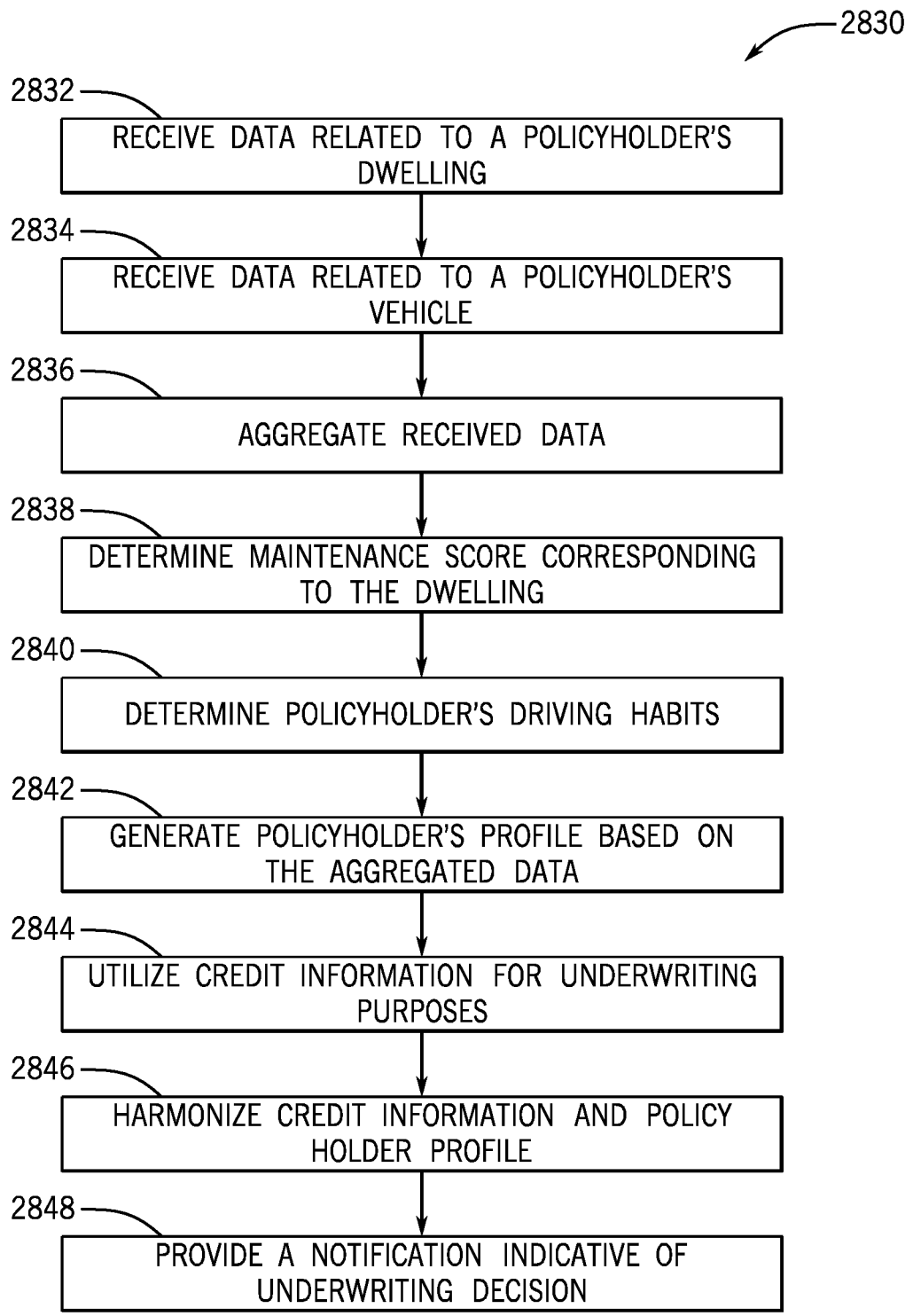
FIG. 30 is a flowchart, illustrating a process where data analyzer preferably collects data related to a policyholder's dwelling from sensors placed at various locations in and around the dwelling, in accordance with embodiments presented herein.

With reference to FIG. 30, at 2832, data analyzer 2218 preferably collects data related to a policyholder's dwelling 2200 from sensors 2004 placed at various locations in and around the dwelling 2200. In an embodiment of the present disclosure, this step may involve computing device 2006 periodically contacting (via network 2000), at prescribed time intervals, data analyzer component 2218 running on server 2012 to send accumulated data. In an alternative embodiment, contact between the dwelling computing device 2006 and data analyzer 2218 may be initiated when the data analyzer 2218 contacts the dwelling computing device 2006. Following the initial contact, data analyzer 2218 may receive data from the dwelling computing device 2006. It is to be understood data packets collected from sensors 2004 can be aggregated in dwelling computing device 2006 and sent as an aggregated packet to data analyzer 2218 for subsequent analysis.

At 2834, data analyzer 2218 preferably collects telematics data from the telematics device(s) 2752 (shown in FIG. 28) that are preferably coupled to one or more policyholder vehicles 2758. As previously indicated, the telematics device 2752 may be used to monitor a number of aspects of the use of the motor vehicles 2758. For example, the telematics device 2752 monitors the speed at which the vehicle is travelling. The telematics device 2752 may also able to send data related to braking habits of the policyholder (or another driver operating the vehicle 2758) either using the GPS functionality or by using an accelerometer or having one or more sensors connected to a deceleration detection device, for example. The telematics device 2752 may also be configured and operable to detect the distance travelled and if the vehicle 2758 was driven for a long time period without a break. In addition, the times of the day that the vehicle 2758 is being driven can be captured as night time driving is statistically more dangerous than day time driving, especially weekend late night driving. According to an embodiment of the present disclosure, based on the data provided by telematics devices 2752, the data analyzer 2218 may be able to determine when the vehicle 2758 turns without indicating, for example. In any event, the data from the telematics devices 2752 may be transmitted to an insurance server 2012 over a communication network 2000. According to embodiments of the present disclosure, data analyzer 2218 may be configured and operable to process a large amount of telematics data received at 2834.

It should be appreciated that in some embodiments steps 2832 and 2834 may be combined into a single step. In some embodiments, steps 2832 and 2834 may be changed in terms of order. In some embodiments, one or more additional steps may be included.

According to an embodiment of the present disclosure, data analyzer 2218 may include a parser configured to parse, aggregate and classify the received data (at 2836) based on, for example, type of sensor employed to collect a particular subset of the received data. Data analyzer 2218 may create a data structure for each classification. Additionally, data analyzer 2218 may pre-process and store the captured informatics and telematics data in the data repository 310 (which is shown, in FIG. 13, as being part of, or used by, insurance server 2012). Pre-processing the captured data may involve extracting relevant sensor-based information to enable storage thereof in the data repository 310. The data repository 310 may comprise a database or any other suitable storage component. For example, the suitable storage component may comprise, or may otherwise make use of, magnetic or optical disks, volatile random-access memory, non-volatile random—access memory or any other type of storage device.

At 2838, data analyzer 2218 preferably conducts an analysis to determine a maintenance score value corresponding to the dwelling 2200. For example, data analyzer 2218 may generate the maintenance score value based upon the dwelling age, dwelling type and any repair and/or maintenance needs. It is noted that repair/maintenance needs may include, but not limited to, immediate repair needs and preventive maintenance needs. In general, any dwelling condition that affects the residents' health or safety may be considered by data analyzer 2218 as requiring an immediate repair. For instance a hole may have been detected in the roof of dwelling 2200 (via one or more sensors 2004), requiring immediate repair. As another example, an environmental sensor may have detected a gas leak or any contaminant adverse to human health. As an example of preventive maintenance needs, based upon an air flow analysis, data analyzer 2218 may have detected that damaged frames and/or dividers allow air leaks into dwelling 2200. Thus, data analyzer 2218 may consider window replacement as a preventive maintenance factor in calculation of the maintenance score value. The generated maintenance score may be represented in the form of a numerical value, such as a value ranging from 0 to 5 for each of the factors, as well as a combined (average or weighted average) aggregate score.

According to an alternative embodiment of the present disclosure, at 2838, data analyzer 2218 may generate a maintenance profile corresponding to the dwelling 2200 based on the received informatics data. The maintenance profile may include both immediate repair needs and preventive maintenance needs. For example, the generated maintenance profile may indicate that electrical wiring system is so old that it needs an immediate upgrade. As another example, the maintenance profile may point out that gas heating boiler has not received its annual service. In addition, the maintenance profile may include forward maintenance plans, for instance, for the next five to seven years, establishing, for example, the date of the next re-painting job, the date of the next windows replacement job, and the like. Furthermore, the generated maintenance profile may include detailed information about all necessary and planned repairs.

At 2840, data analyzer 2218 preferably conducts an analysis to determine policyholder's driving habits based on compiled historical telematics data. The policyholder's driving habits can include preferred driving speed, preferred driving speed for a particular roadway, preferred driving speed for a particular speed limit, preferred cruise control speed, preferred lane change frequency, preferred headway distance, preferred lane change space, and/or other data. In this step data analyzer 2218 may also determine braking habits of the policyholder (or another driver operating the vehicles 2758). In addition, data analyzer 2218 may also evaluate the times of the day that the vehicle 2758 is being driven, as night time driving is statistically more dangerous than day time driving, especially weekend late night driving. According to an embodiment of the present disclosure, based on the data provided by telematics devices 2752, the data analyzer 2218 may be able to determine when the vehicle 2758 turns without indicating, for example. According to yet another embodiment of the present disclosure, at 2840, data: analyzer 2212 may assess other information indicative of vehicle operation and maintenance including, but not limited to, tire pressure, mileage, tread wear, and vehicle oil change history.

It should be appreciated that in some embodiments, at 2842, data analyzer 2218 may integrate analysis performed at 2838 and 2840 to generate a policyholder profile corresponding to the policyholder associated with the dwelling 2200 and vehicle 2758. In some embodiments, the policyholder profile may include material, geographical, and/or behavioral attributes that may influence the probability that a policyholder may personally experience or cause an insured loss. For example, the policyholder profile may include a policyholder's name, address, phone number, and birth date. Other policyholder profile data may include policyholder risk attributes and a claim history. Policyholder risk attributes may include data that indicates the policyholder, residents, or any individual connected to the policy (e.g., persons residing in, working in, or otherwise using the dwelling 2200, persons driving the vehicles 2758 associated with the policy) have an increased or decreased probability to experience a fire or other loss to the insured dwelling 2200 and/or experience any loss to the insured vehicle 2758. The policyholder risk attributes may include demographic (e.g., marital status, age, etc.), geographic (e.g., urban, suburban, rural, etc.), and behavioral (e.g., poor maintenance score/profile, high risk driving habits, etc.) attributes of the policyholder or other residents/drivers. The claim history may also indicate a type of risk for the insurer as policyholders with more numerous claims may indicate a higher probability of experiencing a property loss than policyholders with fewer claims.

It should be appreciated that in some embodiments data analyzer 2218 may be integrated with other sub-modules within the data analysis module 2210, as well as other modules (not shown in FIG. 13), such as a user interface module, that may comprise or may otherwise make use of the insurance server 2012. The analysis performed by data analyzer 2218 (e.g., at 2838-2842) may be used for various insurance underwriting purposes. For example, the aforementioned insurance underwriting purposes may include underwriting decisions related to at least one of health insurance products, property insurance products, life insurance products, vehicle insurance products, long term disability insurance products, and the like. In an embodiment of the present disclosure, at 2844, data analyzer 2218 may identify one or more insurance underwriting purposes based on, for example, its interaction with the user interface module and may use the policyholder profile generated at 2842 to make the corresponding underwriting decision.

One type of underwriting decision that may be made is a claims decision. For example, if a claim is made against a homeowner's insurance policy associated with dwelling 2200, whether the claim is to be paid (or the amount of the claim to be paid) may depend on how dwelling 2200 was damaged or destroyed. Many homeowner's insurance policies insure against various natural perils differently (e.g., some policies cover fire but not earthquake), so if an earthquake strikes and dwelling 2200 is found collapsed and burnt, there are at least two possibilities as to how the dwelling 2200 arrived in its current condition: (1) the dwelling 2200 collapsed from the earthquake and then its collapsed remains burnt, or (2) the earthquake started a fire that burnt the dwelling 2200, and the burnt dwelling 2200 remains collapsed. If fire is a covered risk and earthquake is not, then it may be relevant to determine whether (1) or (2) is what happened, since (2) would be a covered loss event while (1) would not be a covered loss event. Thus, analysis of data associated with the dwelling 2200 (received at 2832) may be used to determine how the dwelling 2200 was damaged or destroyed, which may be relevant in determining whether and/or how to pay a claim.

Another type of decision that may be made based on, for example, telematics data received from telematics devices 2752 (at 2834) is an underwriting decision related to a vehicle (i.e., vehicle 2758). For example, an insurance company may collect data about a vehicle and one or more drivers associated with the vehicle to determine whether to continue insuring that vehicle, or to set the premium for insuring the vehicle. In various embodiments, data analyzer 2218 may dynamically update previously received or stored data to determine whether a risk (e.g., an underwriting risk) associated with providing an automobile insurance policy has changed. Based on the analysis of driver's use of the vehicle (including risky braking and accelerating habits, among other examples) data analyzer 2218 may recalculate a coverage amount or a premium of the insurance policy.

Data analyzer 2218 may amend the automobile insurance policy based on other information indicative of vehicle operation and maintenance and/or dwelling operation and maintenance.

Another type of decision that may be made based on captured informatics sensor data is a life insurance underwriting decision. For example, data analyzer 2218 may facilitate the evaluation of the risk associated with a prospective policyholder (based on the aggregated data included in the policyholder's profile) against the insurer's underwriting criteria to create the life insurance policies. In an embodiment of the present disclosure, for insurance underwriting purposes data analyzer 2218 may consider many factors such as dwelling's structural condition, policyholder's lifestyle, risky habits and trends, environmental conditions related to the dwelling 2200, driving style and other information that may be contained in the policyholder's profile.

Still another type of decision may involve providing recommendations related to a combined homeowner's and vehicle insurance policy, for example. For instance, data analyzer 2218 may consider all risk parameters associated with homeowner's insurance in combination with one or more risk parameters related to a vehicle insurance policy based on the aggregated data contained in the policyholder's profile. In response, data analyzer 2218 may make certain recommendations, such as, but not limited to, a premium discount, with respect to the combined homeowner's and vehicle insurance policy.

It should be appreciated that the specific decisions that are discussed above by no means constitute an exhaustive list. Any type of underwriting determination related to one or more insurance related products, such as health insurance products, property insurance products, vehicle insurance products, long term disability insurance products, and the like may be made by data analyzer 2218 based upon the aggregated informatics and telematics data.

At 2848, data analyzer 2218 preferably provides a notification indicative of one or more above-described underwriting decisions made by data analyzer 2218. It is to be appreciated that data analyzer 2218 may be configured to electronically deliver all notifications regarding corresponding underwriting determinations. The notification can be anything that advises a policyholder, device, or computer system of the one or more underwriting matters, including but not limited to, a display of text on a local display screen, a message in an email sent to a local or remote computer, a text message, a communication to a remote computer system. The electronic delivery may include integration of notification functionalities. It is to be also understood and appreciated that data analyzer 2218 may be configured and operational to integrate with policyholder's communicative computing devices (e.g., smart phones (via an app), computers, tablets, smart TV's, vehicle communication systems, kitchen communication systems, etc.) for sending such notifications regarding such suggested insurance policy alterations. In an embodiment of the present disclosure, each notification may include, but not limited to, recommended insurance products, adjusted coverage limits and premiums, liability coverage adjustments, and the like.

Figure 31:
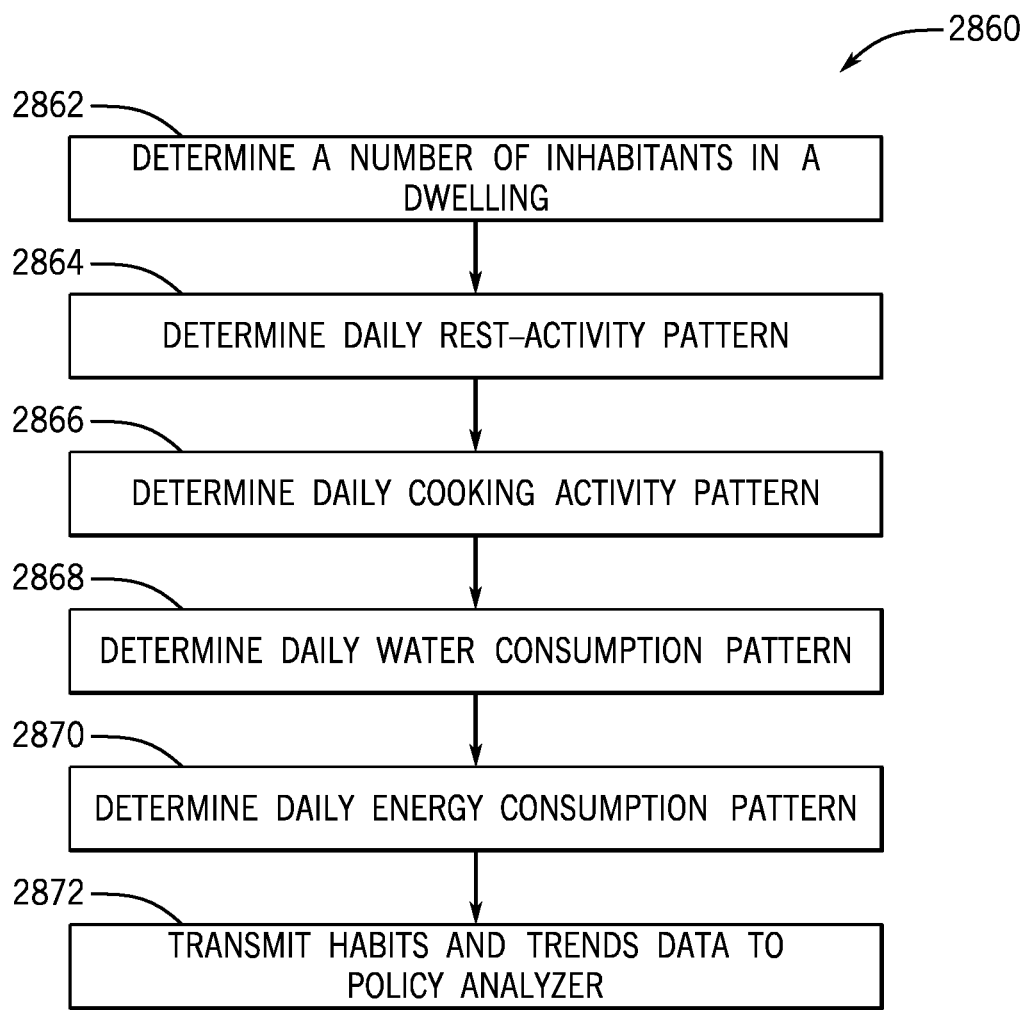
FIG. 31 is a flowchart, illustrating a process where dwelling analyzer preferably collects data from sensors to determine a number of people occupying the dwelling at various points in time for insurance purposes, in accordance with embodiments presented herein.

With reference to the process 2860 of FIG. 31, at 2862, dwelling analyzer 2212 preferably collects data from sensors 2004 to determine a number of people occupying the dwelling 2200 at various points in time for insurance purposes. In an embodiment of the present disclosure, this step may involve computing device 2006 periodically contacting (via network 100), at prescribed time intervals, data analyzer component 2218 running on server 2012 to send data collected by a plurality of motion sensors 2004. It is noted, a variety of motion sensors 2004 are preferably installed at various points around the dwelling 2200 such as in the living room, bedroom, kitchen, and bathroom. The sensors are arranged to communicate with the computing device 2006, which, for example, may be located in a hallway near a main entrance of the dwelling 2200. The one or more motion sensors 2004 may be configured and operational to monitor movement of dwelling inhabitants in different areas of the dwelling 2200. In an embodiment of the present disclosure, motion sensors 2004 may comprise passive infrared detectors. Dwelling analyzer 2212 may determine, for example, whether the dwelling 2200 was occupied by more than one inhabitant by detecting substantially simultaneous motion patterns at various points around the dwelling 2200.

At 2864, dwelling analyzer 2212 preferably processes the informatics data collected by a plurality of motion sensors 2004 to determine daily rest-activity pattern. For example, dwelling analyzer 2212 may estimate rest-activity parameters such as bed time, rise time, sleep latency, and nap time for one or more inhabitants of the dwelling 2200 by combining data from multiple sensors 2004 located around the dwelling 2200. As another example, dwelling analyzer 2212 may be configured to determine whether the dwelling remains unoccupied for an extended period of time. This information may be used by policy analyzer 2216, for instance, to determine proper insurance coverage levels for personal property contained within the dwelling 2200.

At 2866, based on data collected from sensors 2004 regarding a dwelling 2200, dwelling analyzer 2212 preferably conducts an analysis to determine daily cooking activity pattern of one or more dwelling 2200 inhabitants. In an embodiment of the present disclosure, one or more appliance sensors 2004 may be employed to measure the use of cooking appliances such as a kettle, a fridge, a washing machine, a microwave oven or an electric cooker. For example, dwelling analyzer 2212 may detect the cooking time trends by detecting that a rice cooker or microwave oven is turned on/off, detecting that a gas range or an IH (Induction-Heating) cooking heater is turned on/off or detecting other cooking home electric appliances are turned on/off. As another example, dwelling analyzer 2212 may combine data collected from various types of sensors, such as motion and appliance sensors 2004, to determine, for instance, whether any of the cooking appliances remain unattended for an extended period of time, thus increasing the risk of fire. The daily cooking activity tracking may be adaptive. In other words, dwelling analyzer 2212 preferably gradually adjusts to the dwelling inhabitant's new activities and/or habits if they change over time. In general, dwelling analyzer 2212 may assess the risk of fires and explosions arising from various activities of dwelling inhabitants and/or observed events and use this information to provide targeted specific advice and guidance at dwelling 2200 to reduce the chance of fires and explosions arising from the activity.

At 2868, dwelling analyzer 2212 conducts an analysis to determine daily water consumption pattern. For example, based upon analysis of a plumbing system, dwelling analyzer 2212 may have detected long-term stress on pipes and may estimate future plumbing leaks. In order to prevent water leaks, dwelling analyzer 2212 may recommend reducing water pressure (e.g., by installing a water softener). As another example, dwelling analyzer 2212 may have detected that dwelling 2200 inhabitants tend to leave shower faucets running while answering the phone, thus increasing the risk of flooding in a bathroom. Dwelling inhabitants' behavior patterns during a storm can also increase the risk of flooding. For example, a combination of washing clothes, taking a shower, and running the dishwasher could add water to a system that may already be overloaded. The water may have nowhere to go but into the basement of the dwelling 2200. Thus, dwelling analyzer 2212 may flag certain water consumption patterns of dwelling inhabitants as hazardous and use this information to provide targeted specific advice and guidance to reduce the water leaks at dwelling 2200.

Similarly, at 2870, dwelling analyzer 2212 preferably performs an analysis to determine daily energy consumption pattern. For example, based upon analysis of the dwelling's 2200 electrical system, dwelling analyzer 2212 may have detected the load pattern and energy amount are different in weekdays and weekends. For instance, during the weekday the minimum load may occur between 2:00 and 6:00 in the morning when most of dwelling occupants are sleeping and morning peak may be between approximately 7:00 AM and 10:00 AM, while the night peak may occur between approximately 7:00 PM and midnight when the dwelling 2200 inhabitants are at home, making dinner and using the entertainment appliances. On weekends there might be a mid-day peak load between approximately 10:00AM and 03:00 PM, while night peak may occur between approximately 07:00 PM and 10:00 PM. In addition, in this step, dwelling analyzer 2212 may flag certain energy consumption patterns of dwelling inhabitants as hazardous.

Thus, in steps 2862-2870, dwelling analyzer 2212 collects various characteristics indicative of habits and trends of dwelling 2200 inhabitants. At 2872, dwelling analyzer 2212 preferably transmits these characteristics to policy analyzer module 2214. In an embodiment of the present disclosure dwelling 2200 inhabitants' habits and trends characteristics may include, but not limited to, daily water consumption and energy consumption patterns, daily cooking activity pattern, number of inhabitants, hazardous activities pattern, and the like. In an alternative embodiment, dwelling analyzer 2212 may store these habits and trends characteristics in insurance server 2012 database. The readings of the amount of energy/water used at dwelling 2200 can be used to analyze and forecast an expected energy/water bill. This can also be used for budgeting and finance management because a history of energy/water usage at the dwelling 2200 or certain appliances can be measured and displayed to the homeowner or insurance company. These readings and usage can be provided to the homeowner so that he can budget X amount of money each month for the energy/water bill. Also, the homeowner or insurer can track energy/water use and determine based upon the rate of energy consumption that the homeowner is on a pace to use more or less energy/water use than is budgeted. If the homeowner is on pace to use more energy/water than is budgeted the insurance company can provide advice and guidance on how the homeowner can reduce energy use. If the homeowner is on pace to use less energy/water than is budgeted the insurance company can help the homeowner in moving the unspent portion of the budget amount to a savings device like a CD or money market.

Figure 32:
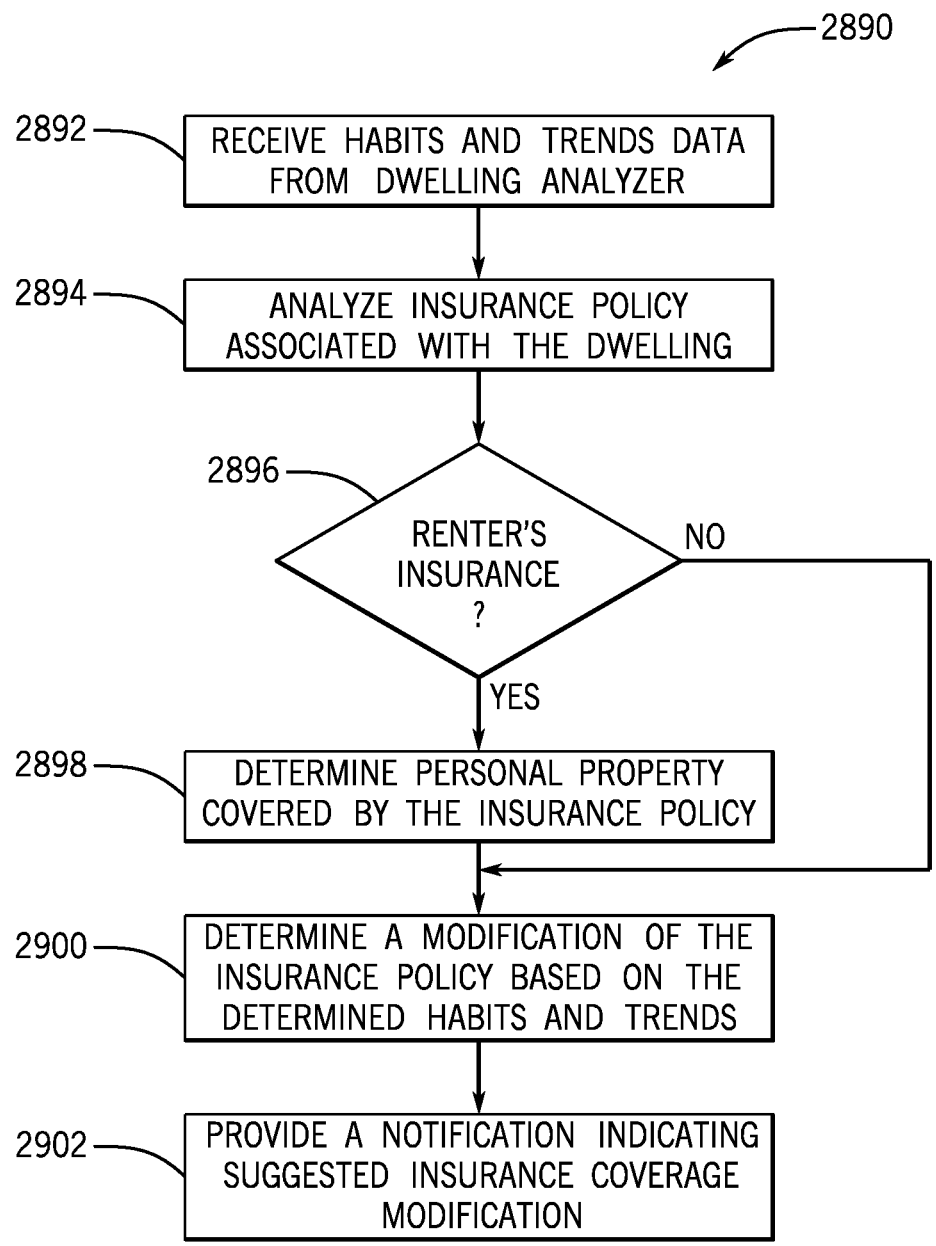
FIG. 32 is a flowchart, illustrating operational steps of the policy analyzer module of FIG. 13, in accordance with embodiments presented herein.

FIG. 32 is a flow diagram of operational steps 2890 of the policy analyzer module of FIG. 13 in accordance with an illustrated embodiment. At 2892, policy analyzer 2216 preferably receives dwelling 2200 habits and trends information from the dwelling analyzer 2212. In an alternative embodiment of the present disclosure, this step may involve the policy analyzer 2216 retrieving habits and trends information from the insurance server's 2012-storage component.

Next, policy analyzer 2216 preferably maps the received/retrieved data to a particular insurance policy associated with the dwelling 2200.

At 2894, policy analyzer 2216 preferably analyzes the insurance policy associated with the dwelling 2200. For example, policy analyzer 2216 may identify the type of the insurance policy. In other words, policy analyzer 2216 may determine whether the corresponding policy comprises homeowner's insurance, renter's insurance, umbrella liability insurance, and the like. In addition, policy analyzer 2216 preferably determines whether the insurance policy covers damage to or destruction of the dwelling 2200, whether it covers damage to or destruction of detached structures and whether it covers a plurality of appliances in the dwelling 2200 amongst other coverages.

According to an embodiment of the present disclosure, at 2896, policy analyzer 2216 checks whether the identified insurance policy type is renter's insurance. Such insurance typically covers personal property within a dwelling and policy holders typically do not own the structure they occupy. This type of policy can also cover liabilities arising from accidents and intentional injuries for guests of a covered dwelling. In response to determining that dwelling 2200 is covered by the renter's insurance policy (step 2896, yes branch), at 2898, policy analyzer 2216 may determine additional coverage details associated with this type of policy. For instance, policy analyzer 2216 may identify personal property within the dwelling 2200 that is covered by the insurance policy. Such property may include, but not limited to, jewelry, furniture, musical instruments, electrical and/or kitchen appliances, guns, furs, various items of fine art and antiques, collectible items, valuable papers, business property, and the like. This step may also involve policy analyzer 2216 determining property coverage limits as well as estimating the cost to replace the policyholder's personal belongings. While steps 2896 and 2898 are discussed with reference to renter's insurance policy, it is understood that this discussion is provided for illustrative purposes only. A person skilled in the relevant art will recognize that policy analyzer 2216 may determine other types of information relevant to the specific type of the insurance policy without departing from the scope and spirit of the presently disclosed techniques.

In response to determining that dwelling 2200 is covered by other type of insurance policy (step 2896, no branch), policy analyzer 2216, at 2900, preferably determines change recommendations to insurance products/services (that may be either currently existing or non-existing) which may be beneficial to a policy holder in view of current subscribed insurance products and coverage levels (i.e., current policy coverage levels). Policy analyzer 2216 preferably makes such determination based on data collected by the dwelling analyzer 2212 and based on analysis conducted at 2894. For instance, if policy analyzer 2216 determined that a policy holder (i.e., homeowner or renter) may not have insurance covering a particular type of event/loss, and based upon collected and analyzed data from sensors 2004 (amongst possible other factors), dwelling analyzer 2214 may provide a recommendation to a policyholder to subscribe to insurance covering such a particular type of event/loss. Additionally, policy analyzer 2216 may provide a recommendation to increase, decrease, or make other adjustments to personal liability limits based upon detected trends and habits determined by the dwelling analyzer 2212 at least in part by data collected from certain sensors 2004. In an embodiment of the present disclosure, such recommendation may relate to any damage associated with the dwelling 2200. As another example, one or more suggested modifications may relate to a loss of one or more of the personal property items associated with the dwelling 2200.

At 2902, policy analyzer 2216 preferably provides a notification indicating suggested insurance coverage modifications. It is to be appreciated that policy analyzer 2216 may be configured to electronically deliver all notifications regarding suggested insurance products modifications based on detected habits and trends of the dwelling 2200 inhabitants. The notification can be anything that securely advises a policy holder, device, or computer system of the suggested changes, including but not limited to, a display of text on a local display screen, a message in an email sent to a local or remote computer, a text message, a communication to a remote computer system. It is to be also understood and appreciated that policy analyzer 2216 may be configured and operational to integrate with policy holder's communicative computing devices (e.g., smart phones (via an app), computers, tablets, smart TV's, vehicle communication systems, etc.) for sending such notifications regarding such suggested insurance modifications. In an embodiment of the present disclosure, each notification may include, but not limited to, detected habits and trends as well as suggested recommendations with respect to insurance products/services associated with the dwelling 2200.

Figure 33:
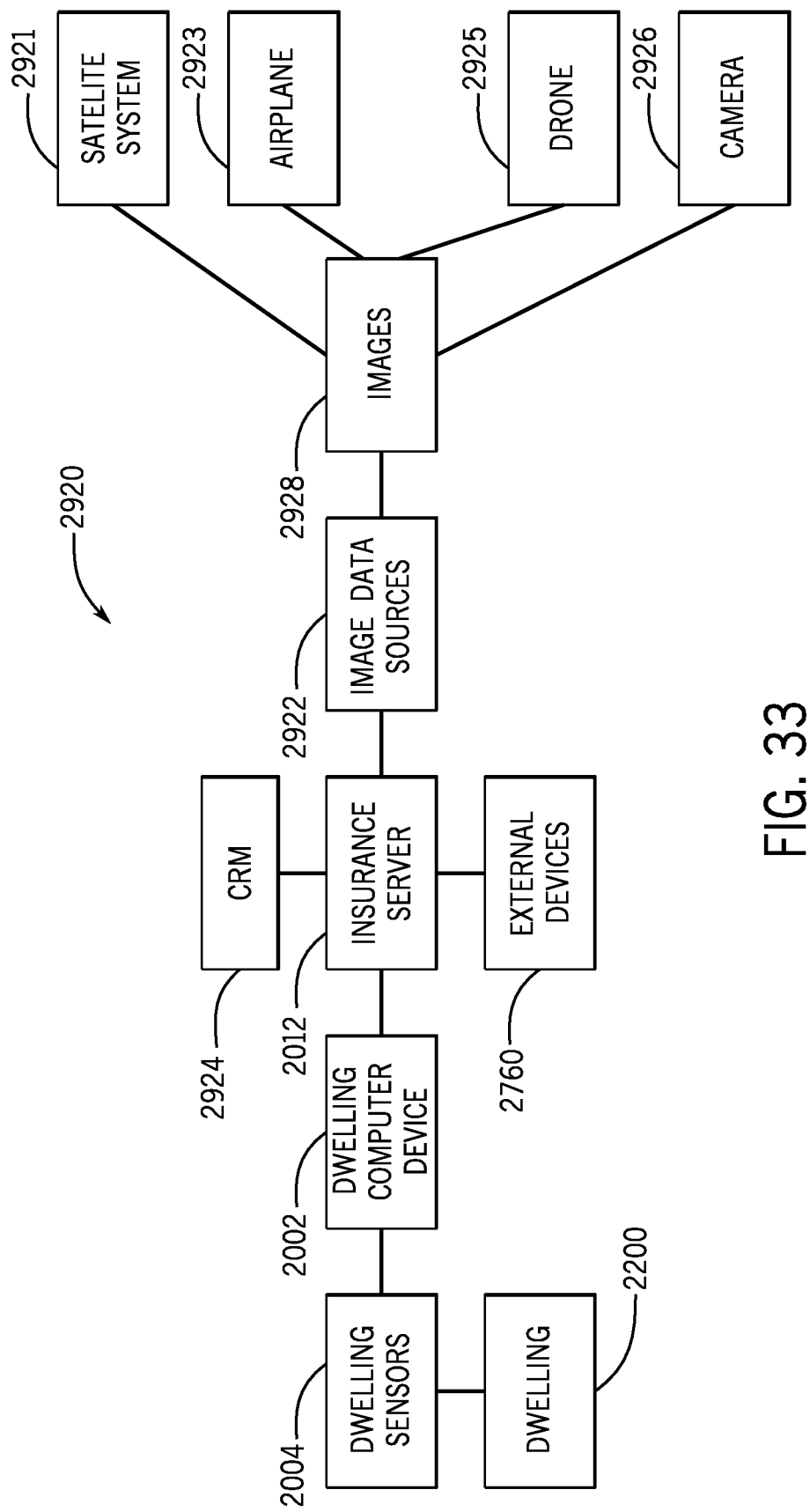
FIG. 33 is a block diagram, illustrating an insurance server coupled to computing device for receiving data from sensors preferably relating to a dwelling, in accordance with embodiments presented herein.

With reference now to system 2920 of FIG. 33, shown is insurance server 2012 coupled to computing device 2006 for receiving data from sensors 2004 preferably relating to a dwelling 2200 in accordance with the above description. In addition to being coupled to dwelling computing device 2006, insurance server 2012 is also shown coupled to various image data sources 2922, external computing devices/servers 2760 and an insurance company's Customer Relationship Management (CRM) tool/module 2924. Network 2000, and links 109 thereof (FIG. 11), preferably couple server 2012 to each of the aforementioned components (e.g., computing device 2006, CRM module 2924, image data sources 2922 and external computing devices 2760).

With respect to image data sources 2922, they are preferably operatively coupled to one or more instruments for receiving image data/information 2928 associated with the dwelling 2200. Modern techniques for locating one or more positions relative to objects of interest typically involve instruments that are used for surveying, geographical information systems data collection, or geospatial data collection. For example, Global Navigation Satellite System (GNSS) receivers are often used in conjunction with the surveying and geospatial instruments in order to speed position determination. Digital cameras 2926, video cameras 2926, multimedia devices, etc. may also be used for surveying purposes. The confluence of these systems/devices produces a variety of image data 2928 that may be contained in one or more image data sources 2922, such as an image-based geo-referencing system, an image database, an image database management system, among others.

According to an embodiment of the present disclosure, the image data sources 2922 may contain various views of the dwelling 2200. There are two principal kinds of "views" described herein: elevation view and aerial view. Elevation view in its strict definition means an orthographic rectified representation of a structure, such as dwelling 2200, usually as viewed from ground level. Camera images/photographs not yet rectified for orthographic presentation and not strictly elevation views, but instead are referred to herein as 'facade views.' Aerial views are images taken from above the objects of interest (i.e., dwelling 2200), often from airplanes 2923, drones 2925 or satellites 2921, and themselves may be rectified or otherwise rendered to become orthographic. However, many image databases show them without such rectification, thus often showing the elevation/facades of buildings in a foreshortened view. It is appreciated that a plan view such as from a blueprint or engineering drawing also falls into the category of aerial views as described herein. It is to be understood and appreciated, one or more image data sources 2922 provide image data related to the user's dwelling 2200 to be aggregated by insurance server 2012 as discussed further below.

With regards to external computing devices 2760, each is preferably associated with a service provider relating to a user's dwelling. For instance, they may include (but are not limited to) emergency responders (e.g., police, fire, medical, alarm monitoring services, etc.), utility companies (e.g., power, cable (phone, internet, television), water), service providers (e.g., home appliance providers), information/news providers (e.g., weather reports and other news items) and other like service/information/data providers.

With continuing reference to FIG. 33, in an illustrated embodiment, an insurance company's CRM module 2924, coupled to insurance server 2012, may be operative to enable the insurance company to understand a policyholder better. For instance, the CRM tool 2924 may be operative to determine if the policyholder has a homeowner's policy, a checking account, a life insurance policy and an investment device. If this policyholder has multiple lines of business with the insurance company, the data analysis module 2210 may determine the loss performance to be lower than another policyholder with a homeowner's policy only. Additionally, the CRM module 2924 may be operative to determine the payment history for the policyholder. This information may be used to determine the policyholder's payment history as a data layer for making rating, acceptability, and/or coverage decisions, among others.

Figure 34:
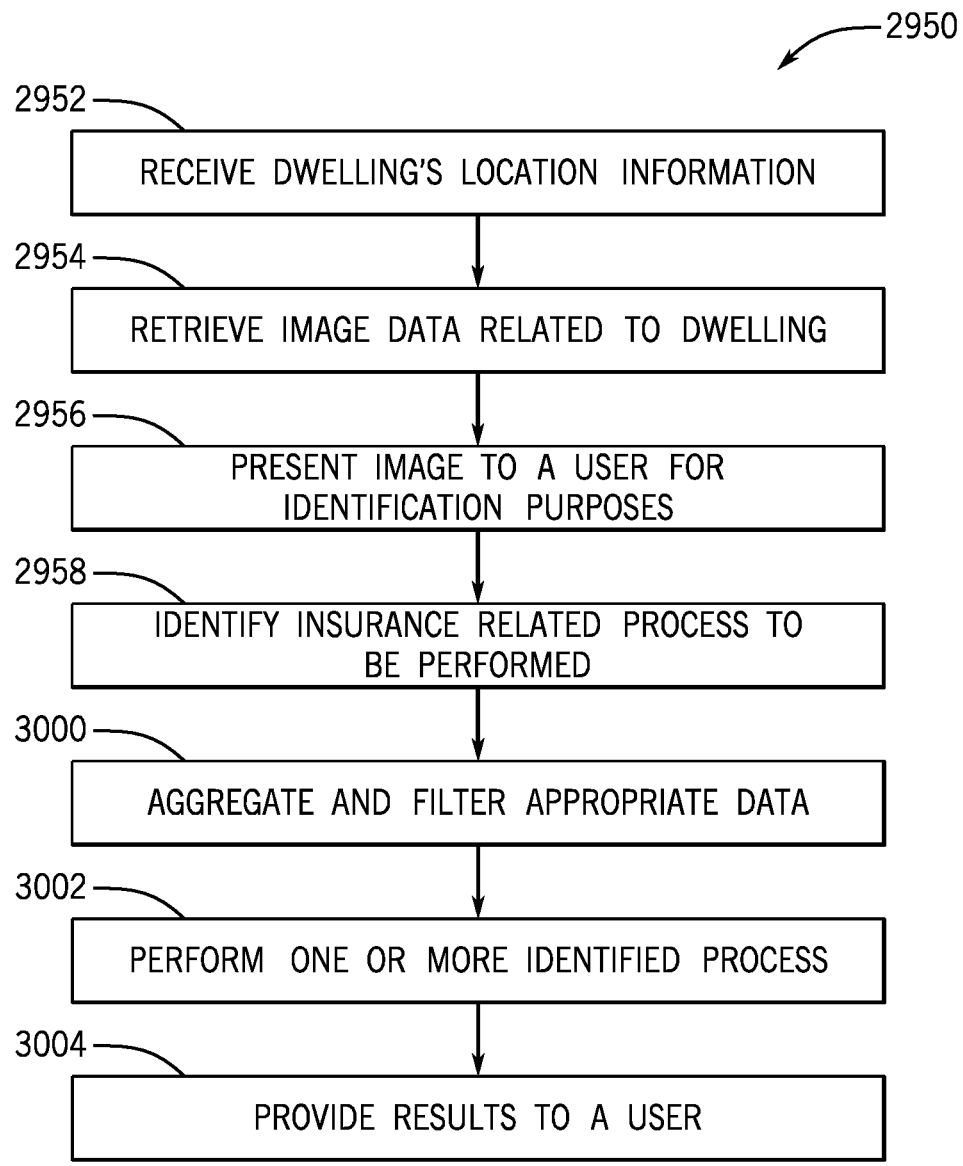
FIG. 34 is a flowchart, illustrating operational steps of the policy manager, in accordance with embodiments presented herein.
Figure 35:
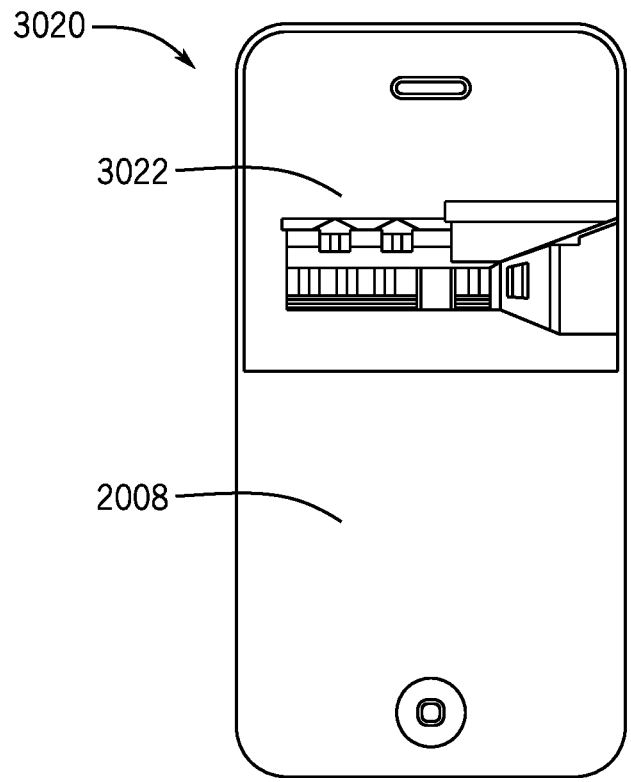
FIG. 35 is a schematic diagram, illustrating an electronic device that is displaying a graphical-user-interface (GUI), in accordance with embodiments presented herein.

FIG. 34 shows, in the form of a flow chart, exemplary operational steps 2950 of the policy manager 2212. Before turning to descriptions of FIG. 34, it is noted that the flow diagram shown therein is described, by way of example, with reference to components shown in FIGS. 11-13 and 35, although these operational steps may be carried out in any system and are not limited to the scenario shown in the aforementioned figures. Additionally, the flow diagram in FIG. 34 shows examples in which operational steps are carried out in a particular order, as indicated by the lines connecting the blocks, but the various steps shown in these diagrams can be performed in any order, or in any combination or sub-combination.

Generally, property insurance is associated with complex rating, underwriting and insurance-to-value processes, which typically require substantial data gathering activities. Typically, most of such data gathering is accomplished through a series of questions that are often answered by the customer. This manual process can be confusing and time consuming resulting in poor customer experience. Advantageously, policy manager 2212 described herein may be configured to facilitate automated data gathering/aggregation from multiple sources, including image data sources 2922, to streamline the end-to-end process (from quote to claim) of insuring customers. According to various embodiments of the present disclosure, in addition to data gathering and aggregation, policy manager 2212 is preferably configured to facilitate a variety of property insurance related processes based upon the aggregated data. These processes include, but are not limited to, underwriting, rebuild cost estimation, providing a quote for an insurance policy, issuance and renewal of an insurance policy, validation of an insurance claim, and the like.

With reference to FIG. 34, at 2952, policy manager 2212 preferably starts a comprehensive data gathering related to a policyholder's dwelling 2200 by requesting a policyholder to provide dwelling's location information. In an embodiment of the present disclosure, one of the service representatives associated with the insurance company and having access to the data analysis module 2210 may confer with the policyholder regarding property's address or geolocation. Such a conference may be via an Internet chat session or a telephone, for example. Once, the data analysis module 2210 obtains dwelling's address or geolocation it may pass the information to policy manager 2212 via a corresponding message. In another embodiment of the present disclosure, policy manager 2212 may receive the geolocation associated with the dwelling 2200 from a positional sensor attached to the dwelling 2200. For example, the positional sensor may be, or may comprise, a Global Positioning System (GPS) receiver, which may allow the position of dwelling 2200 to be determined. It should be appreciated that in some embodiments policy manager 2212 may be integrated with other sub-modules within the data analysis module 2210, as well as other modules (not shown in FIG. 13), such as a user interface module, that may comprise or may otherwise make use of the insurance server 2012. Accordingly, the policyholder may interact with the policy manager 2212 via such user interface module or via a website hosted by or otherwise maintained by the insurance company.

At 2954, in response to acquiring the geographical location of the dwelling 2200, policy manager 2212 may search the one or more image data sources 2922 using a query that includes data specifying a provided geographic location. If a desired image data or image information 2928 does not exist in any of the image data sources 2922, policy manager 2212 may send an image capture request to one or more surveying instruments, such as satellite 2921, camera 2926, etc., to obtain a new image of the dwelling 2200. It is noted that according to an embodiment of the present disclosure one or more views of the dwelling 2200 may be captured in real time. The captured views may include, but are not limited to, elevation view, aerial view and façade view of the dwelling 2200.

Figure 36A:
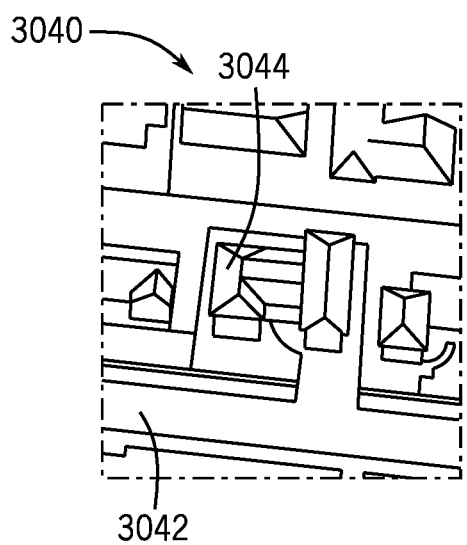
FIG. 36A is a schematic diagram, illustrating a graphical user interface presentation, in accordance with embodiments presented herein.
Figure 36B:
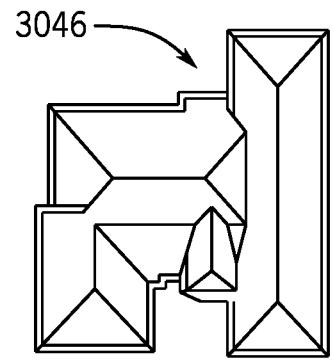
FIG. 36B is a schematic diagram, illustrating a plan view of a roof, in accordance with embodiments presented herein.

According to an embodiment of the present disclosure, if the policyholder interacts with the insurance company representative or website via a smart phone 2008 or other portable device, at 2956, policy manager 2212 may transmit the retrieved or captured image of the dwelling 2200 to policyholder's device for dwelling identification purposes. Cell phones, smart phones 2008 and related portable devices typically include a display and a keypad. As shown in the graphical user interface presented by electronic device 3020 of FIG. 35, an image 3022 showing a façade view of the dwelling 2200 may be presented to the policyholder on the smart phone's 2008 display, for example. According to another embodiment, policy manager 2212 may send the image 3022 to the policyholder via email, for example. By obtaining policyholder's confirmation that displayed image 3022 corresponds to the policyholder's dwelling 2200, policy manager 2212 may proceed with steps 2958-3004 as described below. If at 2954 in addition to acquiring a façade view policy manager 2212 also received one or more aerial views, such as exemplary satellite image 3042 shown in graphical user interface presentation 3040 of FIG. 36A, policy manager 2212 may be configured to process the satellite image 3042, which may include a view of dwelling's roof 3044. For example, the policy manger 2212 may generate a plan view 3046 of the roof 3044, as shown in FIG. 36B. Thus, according to various embodiments of the present disclosure, the time-consuming and error prone data gathering process can advantageously be reduced to requesting geolocation information related to the dwelling 2200 from the policyholder, retrieving the corresponding image from one or more image data sources 2922 and receiving policyholder's confirmation. It is noted that while the above description is directed to a case in which policy manager 2212 utilizes a dwelling image 3022 for property identification purposes, the present disclosure is not so limited and other means of property identification are contemplated by various embodiments.

Another embodiment at 2954 includes taking the aerial imagery from images 2928 and using the imagery for gathering useful insurance information about the dwelling 2200. For example, and for explanatory purpose only, the airplane 2925 can take high resolution photos of the dwelling 2200. Algorithms can render those images into 3D models of the home, use object recognition software to identify exterior construction, roof type, number of windows, and other features of the home. These features can be pulled into a tool that will identify the amount of insurance needed on the home.

Another embodiment is that risk characteristics can also be identified by the images collected. For example, the images 2928 can identify that dwelling 2200 has a tree touching the roof of the home. When a tree touches the roof it can cause the roof to wear out quicker. An alert can be sent to the insurance company, the insured, or a 3rd party if a risk like this is identified. Risk characteristics like this can be used for underwriting, pricing, and acceptability of the homeowner policy.

With reference back to FIG. 34, at 2958, policy manager 2212 preferably identifies one or more insurance related processes to be performed via further interaction with the policyholder. For example, this step may involve a determination whether the policyholder is interested in renewing an existing policy, getting a new policy or just obtaining a quote for a new insurance policy covering dwelling 2200. Once determined, policy manager 2212 may proceed to step 3000.

At 3000, policy manager 2212 may collect various data related to the dwelling 2200 and/or policyholder. As a non-limiting example, the CRM tool 2924 operatively interconnected with policy manager 2212 may be operative to provide additional information about the policyholder. For instance, the CRM tool 2924 may be operative to determine whether the policyholder has a homeowner's policy, a checking account, a life insurance policy and an investment device. If the policyholder has multiple lines of business with the insurance company, it may be determined that the loss performance may be lower than another policyholder with a homeowners policy only. Additionally, the CRM may be operative to determine the payment history for the policyholder. This information may be used to determine the policyholder's payment history as a data layer for making rating, acceptability, and/or coverage decisions.

With continuing reference to the aggregating of data in step 3000, in an embodiment of the present disclosure, policy manager 2212 preferably collects data related to a policyholder's surrounding risk characteristics. These risk characteristics can be data layers about the policyholder's risk in the area the policyholder lives. Examples of the risks that can be known or determined about the dwelling 2200 include, but are not limited to, the hurricane risk, earthquake risk, flood risk, crime risk, wildfire risk, lightning risk, hail risk, and sinkhole risk. Various information related to these risk factors can be captured by a plurality of sensors 2004 described above with reference to FIG. 13. This sensor captured data can add to the information known about the policyholder and the dwelling 2200 and can be useful to policy manager 2212 for determining pricing, acceptability, underwriting, and policy renewal, among other property insurance related decisions.

Additionally, policy manager 2212 preferably collects data related to unstructured data. Unstructured data (also called unstructured information) refers to data with no uniform structure. Unlike structured data, which is described by explicit semantic data models, unstructured data lacks such explicit semantic structure necessary for computerized interpretation. According to an embodiment of the present disclosure, policy manager 2212 could collect unstructured data from social networks, such as Facebook and Twitter. For instance, based on the geolocation information obtained at 2952, policy manager 2212 may determine that the dwelling 2200 is situated in a wildfire prone area. Furthermore, a community in this high wildfire area may organize wildfire prevention and mitigation efforts by means of social media coordination. The policy manager 2212 and/or other modules hosted by the insurance server 2012 can monitor the social media sites and may know that this community is organizing and utilizing wildfire loss mitigation techniques. This data could be used by policy manager 2212 along with the other aggregated information about the policyholder and/or the dwelling 2200 to make various types of decisions and/or enable the provision of certain products/services such as those that can be offered by an insurance carrier. Also, policy manager 2212 may determine that the aforesaid wildfire community is not giving out the latest wildfire science information to the community members. Accordingly, policy manager 2212 may provide to the policyholder the latest information related to wildfire science mitigation techniques.

It should be appreciated that policy manager 2212 may store the captured informatics data and retrieved image data in the data repository 310 (which is shown, in FIG. 13, as being part of, or used by, insurance server 2012). The data repository 310 may comprise a database or any other suitable storage component. For example, the suitable storage component may comprise, or may otherwise make use of, magnetic or optical disks, volatile random-access memory, non-volatile random—access memory or any other type of storage device.

With continuing reference to the step 3000, in an embodiment of the present disclosure, policy manager 2212 optionally selectively filters aggregated data based on the type of processes need to be performed and/or based on type of decisions need to be made. The main idea behind this aspect of the present disclosure is that policy manager 2212 may selectively filter out any non-relevant data before sending the data to more predictive models described below, based on the context of the particular decision. In an embodiment of the present disclosure, data filtering feature may be implemented based on filtering rules predefined by the insurance company.

At 3002, policy manager 2212 preferably performs one or more processes identified at step 2958 using the aggregated data in order to provide services/products desired by the policyholder. Examples of the services facilitated by policy manager 2212 may include, without limitation, providing a quote for an insurance policy insuring the dwelling 2200, issuing a new insurance policy for the dwelling 2200, renewing the policyholder's property insurance policy associated with the dwelling 2200, validating an insurance claim associated with the dwelling 2200 if actual loss occurs, generating an insurance to value (ITV) estimate, and the like. In addition, prior to providing a quote, issuing and/or renewing an insurance policy, for example, policy manager 2212 may conduct a rigorous underwriting process to evaluate risks associated with the dwelling 2200. It should be appreciated that policy manager 2212 may utilize aggregated data, including image data, to perform the aforesaid processes. For instance, policy manager 2212 may use one or more images provided by the one or more image data sources 2922 to conduct a virtual inspection of the policyholder's dwelling 2200. As another example, if the policyholder is interested in initiating a hail damage claim against his/her insurance policy, policy manager 2212 may evaluate an image, such as image 3042 shown in FIG. 36A depicting the roof 3044 of the dwelling 2200, to evaluate the extent of the damage, provided that the image 3042 was captured after the date the hail was reported. As yet another non-limiting example, policy manager 2212 may utilize image data for insurance renewal purposes. More specifically, prior to issuing a renewed policy, policy manager 2212 may transmit an image capture request to one or more surveying instruments, such as satellite 2921, camera 2926, etc. to obtain a real-time aerial image of the dwelling 2200. In addition, policy manager 2212 may retrieve a previously taken aerial image of the dwelling 2200 that may be associated, for example, with policyholder's expiring policy. By analyzing and comparing these two images policy manager 2212 may be capable of determining any structural changes, structural damage, etc. related to the dwelling 2200. It should be appreciated that the specific examples of image data utilization that are discussed above by no means constitute an exhaustive list.

With continuing reference to the step 3002, policy manager 2212 preferably utilizes one or more predictive models to rapidly perform one or more insurance related process and/or to provide insurance related services identified at 2958. Predictive modeling generally refers to techniques for extracting information from data to build a model that can predict an output from a given input. Predicting an output can include performing analysis to predict an occurrence of a certain peril, such as earthquake or hurricane, to name a few examples. Various types of predictive models can be used to analyze data and generate predictive outputs. Examples of predictive models include, but not limited to, Naive Bayes classifiers, linear and logistic regression techniques, support vector machines, neural networks, memory-based reasoning techniques, and the like. Typically, a predictive model is trained with training data that includes input data and output data that mirror the form of input data that will be entered into the predictive model and the desired predictive output, respectively. The amount of training data that may be required to train a predictive model can be large. It is noted that different types of predictive models may be used by policy manager 2212 depending on the type of the service/product provided and/or type of captured informatics sensor or image data.

It should be appreciated that some comprehensive insurance related decisions may be made by aggregating results provided by the one or more predictive models. For instance, to recalculate a coverage amount or a premium of the property-insurance policy, policy manager 2212 may aggregate results provided by various models and available unstructured data that predict risks associated with hurricane risk, earthquake risk, flood risk, crime risk, wildfire risk, lightning risk, hail risk, sinkhole risk, and the like.

At 3004, policy manager 2212 preferably provides results to users via, for example, the aforementioned user interface module or website. Alternatively, policy manager 2212 may store the generated results in the data repository 310.

Advantageously, policy manager 2212, fully integrated with other modules and various data sources described above, provides an improved, efficient and streamlined data gathering process that is contingent upon dynamically captured image and informatics sensor data. In another aspect, policy manager 2212 may also provide for "one click" process to facilitate a rapid insurance-related action. This "one click" process can quickly provide the policyholder a quote on, for example and not limited to, a homeowner or auto insurance policy. According to an illustrative embodiment of the present disclosure, policy manager 2212 preferably aggregates and filters the information about the policyholder and/or a corresponding property using the ways illustrated above, and the policyholder either only has to provide very little or no additional information about their home or car. This can significantly expedite the quote process. For example, policy manager 2212 can solicit a homeowners policy to the policyholder, the policyholder can see a picture of their home on a mobile phone (such as image 3022 displayed on smart phone device 2008 in FIG. 35) with all the home characteristics already provided. The policyholder would only need to select "buy" and they have purchased their home insurance.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this disclosure, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

The invention claimed is:

1. A method, comprising:
receiving, via a processor, a geolocation associated with a property associated with a user;
querying, via the processor, one or more network image sources using the geolocation as a query input to identify a query output comprising one or more network images of the property, wherein the one or more network images are associated with geolocation metadata, and wherein the query output is identified by matching the query input with the geolocation metadata of the one or more network images and the geolocation metadata is received via a positional sensor associated with the one or more network image sources;
when the one or more network images are not in the one or more network image sources, transmitting, via the processor, a request to one or more surveying instruments to obtain the one or more network images of the property;
sending, via the processor, at least a first image of the one or more network images to an electronic device of a user for display in a confirmation graphical user interface (GUI) that prompts the user to provide a confirmation as to whether the at least first image depicts the property of the user;
receiving, via the processor, the confirmation, provided from the user, via the confirmation GUI of the electronic device;
in response to the confirmation indicating that the at least first image depicts the property associated with the user, providing, via the processor, at least a second image of the one or more network images for image analysis to identify one or more features of the property;
performing one or more processes based at least upon Customer Relationship Management (CRM) tool data of the user and the one or more features of the property; and
providing results of the one or more processes to the user.

2. The method of claim 1, wherein the one or more network images of the property comprise a façade view, an aerial view, an elevation view, or any combination thereof.

3. The method of claim 1, comprising creating, via the processor, a three-dimensional model of the property based at least upon the one or more network images of the property.

4. The method of claim 1, comprising determining, via the processor, one or more risk characteristics of the property based at least upon the one or more features of the property.

5. The method of claim 4, comprising sending, via the processor, an alert to one or more parties associated with the CRM tool data of the user based at least upon the one or more risk characteristics of the property.

6. The method of claim 4, wherein the one or more risk characteristics is associated with hurricane risk, earthquake risk, flood risk, crime risk, wildfire risk, lightning risk, hail risk, sinkhole risk, or any combination thereof of the property.

7. The method of claim 1, wherein performing the one or more processes comprises determining to present the user with one or more options using one or more predictive models, wherein the one or more predictive models use the CRM tool data, the one or more features, the one or more network images, or any combination thereof.

8. The method of claim 7, wherein the one or more options comprise renewing an existing insurance policy, requesting an insurance policy, obtaining a quote for the insurance policy, validating an insurance claim associated with the property when loss occurs, generating an insurance to value estimate, or any combination thereof.

9. The method of claim 1, wherein the image analysis comprises conducting a virtual inspection of the property based at least in part on the one or more network images.

10. The method of claim 1, wherein the CRM tool data of the user comprises a payment history of the user, ownership of homeowner's policy, ownership of a checking account, ownership of a life insurance policy, ownership of an investment device, or any combination thereof.

11. A system, comprising:
one or more positional sensors configured to determine a geolocation associated with a property associated with a user;
an analysis server configured to:
receive the geolocation associated with the property;
query one or more network image sources using the geolocation as a query input to identify a query output comprising one or more network images of the property, wherein the one or more network images are associated with geolocation metadata, and wherein the query output is identified by matching the query input with the geolocation metadata of the one or more network images and the geolocation metadata is received via a positional sensor associated with the one or more network image sources;

when the one or more network images are not in the one or more network image sources, transmit, via the analysis server, a request to one or more surveying instruments to obtain the one or more network images of the property;

send at least a first image of the one or more network images to an electronic device of a user for display in a confirmation graphical user interface (GUI) that prompts the user to provide a confirmation as to whether the at least first image depicts the property of the user;

receive the confirmation, provided from the user, via the confirmation GUI of the electronic device;

in response to the confirmation indicating that the at least first image depicts the property associated with the user, provide at least a second image of the one or more network images for image analysis to identify one or more features of the property;

perform one or more processes based at least upon Customer Relationship Management (CRM) tool data of the user and the one or more features of the property; and provide results of the one or more processes to the user.

12. The system of claim 11, wherein the one or more network images of the property comprise a façade view image of the property and an aerial view image of the property used to identify at least a portion of the one or more features of the property.

13. The system of claim 11, wherein the analysis server is configured to determine one or more risk characteristics of the property based at least upon the one or more features of the property, wherein the one or more risk characteristics comprise hurricane risk, earthquake risk, flood risk, crime risk, wildfire risk, lightning risk, hail risk, sinkhole risk, or any combination thereof of the property.

14. The system of claim 13, wherein the analysis server is configured to execute one or more predictive models, wherein the one or more predictive models use a set of input data, wherein the input data comprises the CRM tool data, the one or more features, the one or more network images, the one or more risk characteristics, or any combination thereof.

15. The system of claim 14, wherein the analysis server is configured to train the one or more predictive models with training data, wherein the training data mirrors the set of input data.

16. A tangible, non-transitory, machine-readable medium, comprising machine-readable instructions that when executed by one or more processors of a computer, cause the computer to:

receive a geolocation associated with a property associated with a user;

query one or more network image sources using the geolocation as a query input to identify a query output comprising one or more network images of the property, wherein the one or more network images are associated with geolocation metadata, and wherein the query output is identified by matching the query input with the geolocation metadata of the one or more network images and the geolocation metadata is received via a positional sensor associated with the one or more network image sources;

when the one or more network images are not in the one or more network image sources, transmit, via the processor, a request to one or more surveying instruments to obtain the one or more network images of the property;

send at least a first image of the one or more network images to an electronic device of a user for display in a confirmation graphical user interface (GUI) that prompts the user to provide a confirmation as to whether the at least first image depicts the property of the user;

receive the confirmation, provided from the user, via the confirmation GUI of the electronic device;

in response to the confirmation indicating that the at least first image depicts the property associated with the user, provide at least a second image of the one or more network images for image analysis to identify one or more features of the property;

perform one or more processes based at least upon a Customer Relationship Management (CRM) tool data of the user and the one or more features of the property; and provide results of the one or more processes to the user.

17. The machine-readable medium of claim 16, comprising machine-readable instructions that when executed by the one or more processors of the computer, cause the computer to determine one or more risk characteristics of the property based at least upon the one or more features of the property.

18. The machine-readable medium of claim 17, comprising machine-readable instructions that when executed by the one or more processors of the computer, cause the computer to present the user with one or more options, wherein the one or more options comprise renewing an existing insurance policy, requesting an updated insurance policy, obtaining a quote for the updated insurance policy, validating an insurance claim associated with the property when loss occurs, generating an insurance to value estimate, or any combination thereof.

* * * * *